(12) United States Patent
Ushijima

(10) Patent No.: US 8,923,624 B2
(45) Date of Patent: Dec. 30, 2014

(54) ARC DETECTING APPARATUS AND RECORDING MEDIUM STORING ARC DETECTING PROGRAM

(75) Inventor: Satoru Ushijima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/316,639

(22) Filed: Dec. 12, 2011

(65) Prior Publication Data

US 2012/0154622 A1    Jun. 21, 2012

(30) Foreign Application Priority Data

Dec. 15, 2010 (JP) ................ 2010-279576

(51) Int. Cl.
  *G06K 9/46* (2006.01)
  *G06K 9/00* (2006.01)
  *H04N 5/228* (2006.01)
  *G06K 9/48* (2006.01)

(52) U.S. Cl.
  CPC ............ *G06K 9/481* (2013.01); *G06K 9/468* (2013.01)
  USPC ........... 382/203; 382/199; 382/128; 382/154; 348/222.1

(58) Field of Classification Search
  CPC ................ G06K 9/6204; G06T 7/0083
  USPC .............. 382/190, 204, 199, 203, 16, 9, 61; 348/222.1, 199
  See application file for complete search history.

(56) References Cited

U.S. PATENT DOCUMENTS

| | | | | |
|---|---|---|---|---|
| 2009/0304285 A1* | 12/2009 | Wu et al. | ............... | 382/199 |
| 2010/0067805 A1* | 3/2010 | Klefenz | ............... | 382/201 |

FOREIGN PATENT DOCUMENTS

| | | |
|---|---|---|
| JP | 63-213087 A | 9/1988 |
| JP | 01-180678 | 7/1989 |
| JP | 07-104954 A | 4/1995 |
| JP | 2006-293809 A | 10/2006 |

* cited by examiner

*Primary Examiner* — Roberto Velez
*Assistant Examiner* — Stephen Coleman
(74) *Attorney, Agent, or Firm* — Fujitsu Patent Center

(57) ABSTRACT

An arc detecting apparatus includes an input unit that inputs an image; a line-segment detector that detects line segments from the image; a determiner that determines whether two of the line segments are associable with each other, on a basis of positions of the two line segments and angles of the two line segments relative to corresponding references; and an arc detector that detects an arc approximated by at least two line segments including the two line segments, on a basis of the two line segments being associated with each other according to a result of the determination.

13 Claims, 42 Drawing Sheets

FIG. 4

```
LINE SEGMENT:
  LINE-SEGMENT ID
  END POINT COORDINATES pt1 AND pt2
  LENGTH
  ANGLE (0 TO 179)
```

FIG. 17

LINE-SEGMENT ID 0:
pt1:linkNum=2
  LINK0:linkId=1
       linkPt=pt2
       angle=30
  LINK1:linkId=2
       linkPt=pt1
       angle=15
pt2:linkNum=1
  LINK0:linkId=4
       linkPt=pt2
       angle=-18

LINE-SEGMENT ID 1:
pt1:linkNum=0
pt2:linkNum=1
  LINK0:linkId=0
       linkPt=pt1
       angle=-30

LINE-SEGMENT ID 2:
pt1:linkNum=1
  LINK0:linkId=0
       linkPt=pt1
       angle=-15
pt2:linkNum=1
  LINK0:linkId=3
       linkPt=pt1
       angle=18

LINE-SEGMENT ID 3:
pt1:linkNum=1
  LINK0:linkId=2
       linkPt=pt2
       angle=-18
pt2:linkNum=1
  LINK0:linkId=5
       linkPt=1
       angle=-20

LINE-SEGMENT ID 4:
pt1:linkNum=0
pt2:linkNum=1
  LINK0:linkId=0
       linkPt=pt2
       angle=18

LINE-SEGMENT ID 5:
pt1:linkNum=1
  LINK0:linkId=3
       linkPt=pt2
       angle=20
pt2:linkNum=0

LINE-SEGMENT ID 6:
pt1:linkNum=0
pt2:linkNum=0

LINE-SEGMENT ID 7:
pt1:linkNum=0
pt2:linkNum=0

FIG. 23A

NUMBER OF ELEMENTS: 4
ELEMENT 0
  lineId=0
  linkPt=pt1
  linkId=1
  angle=15
ELEMENT 1
  lineId=2
  linkPt=pt2
  linkId=0
  angle=18
ELEMENT 2
  lineId=3
  linkPt=pt2
  linkId=0
  angle=−20
ELEMENT 3
  lineId=5
  linkPt=pt2
  linkId=0
  angle=0 (NO LINK)

FIG. 23B

NUMBER OF ELEMENTS: 2
ELEMENT 0
  lineId=0
  linkPt=pt2
  linkId=0
  angle=−18
ELEMENT 1
  lineId=4
  linkPt=pt1
  linkId=0
  angle=0 (NO LINK)

FIG. 23C

NUMBER OF ELEMENTS: 5
ELEMENT 0
  lineId=4
  angle=18
ELEMENT 1
  lineId=0
  angle=15
ELEMENT 2
  lineId=2
  angle=18
ELEMENT 3
  lineId=3
  angle=−20
ELEMENT 4
  lineId=5
  angle=0 (NO LINK)

FIG. 23D

NUMBER OF ELEMENTS: 4
ELEMENT 0
  lineId=4
  angle=18
ELEMENT 1
  lineId=0
  angle=15
ELEMENT 2
  lineId=2
  angle=18
ELEMENT 3
  lineId=3
  angle=0 (NO LINK)

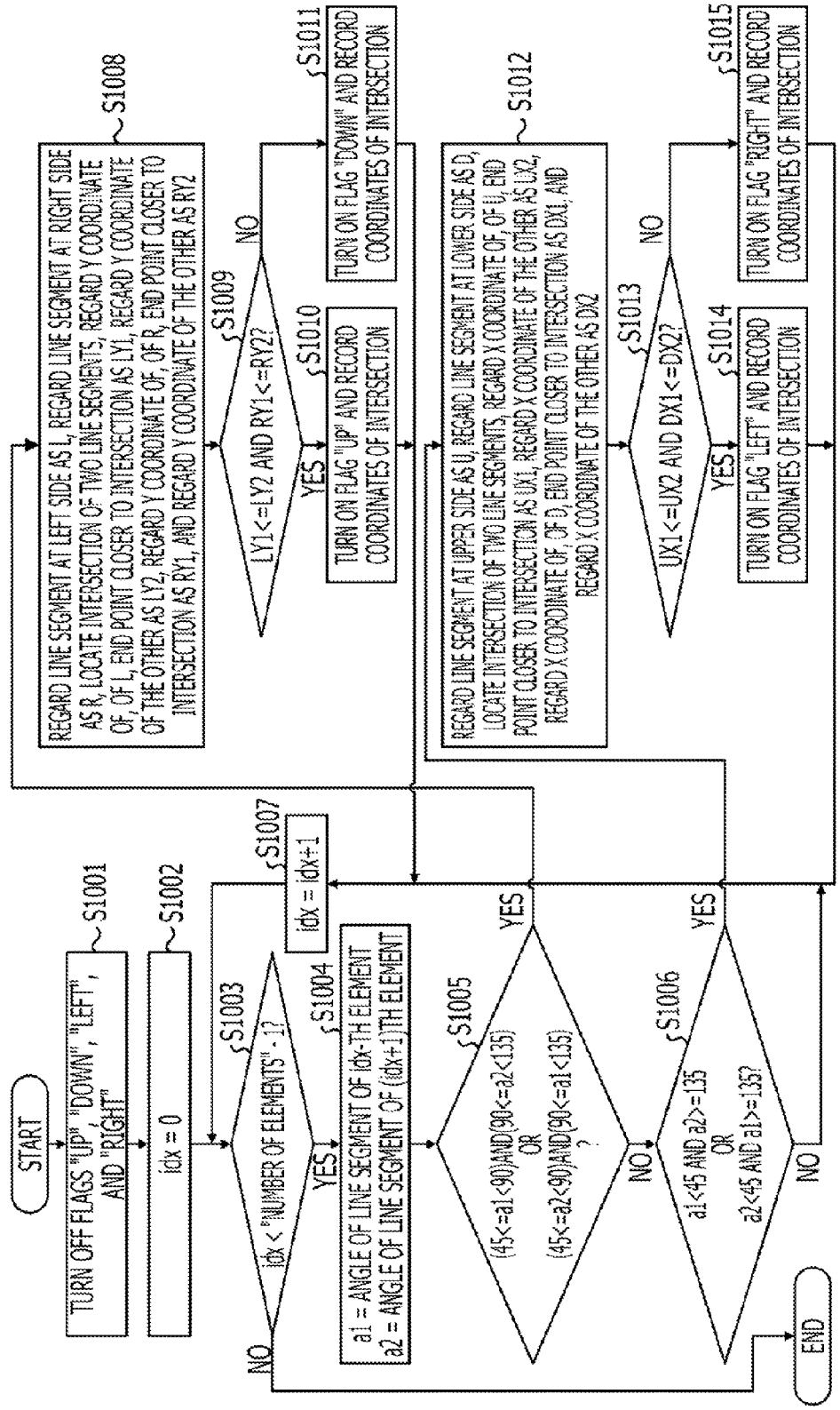

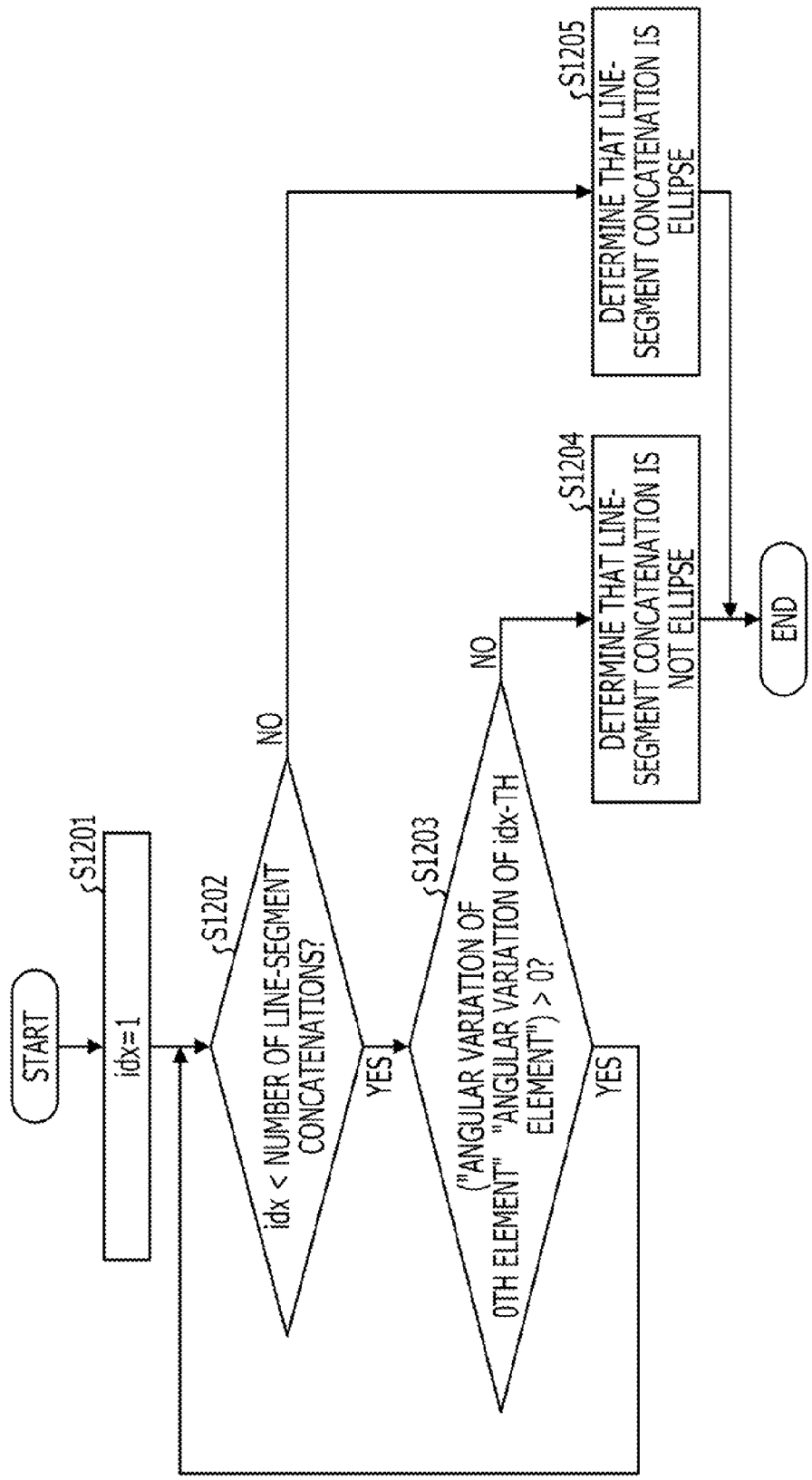

ARC DETECTING APPARATUS AND RECORDING MEDIUM STORING ARC DETECTING PROGRAM

CROSS-REFERENCE TO RELATED APPLICATION

This application is based upon and claims the benefit of priority of the prior Japanese Patent Application No. 2010-279576, filed on Dec. 15, 2010, the entire contents of which are incorporated herein by reference.

FIELD

The embodiments relate to an arc detecting apparatus for detecting arcs and a recording medium storing an arc detecting program.

BACKGROUND

As technology for detecting arcs on an image, a technique for extracting edges and performing Hough transform has been known. The Hough transform is a feature extraction technique that is applicable to detection of graphics in various shapes. With the Hough transform, however, the processing time and the memory consumption increase according to the number of parameters involved in the transform. For detecting an ellipse, since at least four parameters, i.e., coordinates (X, Y) and radii (lateral radius, longitudinal radius) are used, the amount of processing time for the ellipse detection is large and the amount of memory consumption is also large.

Accordingly, technologies for detecting arcs of an ellipse without use of the Hough transform are available. For example, as technology for detecting circular arcs, a technology for detecting circular arcs on the basis of graphic thinning an broken-line approximation is available (e.g., Japanese Unexamined Patent Application Publication No. 07-104954, 63-213087, and 01-180678). Also, as technology for extracting a closed area including an ellipse or the like, a technology for extracting a closed area surrounded by line segments or curves on a map is available (e.g., Japanese Unexamined Patent Application Publication No. 2006-293809).

SUMMARY

According to an aspect of the invention, an arc detecting apparatus includes: an input unit that inputs an image; a line-segment detector that detects line segments from the image; a determiner that determines whether two of the line segments are associable with each other, on a basis of positions of the two line segments and angles of the two line segments relative to corresponding references; and an arc detector that detects an arc approximated by at least two line segments including the two line segments, on a basis of the two line segments being associated with each other according to a result of the determination.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates one example of the data structure of line-segment data;

FIG. 17 illustrates one example of the line-segment coupling information;

FIGS. 23A to 23D illustrate one example of data of results of processing;

FIG. 24 is a flowchart illustrating one example of ellipse position estimation processing in the first embodiment;

FIG. 27 is a flowchart illustrating one example of angular-variation direction check processing in the first embodiment;

DESCRIPTION OF EMBODIMENTS

Detection of arcs by using broken-line approximation as in the technologies disclosed in Japanese Unexamined Patent Application Publication Nos. 07-104954, 63-213087, and 01-180678 have a problem in that the detection can be performed only in a range where narrow lines are continuous. In order to avoid the problem, the edge extraction may be performed with high sensitivity. Such an approach, however, requires a larger number of narrow lines to perform circular-arc detection processing, thus taking a large amount of processing time and increasing the possibility of false detection.

In the method (proposed in Japanese Unexamined Patent Application Publication No. 07-104954) for reconstructing a circle or a circular arc from line segments and the method (Japanese Unexamined Patent Application Publication No. 01-180678) for checking continuity of adjacent broken lines, a technique for estimating the center and the radius of a circle is disclosed. In the technique, however, there is a problem in that an ellipse having a large ratio of the longitudinal diameter to the lateral diameter thereof is not properly performed.

In the technology disclosed in Japanese Unexamined Patent Application Publication No. 2006-293809, although a closed area can be extracted, no determination can be made as to whether or not the closed area is an ellipse and thus the closed area cannot be extracted when another line segment lies inside line segments constituting the closed area.

Accordingly, a technology is proposed for appropriately detecting arcs while reducing the amount of processing load on arc detection.

Embodiments will be described below in detail with reference to the accompanying drawings.

First Embodiment

Configuration

Figure 1:
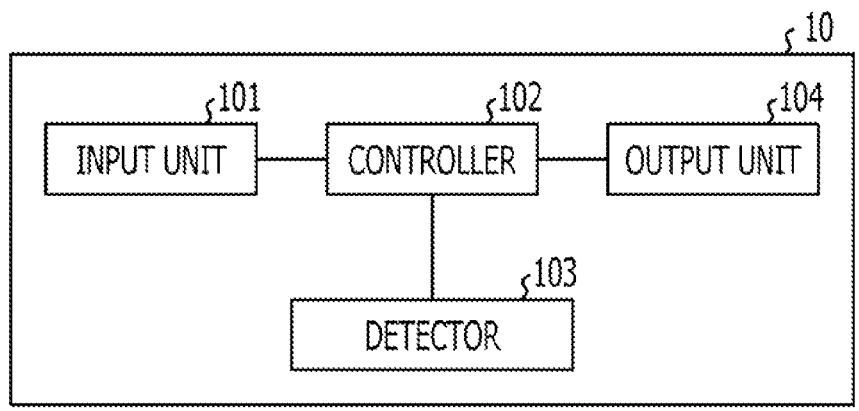
FIG. 1 is a block diagram illustrating one example of the functional configuration of an arc detecting apparatus.

FIG. 1 is a block diagram illustrating one example of a functional configuration of an arc detecting apparatus 10 that is common to embodiments disclosed herein. In FIG. 1, the arc detecting apparatus 10 includes an input unit 101, a controller 102, a detector 103, and an output unit 104.

The input unit 101 obtains image data captured by an image capture device and inputs the image data to the controller 102. The image data may simply be referred to as "data" hereinafter.

The controller 102 exchanges data with the individual units and controls the units. For example, upon obtaining an image from the input unit 101, the controller 102 outputs the image to the detector 103 and controls the detector 103 so as to detect arcs. The controller 102 obtains a result of the detection performed by the detector 103 and outputs the detection result to the output unit 104.

Upon obtaining the image from the controller 102, the detector 103 executes processing for detecting an ellipse or a part (e.g., an arc) of an ellipse from the image. The detector 103 sends the detection result back to the controller 102. Details of the detector 103 will be described below.

The output unit 104 obtains the detection result and/or the image from the controller 102 and outputs the detection result and/or the image to a processing unit for a next process.

Figure 2:
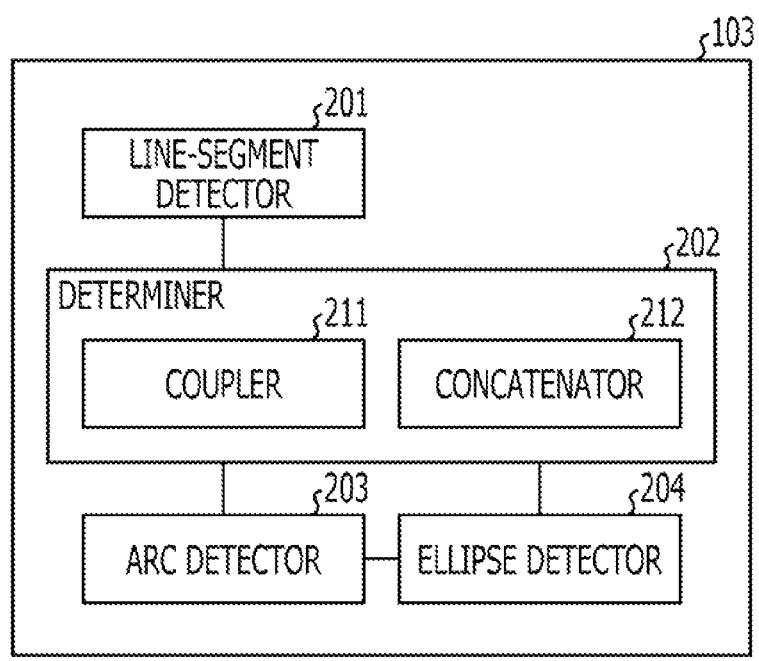
FIG. 2 is a block diagram illustrating one example of the functional configuration of a detector.

The configuration of the detector 103 will be described next. FIG. 2 is a block diagram illustrating one example of a functional configuration of the detector 103 in each embodiment. The detector 103 includes a line-segment detector 201, a determiner 202, an arc detector 203, and an ellipse detector 204.

The line-segment detector 201 detects line segments from the obtained image. For example, the line-segment detector 201 detects line segments by extracting edges from the image and using Hough transform on the extracted edges. Since the Hough transform for detecting the line segments involves a small number of parameters, the amount of processing load is relatively small. The line-segment detector 201 may also use another known technique to detect line segments.

Figure 3B:
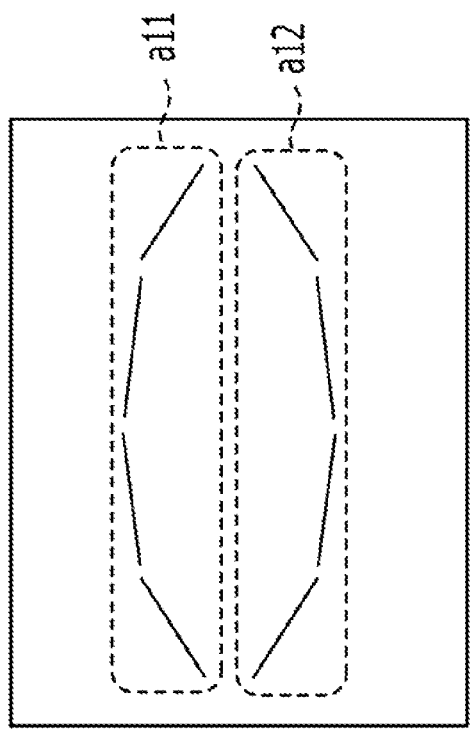
FIGS. 3A and 3B illustrate one example of line-segment detection.
Figure 3A:
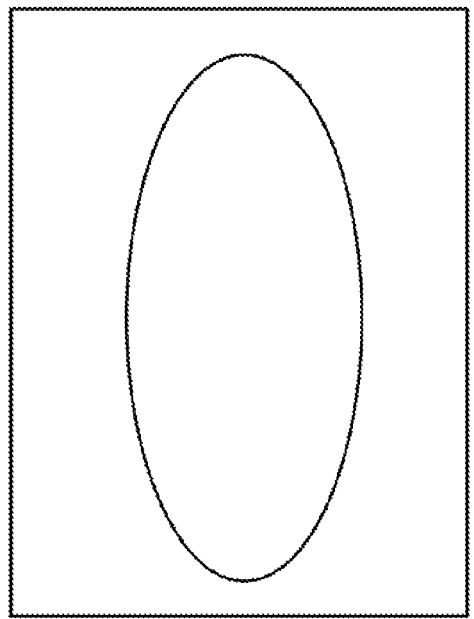

FIGS. 3A and 3B illustrate one example of line-segment detection. FIG. 3A illustrates an input image and FIG. 3B illustrates an image obtained by performing line-segment detection on the image illustrated in FIG. 3A. The line-segment detector 201 detects line segments from the image, as illustrated in FIG. 3B. In processing described below, a series of line segments whose angles vary in the same direction, as indicated by a11 and a12 illustrated in FIG. 3B, is detected from those line segments.

The line-segment detector 201 holds line-segment data of each detected line segment. FIG. 4 illustrates one example of the data structure of the line-segment data. The line-segment data illustrated in FIG. 4 has a line-segment ID, end point coordinates (pt1 and pt2), a line-segment length, and a line-segment angle (0 to 179).

Figure 5:
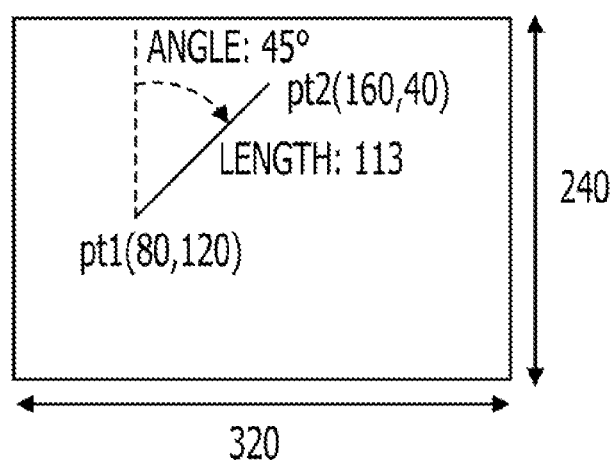
FIG. 5 illustrates one example of a line segment.

FIG. 5 illustrates one example of a line segment. In the example illustrated in FIG. 5, a line segment has end points pt1 and pt2 represented by coordinates pt1 (80, 120) and pt2 (160, 40), has a length of 113, and has an angle of 45°.

Figure 6:
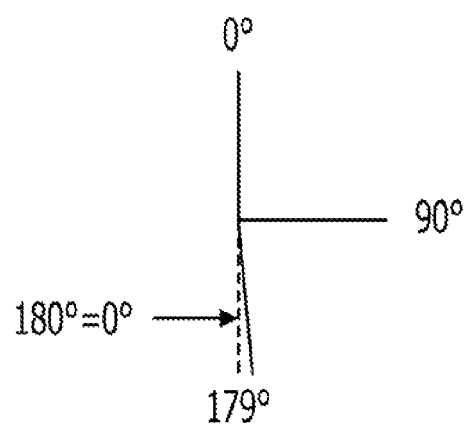
FIG. 6 is a diagram illustrating a definition of an angle.

FIG. 6 is a diagram illustrating a definition of an angle. As illustrated in FIG. 6, the upper side (the 0 o'clock direction) in the vertical direction relative to an image is defined as 0°. The right side (the 3 o'clock direction) in the horizontal direction is defined as 90° and the lower side (the 6 o'clock direction) in the vertical direction is defined as 180°. However, as indicated by a dotted line in FIG. 6, an angle of 180° is defined as another 0° and the left side (the 9 o'clock direction) in the horizontal direction is also defined as 90°. That is, the angle is expressed by 0° to 179°. The angle may also be expressed by 0° to 359°.

Referring back to FIG. 2, the determiner 202 determines whether or not the line segments detected by the line-segment detector 201 are associable as a part (an arc) of an ellipse. Upon determining that the line segments are associable, the determiner 202 associates the line segments. The determiner 202 includes a coupler 211 and a concatenator 212.

Using the positions and the angles of two line segments, the coupler 211 determines whether or not the two line segments can be coupled together as line segments forming an arc. The coupler 211 associates the line segments determined to be line segments that can be coupled together. The coupler 211 generates line-segment coupling information indicating the coupled line segments and holds the generated line-segment coupling information.

Figure 7:
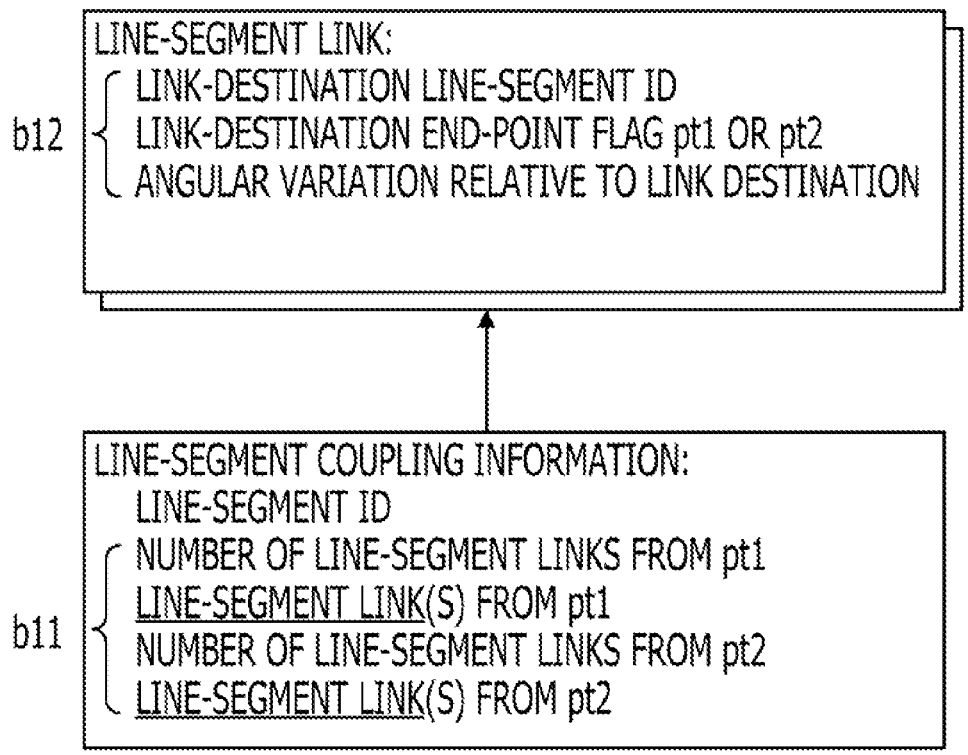
FIG. 7 illustrates one example of the data structure of line-segment coupling information.

FIG. 7 illustrates one example of the data structure of the line-segment coupling information. As illustrated in FIG. 7, the line-segment coupling information includes a line-segment ID and link information b11 of links from end points pt1 and pt2 to other line segments. The link information b11 includes the number of links and a line-segment link or line-segment links corresponding to the number of links. As illustrated at b12 in FIG. 7, each line-segment link includes an ID of a link-destination line segment, a flag indicating to which of the end points pt1 and pt2 of the link-destination line segment the ling segment of interest is linked, and an angular variation relative to the link-destination line segment.

Figure 8A:
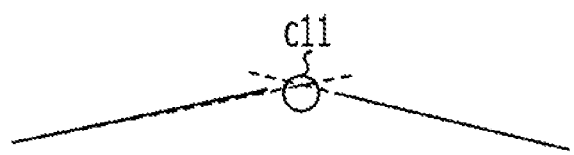
FIGS. 8A to 8C illustrate an adjacency relationship between two line segments.
Figure 8B:
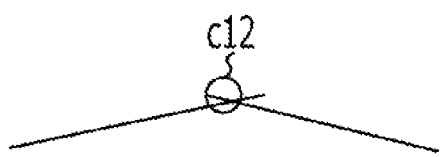
Figure 8C:
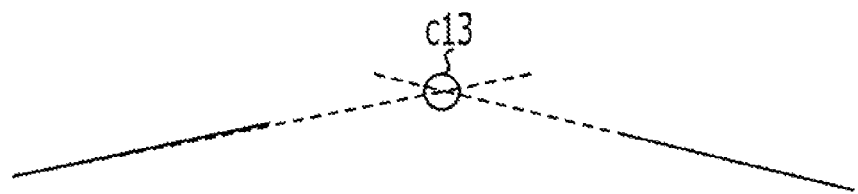

Line segments coupled by the coupler 211 will now be described with reference to FIGS. 8A to 8C and 9A to 9C. FIGS. 8A to 8C illustrate an adjacency relationship between two line segments. FIG. 8A illustrates an example in which it is determined that two line segments are adjacent to each other. An intersection c11 illustrated in FIG. 8A lies on extended lines of the two line segments. When the line-segment end points that are closer to the intersection c11 exist in a predetermined distance from the intersection c11, the coupler 211 determines that the two line segments are adjacent to each other. The predetermined distance is, for example, one-fourth of the average length of two line segments. Alternatively, the predetermined distance may be, for example, one-third of the average length of two line segments. Since the case illustrated in FIG. 8A satisfies the condition of the predetermined distance, it is determined that the two line segments are adjacent to each other.

FIG. 8B illustrates an example in which it is determined that two line segments are adjacent to each other. An intersection c12 illustrated in FIG. 8B is an intersection of two line segments. When the line-segment end points closer to the intersection c12 exist in the predetermined distance from the intersection c12, the coupler 211 determines that the two line segments are adjacent to each other. Since the case illustrated in FIG. 8B satisfies the condition of the predetermined distance, it is determined that the two line segments are adjacent to each other.

FIG. 8C illustrates an example in which it is determined that two line segments are not adjacent to each other. An intersection c13 illustrated in FIG. 8C lies on extended lines of two line segments. Since the distance between the intersection c13 and the line-segment end points closer to the intersection c13 is larger than or equal to the predetermined distance, the coupler 211 determines that the these line segments are not adjacent to each other.

Figure 9A:
FIGS. 9A to 9C illustrate an angular relationship between two line segments.
Figure 9B:
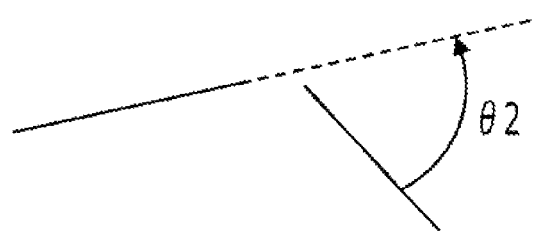
Figure 9C:
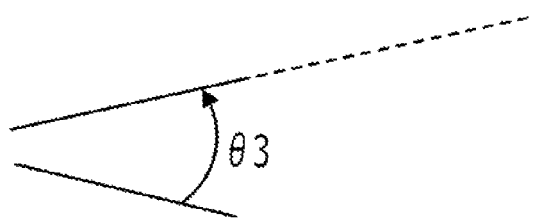

FIGS. 9A to 9C illustrate an angular relationship between two line segments. FIG. 9A illustrates an example in which it is determined that two line segments are to be coupled together. In FIG. 9A, $\theta 1$ represents an angular variation between two line segments. When the angle $\theta 1$ is smaller than a predetermined angle, the coupler 211 determines that the two line segments are to be coupled together. The predetermined angle is, for example, 40°. In this case, since the angular variation $\theta 1$ is smaller than the predetermined angle, the coupler 211 determines that the two line segments are to be coupled together.

FIG. 9B illustrates an example in which it is determined that two line segments are not to be coupled together. In FIG. 9B, $\theta 2$ represents an angular variation between two line segments. In this case, since the angular variation $\theta 2$ is larger than or equal to the predetermined angle, the coupler 211 determines that the two line segments are not to be coupled together.

FIG. 9C illustrates an example in which it is determined that two line segments are not to be coupled together. In FIG. 9C, $\theta 3$ represents an angular variation between two line segments. In this case, although the angular variation $\theta 3$ is smaller than the predetermined angle, the positional relationship of the two line segments does not satisfy a predetermined condition. Thus, the coupler 211 determines that the two line segments are not to be coupled together. With respect to the positional relationship, a determination is made as to, for example, whether or not the X coordinates of the centers of two line segments are located at the left and right sides or whether or not the Y coordinates of the centers of two line segments are located at approximately the same positions. Details of the positional-relationship determination are described below.

As illustrated in FIGS. 8A to 8C and 9A to 9C, the coupler 211 determines whether or not the end points of two line segments are adjacent to each other, the angular variation of the two line segments is small, and the two line segments are located at appropriate positions. The coupler 211 couples the line segments determined to satisfy those conditions. The coupler 211 generates line-segment coupling information of the coupled line segments and holds the generated line-segment coupling information.

Referring back to FIG. 2, the concatenator 212 obtains the line-segment coupling information from the coupler 211. The concatenator 212 searches for a line segment whose both ends are coupled with other line segments and determines whether or not each of the line segments coupled with the found line segment is coupled with another line segment. A line segment whose both ends are coupled with other line segments will hereinafter be referred to as a "reference line segment".

When the reference line segment is coupled with other line segments, the concatenator 212 associates these line segments. The concatenator 212 repeats the processing while shifting the reference line segment, thereby increasing the number of concatenations. This processing is hereinafter be referred to as "concatenation search processing". The concatenator 212 generates line-segment concatenation information indicating the line segments concatenated by the concatenation search processing and holds the generated line-segment concatenation information.

Figure 10:
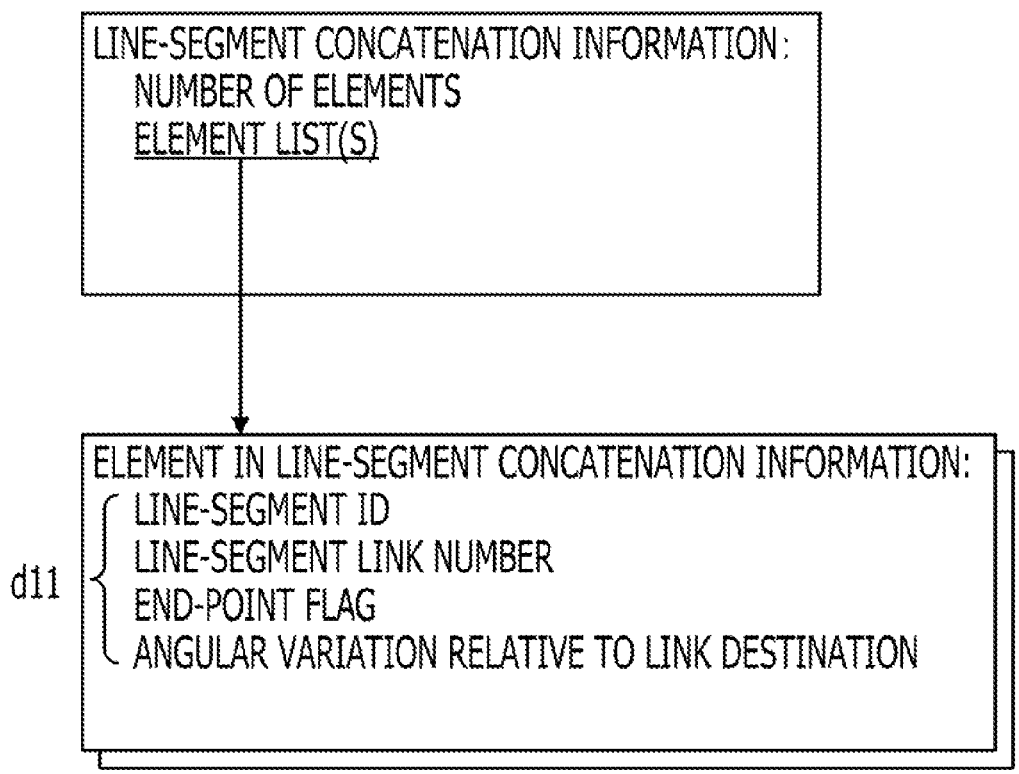
FIG. 10 illustrates one example of the data structure of line-segment concatenation information.

FIG. 10 illustrates one example of the data structure of the line-segment concatenation information. In the example illustrated in FIG. 10, the line-segment concatenation information includes the number of elements and an element list or element lists corresponding to the number of elements. The number of elements corresponds to the number of line segments. In FIG. 10, d11 represents data of each element. The data of each element includes a line-segment ID, a line-segment link number, an end-point flag, and an angular variation relative to a link destination.

The line-segment link number represents the number of a link from the end point extracted by the line-segment coupling. The end-point flag indicates to which of the end points pt1 and pt2 of the line segment with a corresponding line-segment ID the line segment of interest is linked.

Referring back to FIG. 2, the arc detector 203 obtains the line-segment concatenation information and extracts a line-segment concatenation whose line-segment angular variations are in the same direction and whose number of elements is larger than or equal to a threshold. More specifically, on the basis of the obtained line-segment concatenation information, the arc detector 203 first determines whether or not a line-segment concatenation has line-segment angular variations in the same direction. When the line-segment concatenation has line-segment angular variations in the same direction, the arc detector 203 counts the number of line segments included in the line-segment concatenation. When the count value is more than or equal to a threshold, the arc detector 203 detects, as a part (an arc) of an ellipse, the line segments included in the line-segment concatenation having line-segment angular variations in the same direction.

When the arcs detected by the arc detector 203 satisfy a predetermined condition, the ellipse detector 204 combines the arcs and detects an ellipse from the combination result. Even when a segment of an ellipse is missing, the ellipse detector 204 may detect it as an ellipse. When the concatenator 212 concatenates the line segments to make a circuit, the ellipse detector 204 obtains the line-segment concatenation information of the line segments making a circuit and performs processing for checking whether or not the line segments form an ellipse.

<Operations>

Figure 11:
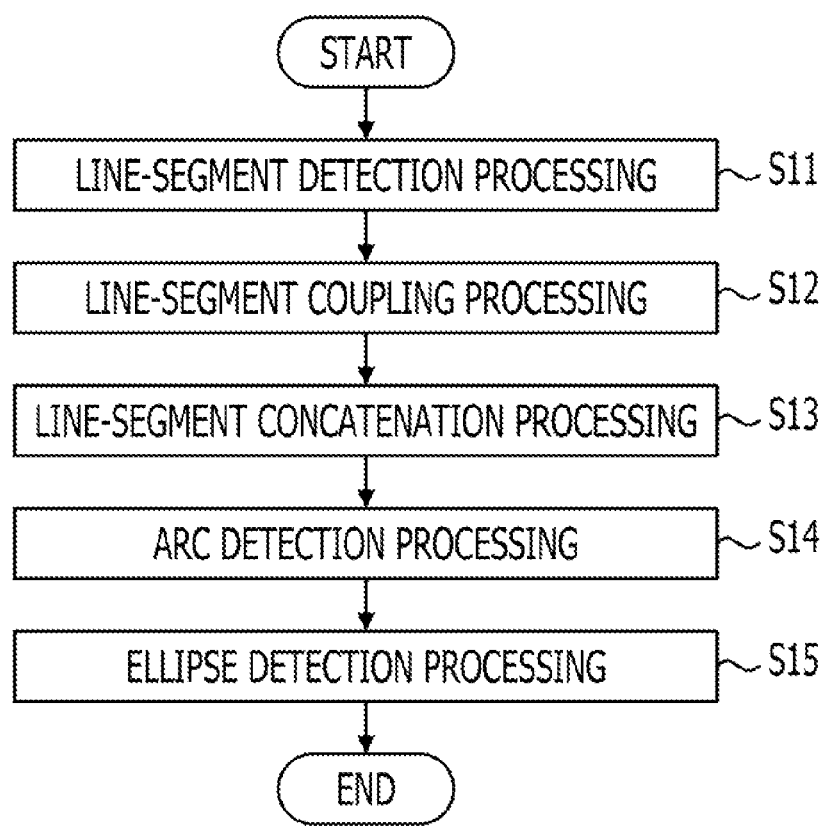
FIG. 11 is a flowchart illustrating one example of ellipse detection processing in a first embodiment.

Operations of the arc detecting apparatus 10 will be described next. FIG. 11 is a flowchart illustrating one example of ellipse detection processing in the first embodiment. As illustrated in FIG. 11, in operation S11, the line-segment detector 201 detects line segments from an obtained image. A known technique may be used for this line-segment detection processing.

In operation S12, the coupler 211 determines whether or not any of all of the detected line segments can be coupled together, on the basis of the positions and the angles of the line segments. The coupler 211 couples the line segments determined to be line segments that can be coupled together, generates line-segment coupling information thereof, and holds the generated line-segment coupling information.

In operation S13, on the basis of the line-segment coupling information, the concatenator 212 determines whether or not the coupled line segments are to be concatenated together. The concatenator 212 concatenates the line segments determined to be concatenated together, generates line-segment concatenation information thereof, and holds the generated line-segment concatenation information.

In operation S14, on the basis of the line-segment concatenation information, the arc detector 203 extracts a line-segment concatenation whose line-segment angular variations are in the same direction. The arc detector 203 then determines whether or not the number of line segments of the line-segment concatenation is larger than or equal to a threshold. The arc detector 203 detects, as an arc, the line segments included in the line-segment concatenation whose line-segment angular variations are in the same direction and whose number of elements is larger than or equal to the threshold.

In operation S15, the ellipse detector 204 combines the detected arcs together when they satisfy predetermined conditions. The ellipse detector 204 detects an ellipse on the basis of the combination. Operations S12 to S15 are described below in more detail.

(1) Line-Segment Coupling Processing

Figure 12:
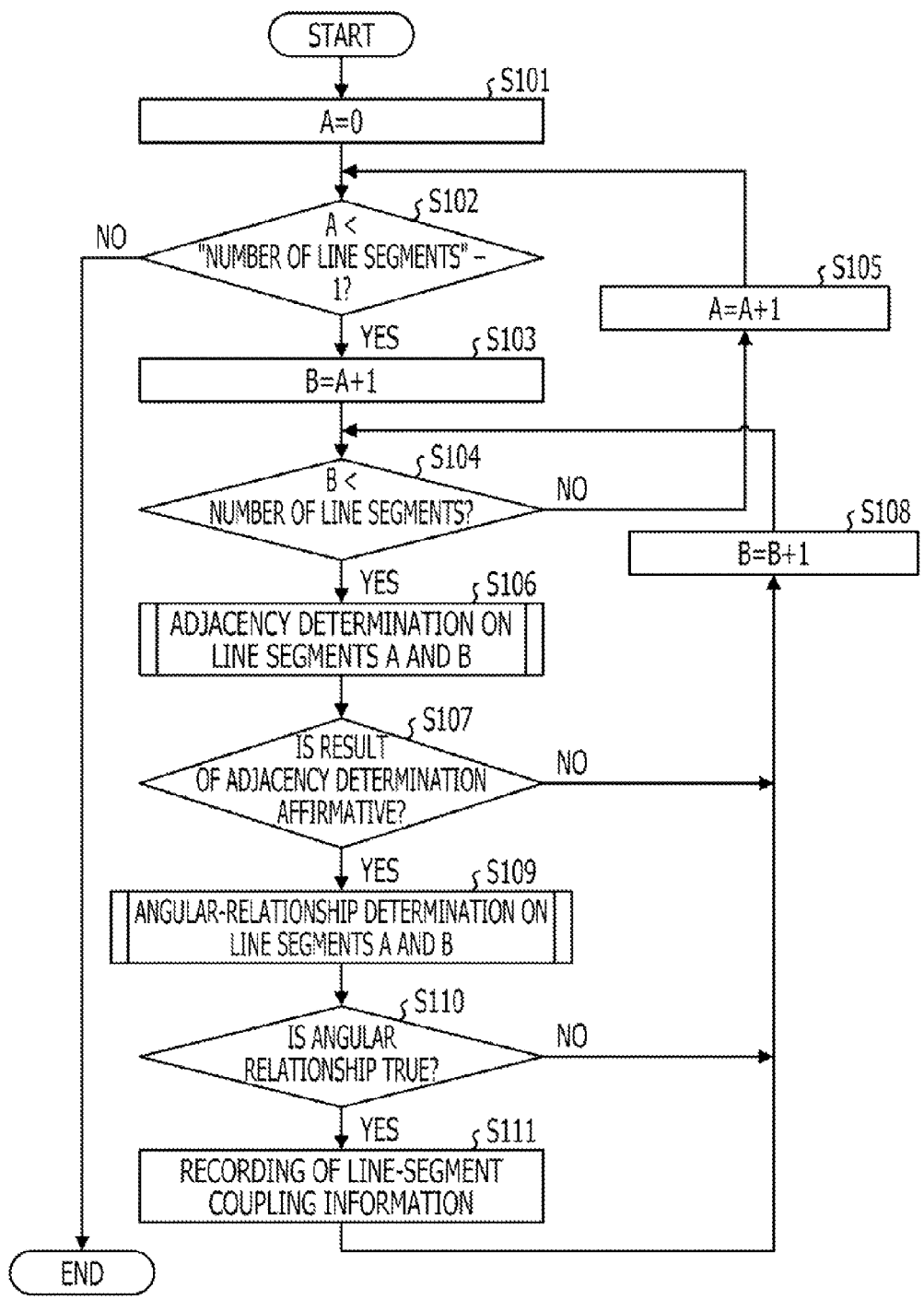
FIG. 12 is a flowchart illustrating one example of line-segment coupling processing in the first embodiment.

FIG. 12 is a flowchart illustrating one example of line-segment coupling processing in the first embodiment. Processing illustrated in FIG. 12 corresponds to operation S12 and is executed on all combinations of the line segments detected by the line-segment detection processing. The detected line segments are given line-segment IDs (e.g., 0, 1, 2, ..., n) for identifying the line segments.

In operation S101, the coupler 211 extracts the line segment with line-segment ID "0" as a line segment "A" and sets A to 0. That is, A is a numeric value corresponding to the line-segment ID.

In operation S102, the coupler 211 obtains the number of line segments detected by the line-segment detector 201. A determination is made as to whether or not A is smaller than "the number of line segments"−1. When A is smaller than "the number of line segments"−1 (YES in operation S102), the process proceeds to operation S103, and when A is larger than or equal to "the number of line segments"−1 (NO in operation S102), the processing ends. In the flowchart, YES is represented by Y and NO is represented by N.

In operation S103, the coupler 211 extracts the line segment with line-segment ID "A+1" as a line segment B and sets B to A+1. That is, B is a numeric value corresponding to the line-segment ID.

In operation S104, the coupler 211 determines whether or not B is smaller than the number of line segments. When B is smaller than the number of line segments (YES in operation S104), the process proceeds to operation S106, and when B is larger than or equal to the number of line segments (NO in operation S104), the process proceeds to operation S105.

In operation S105, the coupler 211 extracts the line segment with line-segment ID "A+1" as a line segment A and sets A to A+1. After operation S105, the process returns to operation S102.

In operation S106, the coupler 211 performs adjacency determination processing on the extracted line segments A and B. The adjacency determination is described below with reference to FIG. 14.

In operation S107, the coupler 211 determines whether or not the result of the adjacency determination on the line segments A and B is affirmative. When the result of the adjacency determination is affirmative, the line segments A and B are adjacent to each other. When the result of the adjacency determination is affirmative (YES in operation S107), the process proceeds to operation S109, and when the result of the adjacency determination is negative (NO in operation S107), the process proceeds to operation S108.

In operation S108, the coupler 211 extracts the line segment with line-segment ID "B+1" as a new line segment "B". That is, the coupler 211 sets B to B+1. After operation S108, the process returns to operation S104.

In operation S109, the coupler 211 performs angular-relationship determination processing on the line segments A and B. The angular-relationship determination is described below with reference to FIG. 15.

In operation S110, the coupler 211 determines whether or not the angular relationship is true. When the angular relationship is true, this refers to a case in which the two line segments have a small angular variation and have a predetermined positional relationship. When the angular relationship is true (YES in operation S110), the process proceeds to operation S111, and when the angular relationship is false (NO in operation S110), the process proceeds to operation S108.

In operation S111, the coupler 211 records the line-segment coupling information to a memory. After operation S111, the process returns to operation S108. As a result of the above-described operations, it is possible to perform line-segment coupling processing on all combinations of line segments and it is possible to hold the line-segment coupling information for the combinations of the associated line segments.

Figure 13:
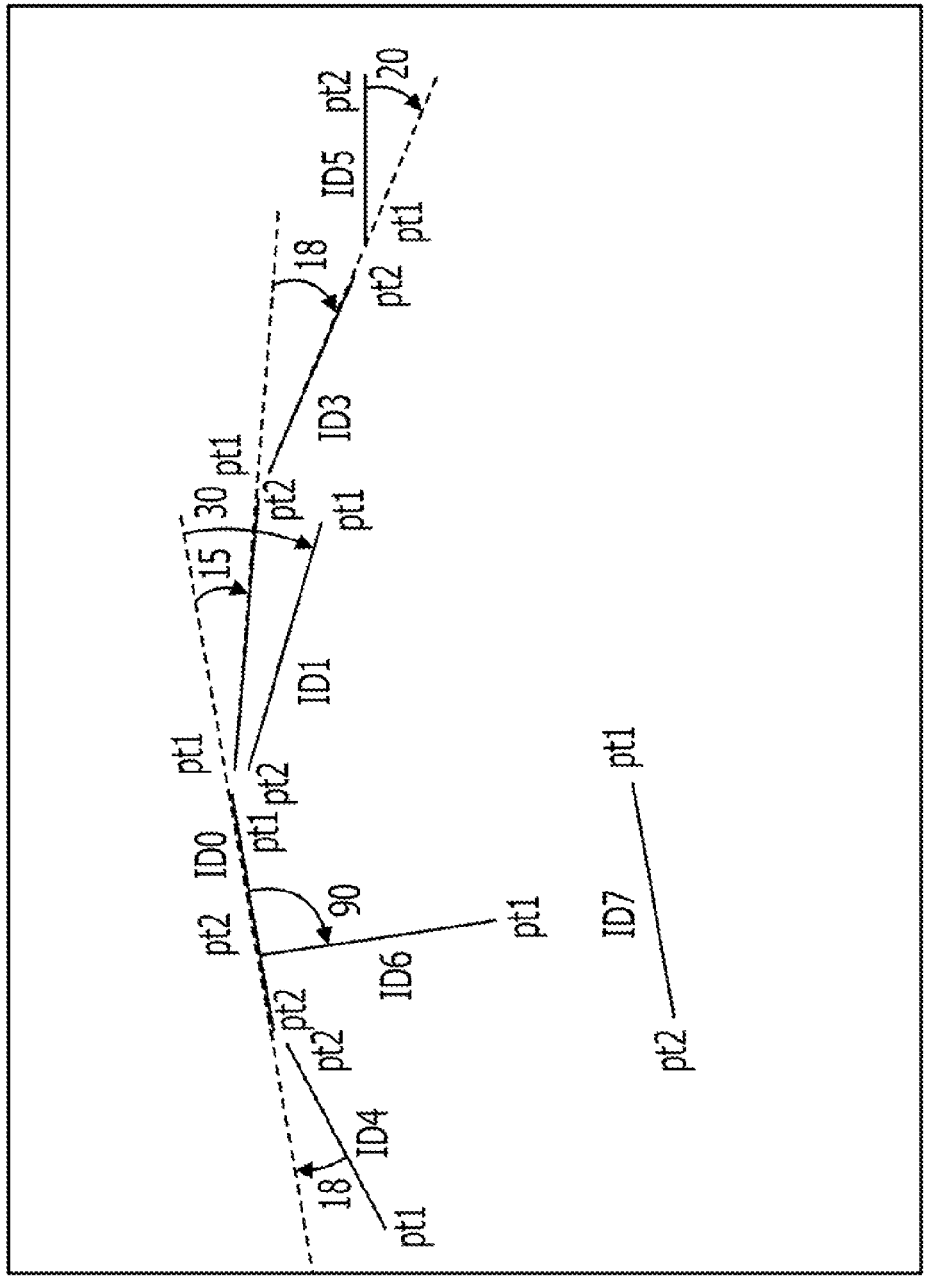
FIG. 13 is a diagram illustrating end points, the positions, and the angles of detected line segments.

Next, the adjacency determination processing and the angular-relationship determination processing will be described in conjunction with a specific example. FIG. 13 is a diagram illustrating the end points, the positions, and the angles of detected line segments. In the example illustrated in FIG. 13, angular variations of adjacent line segments are indicated with respect to line segments IDs "0" to "7".

(1-1) Adjacency Determination Processing

Figure 14:
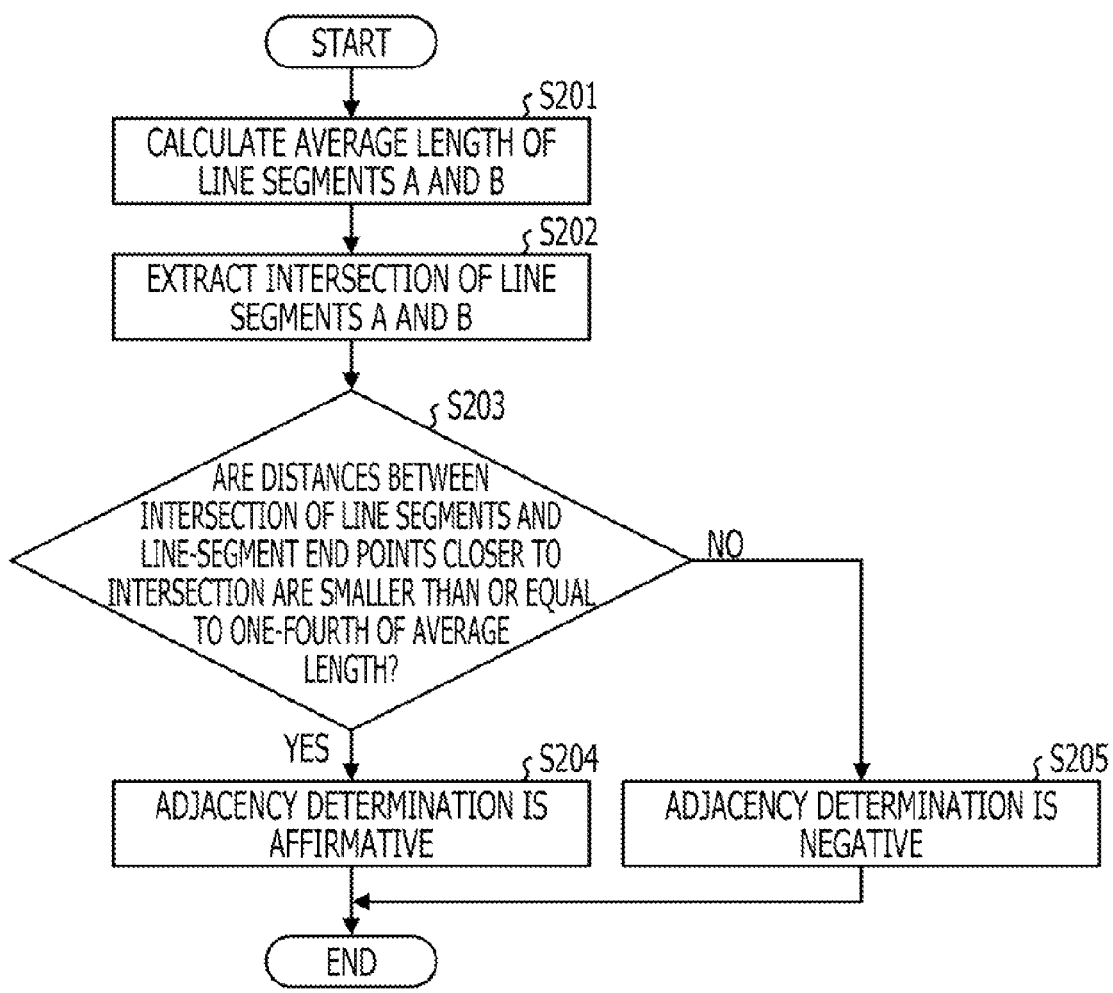
FIG. 14 is a flowchart illustrating one example of adjacency determination processing in the first embodiment.

FIG. 14 is a flowchart illustrating one example of adjacency determination processing in the first embodiment. In operation S201 illustrated in FIG. 14, the coupler 211 calculates an average length of the line segments A and B.

In operation S202, the coupler 211 extracts an intersection of the line segments A and B. When the line segments A and B do not actually intersect each other, the coupler 211 extends the line segments A and B and extracts an intersection on the extended lines.

In operation S203, the coupler 211 determines whether or not the distances between the intersection of the line segments and the line-segment end points closer to the intersection are smaller than or equal to, for example, one-fourth of the average length. When the distances are smaller than or equal to one-fourth of the average length (YES in operation S203), the process proceeds to operation S204, and when the distances are larger than one-fourth of the average length (NO in operation S203), the process proceeds to operation S205. With respect to the numeric value "one fourth", an appropriate value may be empirically determined.

In operation S204, the coupler 211 determines that the result of the adjacency determination on the two line segments is affirmative. In operation S205, the coupler 211 determines that the result of the adjacency determination on the two line segments is negative.

(1-2) Angular-Relationship Determination Processing

Figure 15:
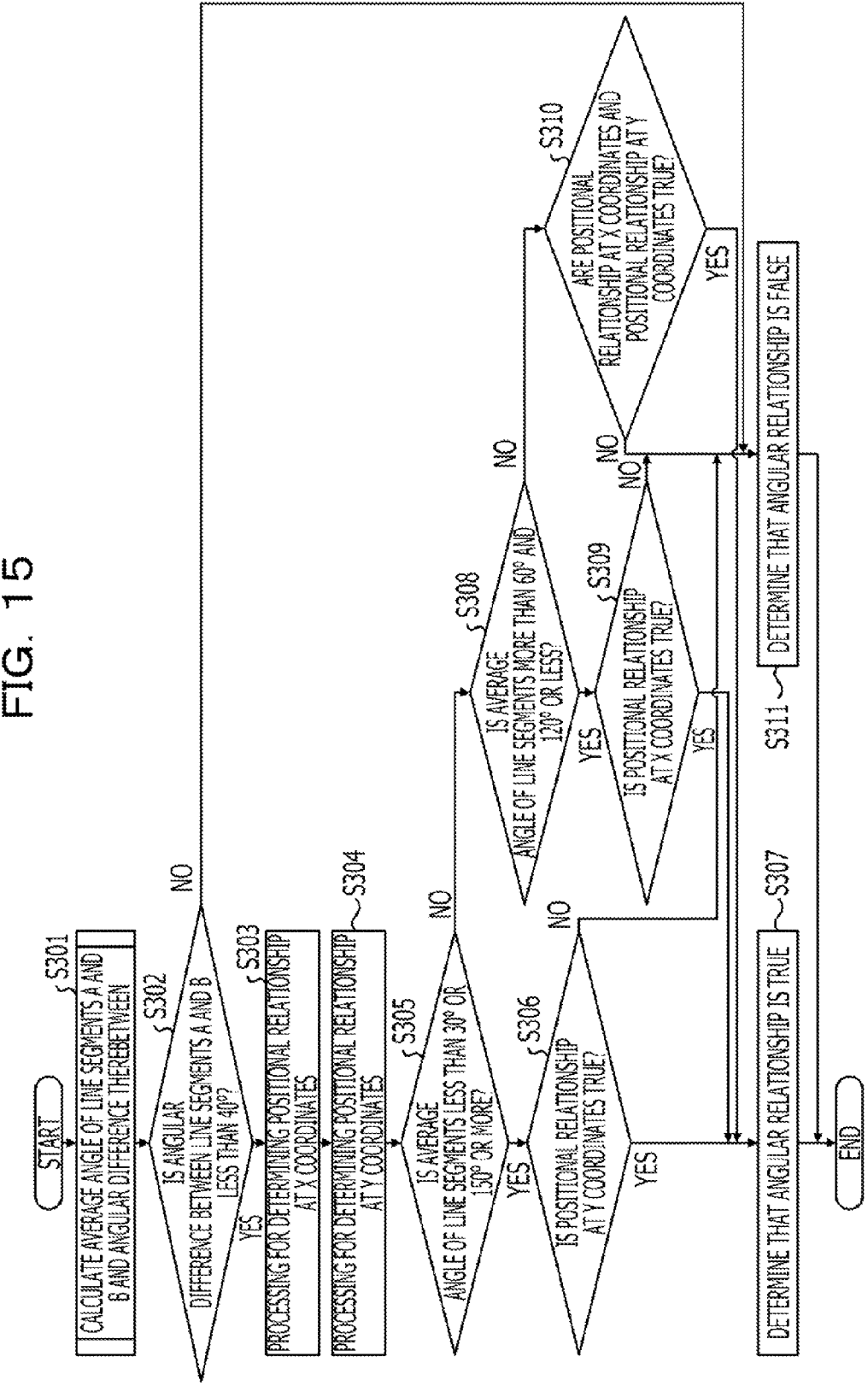
FIG. 15 is a flowchart illustrating one example of angular-relationship detection processing in the first embodiment.

FIG. 15 is a flowchart illustrating one example of the angular-relationship detection processing in the first embodiment. In operation S301 illustrated in FIG. 15, the coupler 211 calculates an average angle of the line segments A and B and an angular difference therebetween. The average angle of the line segments A and B and the angular difference therebetween are described below with reference to FIG. 16.

In operation S302, the coupler 211 determines whether or not the angular difference between the line segments A and B is less than 40°. When the angular difference is less than 40° (YES in operation S302), the process proceeds to operation S303, and when the angular difference is 40° or more (NO in operation S302), the process proceeds to operation S311.

In operation S303, the coupler 211 performs processing for determining a positional relationship at X coordinates. The coupler 211 compares the X coordinates of the middle points of the two line segments, regards the line segment at the left side as a line segment L, and regards the line segment at the right side as a line segment R.

In this case, the coupler 211 determines whether or not the following two conditions are satisfied. One of the conditions is that the X coordinate of the middle point of the line segment L is smaller than the X coordinates of both end points of the line segment R. The other condition is that the X coordinate of the middle point of the line segment R is larger than the X coordinates of both end points of the line segment R. When the two line segments L and R satisfy the two conditions, the coupler 211 determines that the positional relationship at the X coordinates is true. When the two line segments L and R do not satisfy the two conditions, the coupler 211 determines that the positional relationship at the X coordinates is false. For example, with respect to the two line segments, the coupler 211 may set a flag indicating the determination result of the X-coordinate positional relationship.

In operation S304, the coupler 211 performs processing for determining a positional relationship at Y coordinates. The coupler 211 compares the Y coordinates of the middle points of the two line segments, regards the line segment at the upper side as a line segment U, and regards the line segment at the lower side as a line segment D.

In this case, the coupler 211 determines whether or not the following two conditions are satisfied. One of the conditions is that the Y coordinate of the middle point of the line segment U is smaller than the Y coordinates of both end points of the line segment D. The other condition is that the Y coordinate of the middle point of the line segment D is larger than the Y coordinates of both end points of the line segment U. When the two line segments L and R satisfy the two conditions, the coupler 211 determines that the positional relationship at the Y coordinates is true. For example, with respect to the two line segments, the coupler 211 may set a flag indicating that the Y-coordinate positional relationship is true. The value of the Y coordinate on the image increases as it goes downward.

In operation S305, the coupler 211 determines whether or not the average angle of the line segments is less than 30° or is 150° or more. When this condition is satisfied (YES in operation S305), the process of the coupler 211 proceeds to operation S306. On the other hand, when this condition is not satisfied (NO in operation S305), the process of the coupler 211 proceeds to operation S308.

In operation S306, the coupler 211 determines whether or not the positional relationship at the Y coordinates is true. When the positional relationship at the Y coordinates is true (YES in operation S306), the process of the coupler 211 proceeds to operation S307. On the other hand, when the positional relationship at the Y coordinates is false (NO in operation S306), the process of the coupler 211 proceeds to operation S311.

In operation S307, the coupler 211 determines that the angular-relationship of the two line segments is true.

In operation S308, the coupler 211 determines whether or not the average angle of the line segments is more than 60° and 120° or less. When this condition is satisfied (YES in operation S308), the process of the coupler 211 proceeds to operation S309. On the other hand, when this condition is not satisfied (NO in operation S308), the process of the coupler 211 proceeds to operation S310.

In operation S309, the coupler 211 determines whether or not the positional relationship at the X coordinates is true. When the positional relationship at the X coordinates is true (YES in operation S309), the process proceeds to operation S307. When the positional relationship at the X coordinates is false (NO in operation S309), the process proceeds to operation S311.

In operation S310, the coupler 211 determines whether or not the positional relationship at the X coordinates and the positional relationship at the Y coordinates are true. When these conditions are satisfied (YES in operation S310), the process proceeds to operation S307. When the conditions are not satisfied (NO in operation S310), the process proceeds to operation S311.

In operation S311, the coupler 211 determines that the angular relationship of the two line segments is false.

(1-2-1) Average Angle and Angular Difference Calculation

Figure 16:
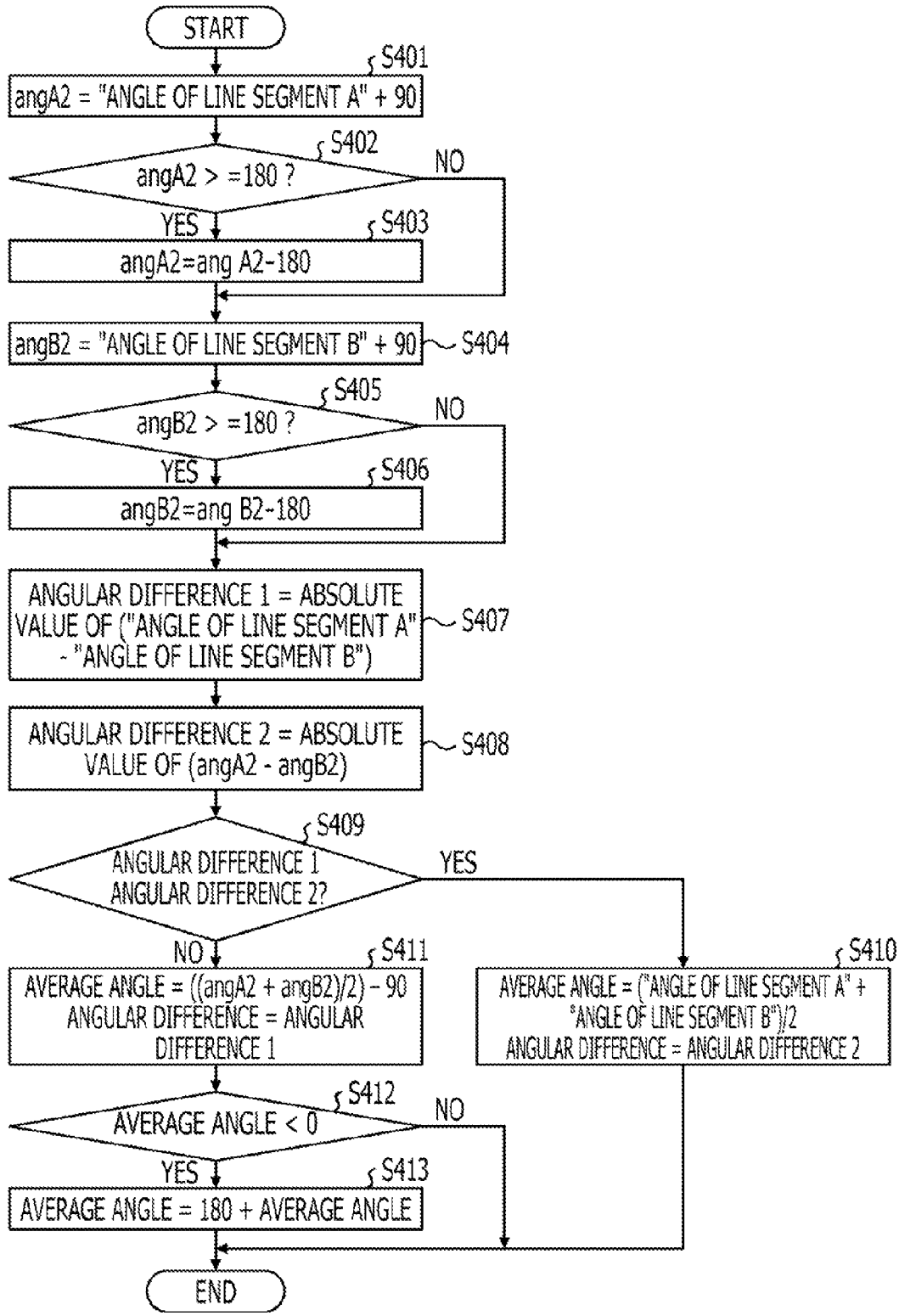
FIG. 16 is a flowchart illustrating one example of average-angle and angular-difference calculation processing.

FIG. 16 is a flowchart illustrating one example of average-angle and angular-difference calculation processing. In operation S401 illustrated in FIG. 16, the coupler 211 calculates $angA2$ such that:

$$angA2 = \text{"Angle of Line Segment } A\text{"} + 90$$

In operation S402, the coupler 211 determines whether or not angA2 is 180° or more. When angA2 is 180° or more (YES in operation S402), the process proceeds to operation S403. On the other hand, when angA2 is less than 180° (NO in operation S402), the process proceeds to operation S404.

In operation S403, the coupler 211 calculates angA2 such that:

angA2=angA2−180

In operation S404, the coupler 211 calculates angB2 such that:

angB2="Angle of Line Segment B"+90

In operation S405, the coupler 211 determines whether or not angB2 is 180° or more. When angB2 is 180° or more (YES in operation S405), the process proceeds to operation S406, and when angB2 is less than 180° (NO in operation S405), the process proceeds to operation S407.

In operation S406, the coupler 211 calculates angB2 such that:

angB2=angB2−180

In operation S407, the coupler 211 calculates an angular difference 1 such that:

Angular Difference 1=Absolute Value of ("Angle of Line Segment A"−"Angle of Line Segment B").

In operation S408, the coupler 211 calculates an angular difference 2 such that:

Angular Difference 2=Absolute Value of (angA2−angB2)

In operation S409, the coupler 211 determines whether or not the angular difference 1 is smaller than or equal to the angular difference 2. When the angular difference 1 is smaller than or equal to the angular difference 2 (YES in operation S409), the process proceeds to operation S410, and when the angular difference 1 is larger than the angular difference 2 (NO in operation S409), the process proceeds to operation S411.

In operation S410, the coupler 211 calculates an average angle such that:

Average Angle=("Angle of Line Segment A"+"Angle of Line Segment B")/2

The coupler 211 calculates an angular difference such that:

Angular Difference=Angular Difference 2

In operation S411, the coupler 211 calculates an average angle such that:

Average Angle=((angA2+angB2)/2)−90

The coupler 211 calculates an angular difference such that:

Angular Difference=Angular Difference 1

In operation S412, the coupler 211 determines whether or not the calculated average angle is less than 0. When the average angle is less than 0 (YES in operation S412), the process proceeds to operation S413, and when the average angle is 0 or more (NO in operation S412), the processing ends.

In operation S413, the coupler 211 modifies the average angle such that:

Average Angle=180+Average Angle

Through the above-described processing, the average angle may be calculated.

FIG. 17 illustrates one example of the line-segment coupling information. The line-segment coupling information illustrated in FIG. 17 indicates a result obtained by performing the line-segment coupling processing on the line segments illustrated in FIG. 13.

As illustrated in FIG. 17, two line segments are linked to the pt1 side of the line segment with line-segment ID "0". That is, linkNum "2" is given to the pt1 side of the line segment with line-segment ID "0". LinkNum indicates the total number of links. Link 0 represents a link with the line segment with line-segment ID "1".

Line-segment link number "link 0" has data of linkId, linkPt, and angle. LinkId represents a line-segment ID of the associated line segment. LinkPt represents an end point of an associated line segment. Angle represents an angular variation from a reference line segment to an associated line segment, and the clockwise direction is defined as a positive direction. In the example illustrated in FIG. 17, the reference line segment is the line segment with line-segment ID "0" and the associated line segment is the line segment with line-segment ID "1".

Line-segment link number "link 0" has data of linkId "1", linkPt "pt2", and angle "30". Line-segment link number "link 1" represents a link with the line segment with line-segment ID "2". Line-segment link number "link 1" has data of linkId "2", linkPt "pt1", and angle "15".

As illustrated in FIG. 17, one line segment is associated (linked) with the pt2 side of the line segment with line-segment ID "0". That is, linkNum "1" is given to the pt2 side of the line segment with line-segment ID "0". Link 0 represents a link with a line segment with line-segment ID "4". Link 0 has data of linkId "4", linkPt "pt2", and angle "−18". As illustrated in FIG. 17, the coupler 211 generates line-segment coupling information for all line segments.

(2) Line-Segment Concatenating Processing

Figure 18:
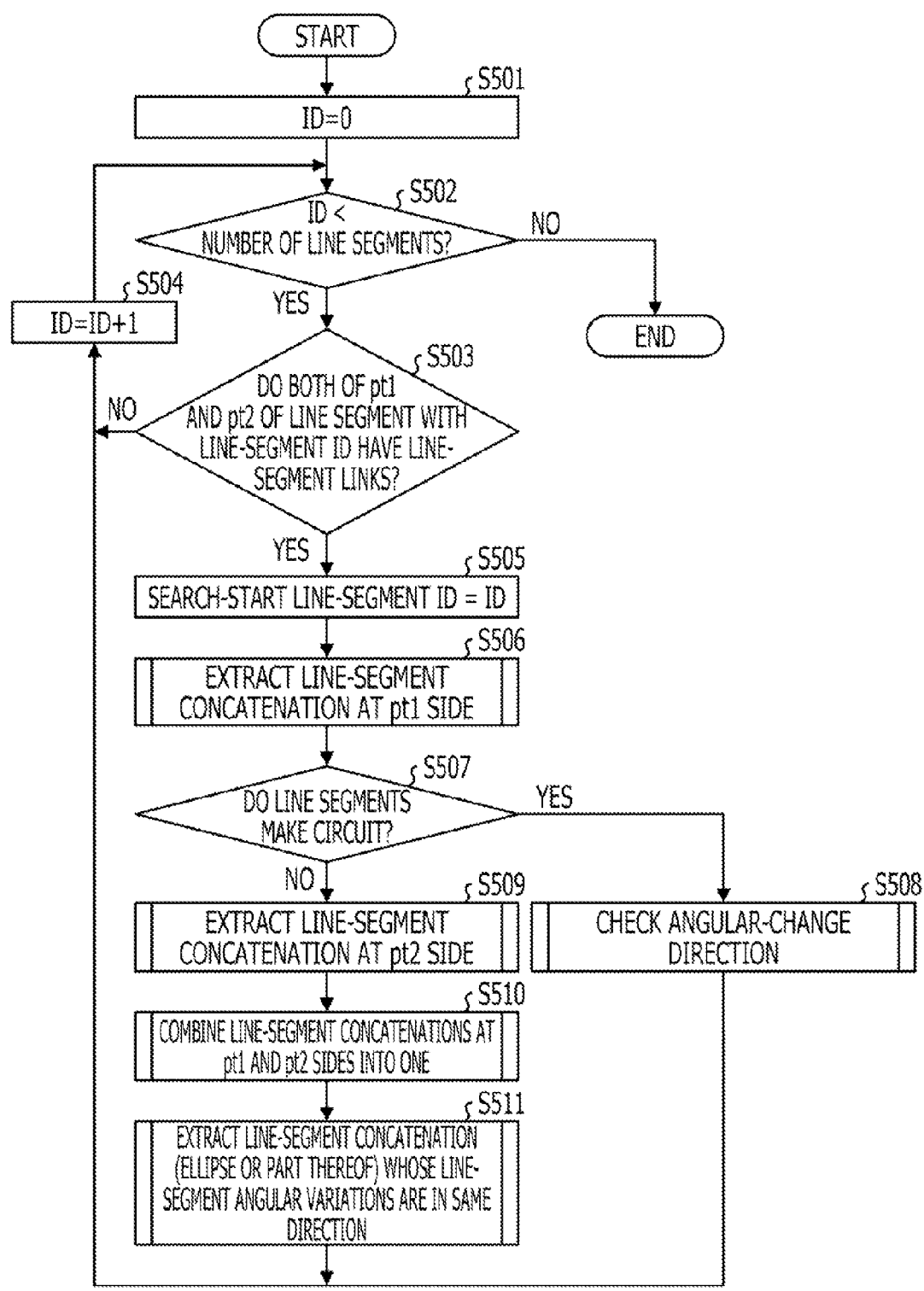
FIG. 18 is a flowchart illustrating one example of line-segment concatenation processing in the first embodiment.

FIG. 18 is a flowchart illustrating one example of line-segment concatenating processing in the first embodiment. The processing illustrated in FIG. 18 corresponds to operations S13 and S14 illustrated in FIG. 11. In operation S501 illustrated in FIG. 18, the concatenator 212 sets an ID of a line-segment to be searched to "0" for initialization.

In operation S502, the concatenator 212 determines whether or not the ID is smaller than the number of all line segments. When the ID is smaller than the number of all line segments (YES in operation S502), the process proceeds to operation S503, and when the ID is larger than or equal to the number of all line segments (NO in operation S502), the processing ends.

In operation S503, the concatenator 212 determines whether or not both of pt1 and pt2 of the line segment with the same line-segment ID as the ID of interest have line-segment links. When both of pt1 and pt2 have line-segment links, this refers to a case in which the line segment of interest is associated (linked) with other line segments. When both of pt1 and pt2 have line-segment links (YES in operation S503), the process proceeds to operation S505, and when both of the pt1 and pt2 do not have line-segment links (NO in operation S503), the process proceeds to operation S504.

In operation S504, the concatenator 212 adds 1 to the ID. After operation S504, the process returns to operation S502.

In operation S505, the concatenator 212 sets the search-start line-segment ID as the ID. In operation S506, the concatenator 212 performs line-segment concatenation extraction processing for increasing the number of line-segment links at the pt1 side of the line segment having the same line-segment ID as the search-start line-segment ID. The line-segment concatenation extraction processing is described below with reference to FIG. 19.

In operation S507, the concatenator 212 determines whether or not the line segments make a circuit as a result of the increase in the number of line-segment links. In this case, when the line-segment ID returns to the same line-segment ID as the search-start line-segment ID, the concatenator 212 may determine that the line segments make a circuit. When the line segments make a circuit (YES in operation S507), the process proceeds to operation S508, and when the line segments do not make a circuit (NO in operation S507), the process proceeds to operation S509.

In operation S508, the ellipse detector 204 performs processing for checking an angular-variation direction. The processing for checking the angular-variation direction is described below with reference to FIG. 27.

In operation S509, the concatenator 212 performs line-segment concatenation extraction processing at the pt2 side of the line segment having the same line-segment ID as the search-start line-segment ID. The line-segment concatenation extraction processing is described below with reference to FIG. 19.

In operation S510, the concatenator 212 combines the concatenation at the pt1 side and the concatenation at the pt2 side into one. This processing is described below with reference to FIG. 21.

In operation S511, the arc detector 203 detects, from the single line-segment concatenation combined in operation S510, a line-segment concatenation whose line-segment angular variations are in the same direction and whose number of line segments is larger than or equal to a threshold. The detected line-segment concatenation is an arc and can form a part of an ellipse. This processing is described below with reference to arc detection processing illustrated in FIG. 22. Operation S511 corresponds to operation S14 illustrated in FIG. 11.

After operation S511, the process proceeds to operation S504 and the processing is executed on all line segments.

(2-1) Line-Segment Concatenation Extraction Processing

Figure 19:
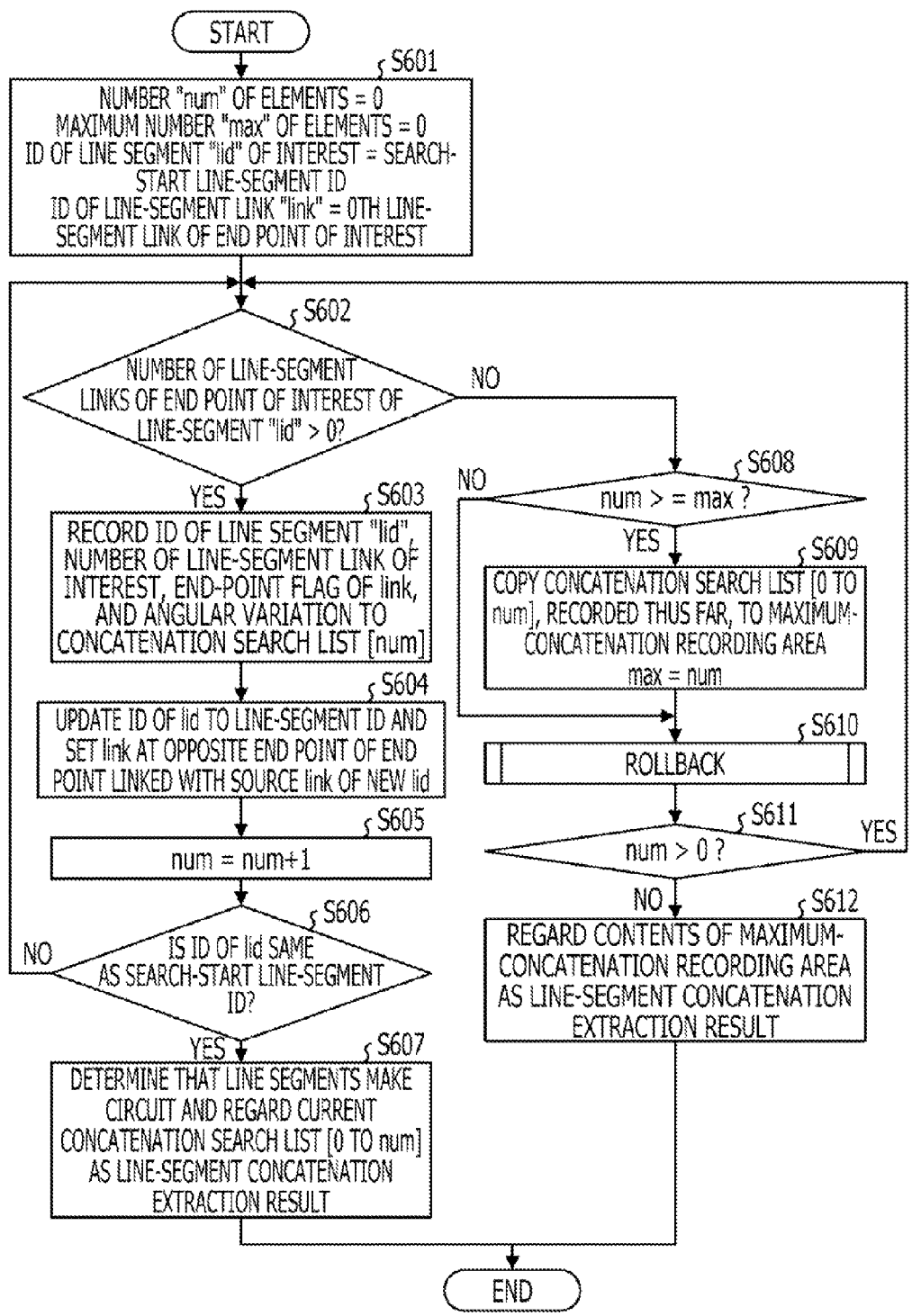
FIG. 19 is a flowchart illustrating one example of line-segment concatenation extraction processing in the first embodiment.

FIG. 19 is a flowchart illustrating one example of the line-segment concatenation extraction processing in the first embodiment. In operation S601 illustrated in FIG. 19, the concatenator 212 performs initialization for searching for a line-segment concatenation. For example, the number "num" of elements=0, a maximum number "max" of elements=0, the ID of a line segment "lid" of interest=a search-start line-segment ID, and a line-segment link "link"=the zeroth line-segment link at an end point of interest are set.

In operation S602, the concatenator 212 determines whether or not the number of line-segment links of an end point of interest of the line segment "lid" of interest is larger than 0. When the number of line-segment links is larger than 0 (YES in operation S602), the process proceeds to operation S603, and when the number of line-segment links is 0 (NO in operation S602), the process proceeds to operation S608.

In operation S603, the concatenator 212 records the ID of the line segment "lid" of interest, the number of the line-segment link of interest, an end-point flag of the line-segment link "link", and an angular variation to a concatenation search list [num].

In operation S604, the concatenator 212 updates the ID of the line-segment "lid" of interest to the line-segment ID of the link destination. The concatenator 212 also sets the line segment link "link" at the opposite end point of the end point linked with the source line-segment link "link" of the new line segment "lid". For example, in the case of FIG. 13, when line-segment ID "0" is updated to line-segment ID "1", the line-segment link "link" is updated from pt1 of the line segment with line-segment ID "0" to pt1 of the line segment with line-segment ID "1". That is, the new line-segment link "link" is set at the opposite side of the end point at which the line segment with line-segment ID "1" is linked with the line segment with line-segment ID "0".

In operation S605, the concatenator 212 adds 1 to num, which indicates the number of links.

In operation S606, a determination is made as to whether or not the ID of the line segment "lid" of interest is the same as the search-start line-segment ID. When the ID of the line-segment "lid" of interest is the same as the search-start line-segment ID (YES in operation S606), the process proceeds to operation S607, and when the ID of the line-segment "lid" of interest is different from the search-start line-segment ID (NO in operation S606), the process returns to operation S602.

In operation S607, the concatenator 212 determines that the line segments make a complete circuit and regards the current concatenation search list [0 to num] as a line-segment concatenation extraction result.

In operation S608, the concatenator 212 determines whether or not the number "num" of elements is larger than or equal to the maximum number "max" of elements. When the number "num" of elements is larger than or equal to the maximum number "max" of elements (YES in operation S608), the process proceeds to operation S609, and when the number "num" of elements is smaller than the maximum number "max" of elements (NO in operation S608), the process proceeds to operation S610.

In operation S609, the concatenator 212 records the concatenation search list [0 to num], recorded in operation S603, to a predetermined recording area. This predetermined recording area will hereinafter be referred to as a "maximum-concatenation recording area". The concatenation search list serves as the line-segment concatenation information.

In operation S610, the concatenator 212 performs rollback processing. The rollback processing is processing for tracing back links with respect to a concatenation branching from the line-segment concatenation. The rollback processing is described below with reference to FIG. 20.

In operation S611, the concatenator 212 determines whether or not num is larger than 0. When num is larger than 0 (YES in operation S611), the process returns to operation S602, and when num is 0 (NO in operation S611), the process proceeds to operation S612.

In operation S612, the concatenator 212 regards the concatenation search list, recorded in the maximum-concatenation recording area, as a line-segment concatenation extraction result.

By performing the above-described operations, the concatenator 212 can extract a longest line-segment concatenation from the search-start line segments.

(2-1-1) Rollback Processing

Figure 20:
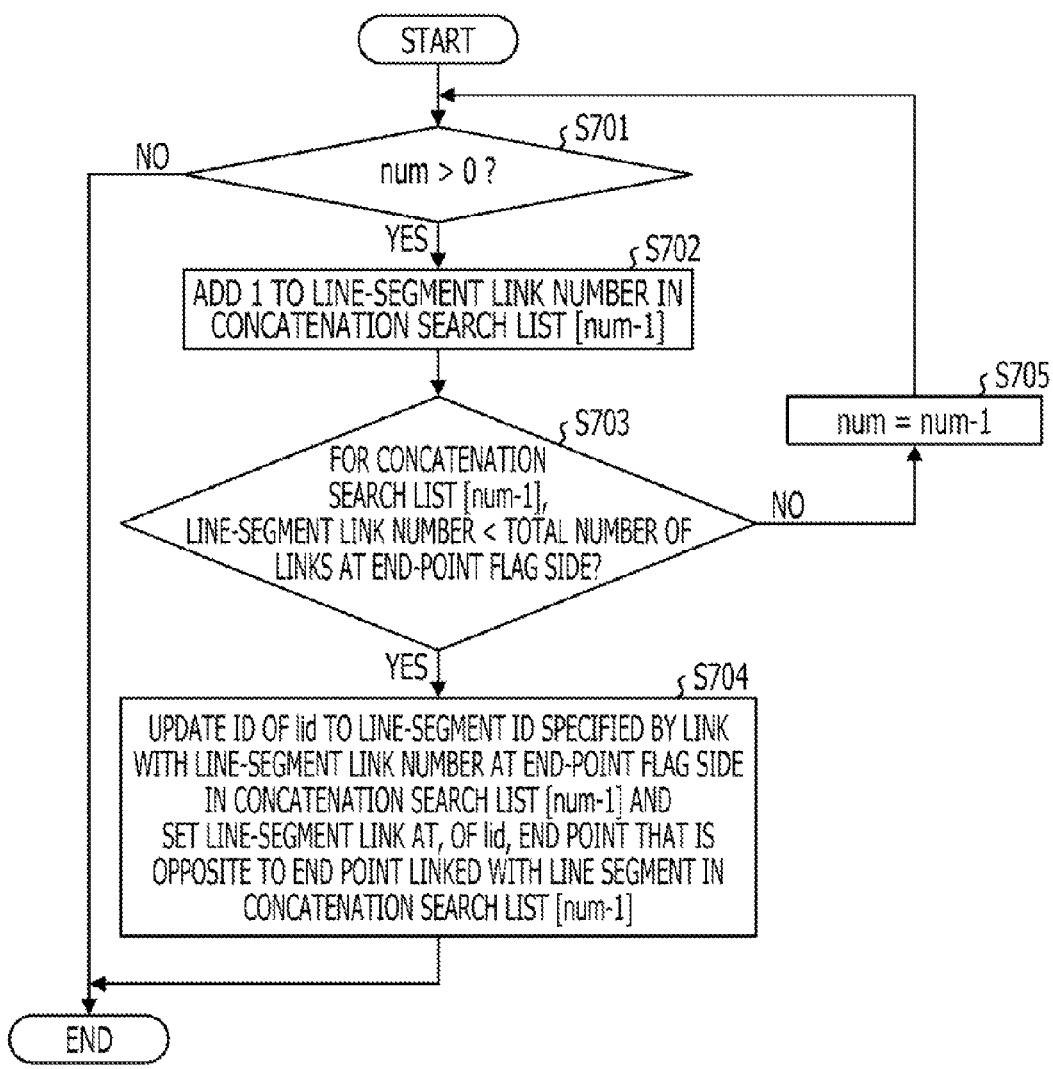
FIG. 20 is a flowchart illustrating one example of rollback processing in the first embodiment.

FIG. 20 is a flowchart illustrating one example of the rollback processing in the first embodiment. In operation S701 illustrated in FIG. 20, the concatenator 212 determines whether or not num is larger than 0. When num is larger than 0 (YES in operation S701), the process proceeds to operation S702, and when num is 0 (NO in operation S701), the processing ends.

In operation S702, the concatenator 212 adds 1 to the line-segment link number in the concatenation search list [num−1]. This is processing for returning to the line segment immediately preceding the end of the line-segment concatenation and searching for a line segment branching from the line segment.

In operation S703, with respect to the concatenation search list [num−1], the concatenator 212 determines whether or not the line-segment link number is smaller than the total number of links at the end-point flag side. When the line-segment link number is smaller than the total number of links at the end-point flag side (YES in operation S703), the process proceeds to operation S704, and when the line-segment link number is larger than or equal to the total number of links at the end-point flag side (NO in operation S703), the process proceeds to operation S705.

In operation S704, the concatenator 212 updates the ID of the line segment "lid" of interest to the line-segment ID specified by the link with the line-segment link number at the end-point flag side in the concatenation search list [num−1]. The concatenator 212 sets the line-segment link at, of the line segment "lid" of interest, the end point that is opposite to the end point linked with the line segment in the concatenation search list [num−1]. This operation is performed in order to start concatenation search processing on the line segment branched from the line segment preceding the last line segment of the line-segment concatenation.

In operation S705, the concatenator 212 subtracts 1 from num. After operation S705, the process returns to operation S701. In the operations described above, when the processing returns to the search-start line segment through tracing back from the maximum concatenation (in operation S705) or when operation S704 is completed, the rollback processing ends.

(2-2) Processing for Combining Line-Segment Concatenations into One

Figure 21:
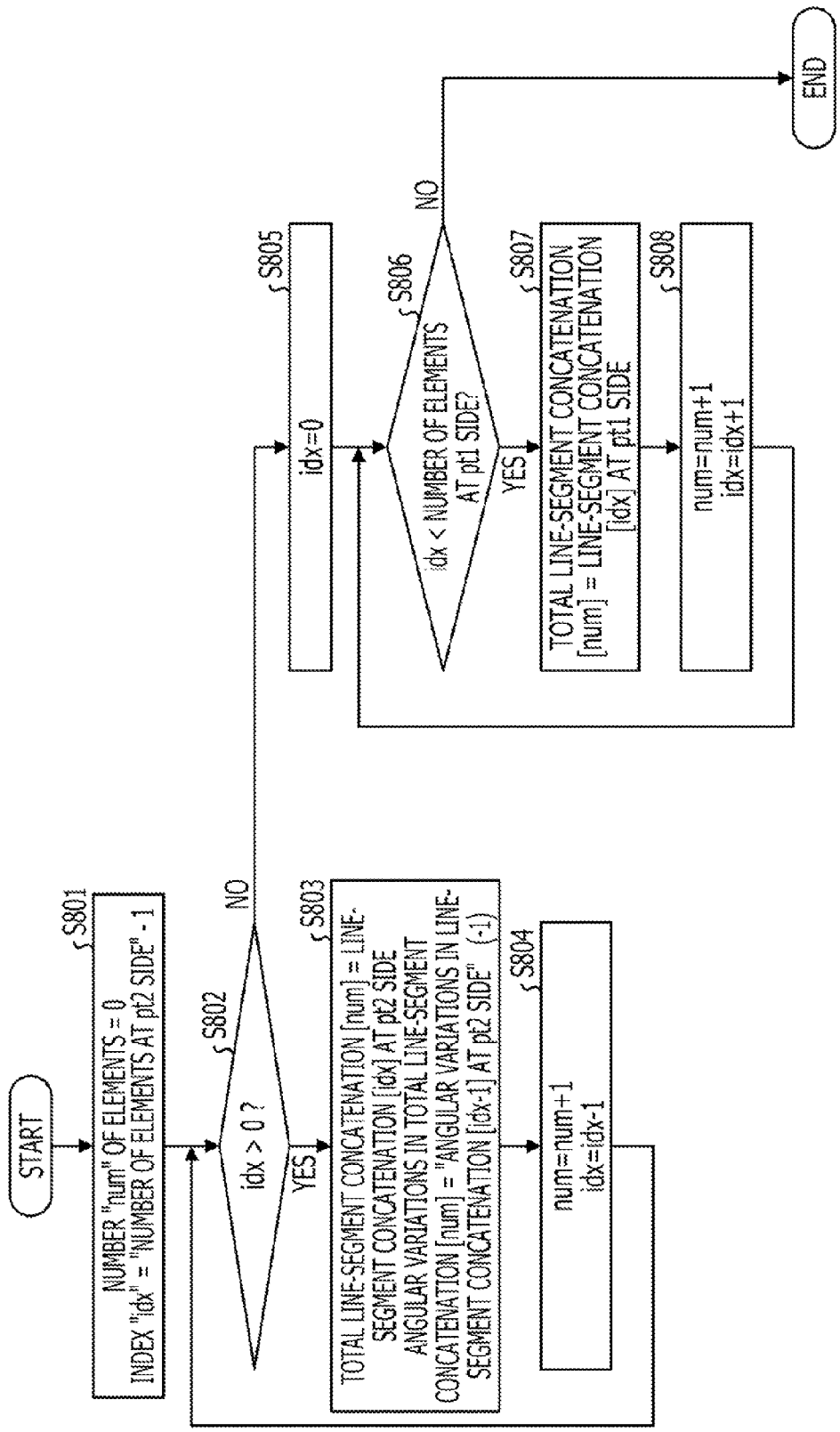
FIG. 21 is a flowchart illustrating one example of processing for combining line-segment concatenations into one in the first embodiment.

FIG. 21 is a flowchart illustrating one example of processing for combining line-segment concatenations into one in the first embodiment. In operation S801 illustrated in FIG. 21, the concatenator 212 performs initialization for performing the processing. For example, the number "num" of elements=0 and index "idx"="the number of elements at pt2 side"−1 are set.

In operation S802, the concatenator 212 determines whether or not idx is larger than 0. When idx is larger than 0 (YES in operation S802), the process proceeds to operation S803, and when idx is smaller than or equal to 0 (NO in operation S802), the process proceeds to operation S805.

In operation S803, the concatenator 212 performs calculations below:

Total Line-Segment Concatenation [num]=Line-Segment Concatenation [idx] at pt2 Side.

Angular Variations in Total Line-Segment Concatenation [num]="Angular Variations in Line-Segment Concatenation [idx−1] at pt2 Side"×(−1)

The line-segment concatenation [ ] corresponds to the concatenation search list [ ] that is the extraction result obtained in processing S612 illustrated in FIG. 19. Since the line-segment concatenation is traced back in the opposite direction, this processing is performed in order to interchange the polarities (+, −) of the angles.

In operation S804, the concatenator 212 performs calculations below:

num=num+1 idx=idx−1

After operation S804, the process returns to operation S802.

In operation S805, the concatenator 212 sets idx to 0. In operation S806, the concatenator 212 determines whether or not idx is smaller than the number of elements at the pt1 side. When idx is smaller than the number of elements at the pt1 side (YES in operation S806), the process proceeds to operation S807, and when idx is larger than or equal to the number of elements at the pt1 side (NO in operation S806), the processing ends.

In operation S807, the concatenator 212 performs a calculation below:

Total Line-Segment Concatenation [num]=Line-Segment Concatenation [idx] at pt1 Side.

In operation S808, the concatenator 212 performs calculations below:

num=num+1 idx=idx+1

After operation S808, the process returns to operation S806.

As a result of the processing described above, it is possible to combine the line-segment concatenation at the pt1 side and the line-segment concatenation at the pt2 side into one.

(3) Arc Detection Processing

Figure 22:
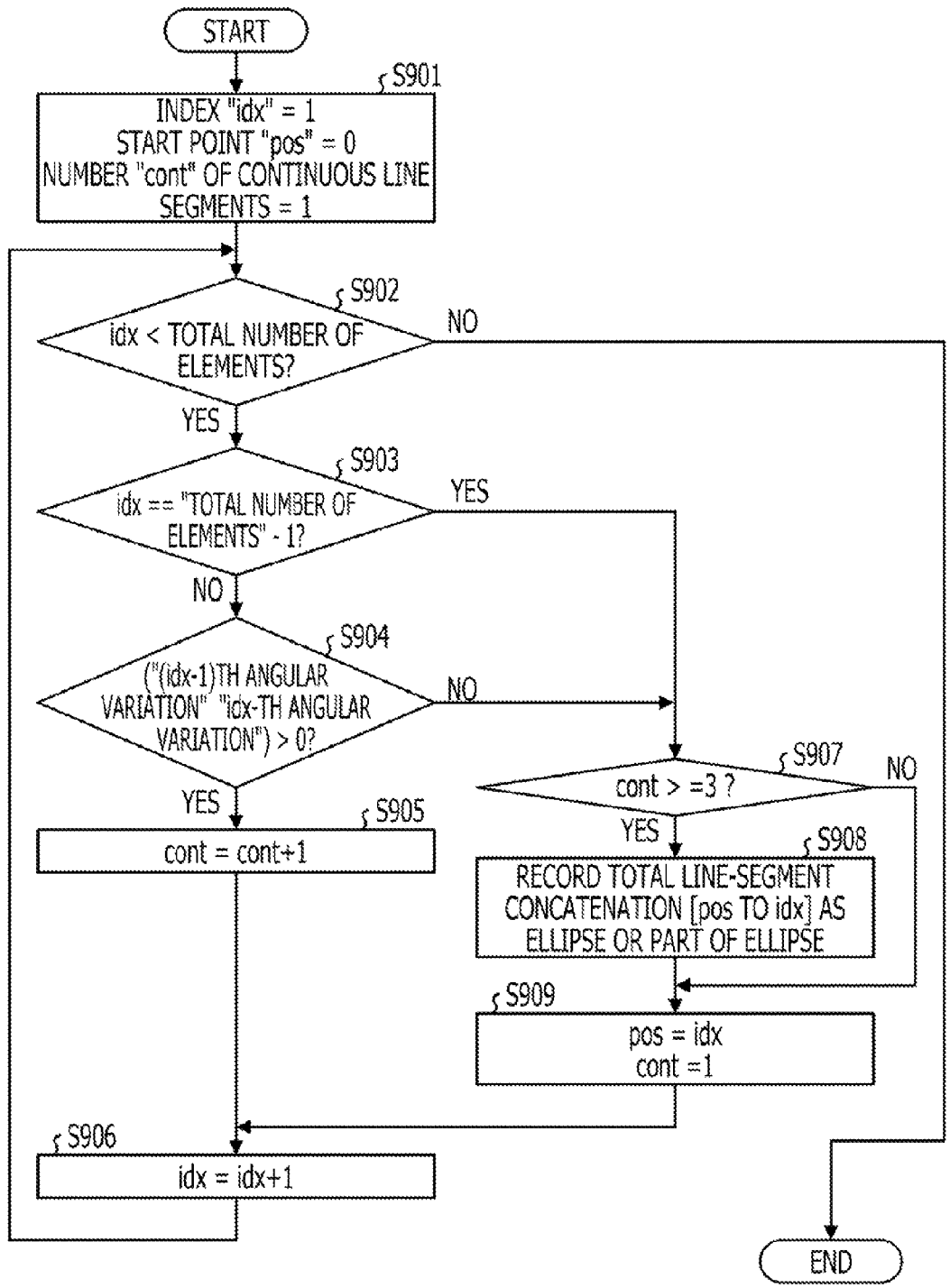
FIG. 22 is a flowchart illustrating one example of arc detection processing in the first embodiment.

FIG. 22 is a flowchart illustrating one example of arc detection processing in the first embodiment. The processing illustrated in FIG. 22 corresponds to operation S14 illustrated in FIG. 11. An arc detected in this case is assumed to include an ellipse or a part of an ellipse. In operation S901 illustrated in FIG. 22, the arc detector 203 performs initialization for detecting an arc. For example, the index "idx"=1, a start point "pos"=0, and the number "cont" of continuous line segments whose angular variations are in the same direction=1 are set.

In operation S902, the arc detector 203 determines whether or not idx is smaller than the total number of elements. When idx is smaller than the total number of elements (YES in operation S902), the process proceeds to operation S903, and when idx is larger than or equal to the number of elements (NO in operation S902), the processing ends.

In operation S903, the arc detector 203 determines whether or not idx is equal to "the total number of elements"−1. When idx is equal to "the total number of elements"−1 (YES in operation S903), the process proceeds to operation S907, and when idx is different from "the total number of elements"−1 (NO in operation S903), the process proceeds to operation S904.

In operation S904, the arc detector 203 determines whether or not a value given by "the (idx−1)th angular variation"×"the idx-th angular variation" is larger than 0. When the signs (+, −) of both of the angular variations are the same, the value is positive. When the multiplication value is positive (YES in operation S904), the process proceeds to operation S905, and when the multiplication value is 0 or less (NO in operation S904), the process proceeds to operation S907.

In operation S905, the arc detector 203 adds 1 to cont. In operation S906, the arc detector 203 adds 1 to idx. After operation S906, the process returns to operation S902.

In operation S907, the arc detector 203 determines whether or not cont is 3 or more. When cont is 3 or more (YES in operation S907), the process proceeds to operation S908, and when cont is less than 3 (NO in operation S907), the process proceeds to operation S909.

In operation S908, the arc detector 203 records the total line-segment concatenation [pos to idx] as an arc (an ellipse or a part of an ellipse).

In operation S909, the arc detector 203 performs calculations below:

pos=idx cont=1

After operation S909, the process proceeds to operation S906.

As a result of the above-described processing, a part included in the total line-segment concatenation and having line-segment angular variations in the same direction can be detected as a part of an ellipse.

FIGS. 23A to 23D illustrate one example of data of results of the processing. FIGS. 23A to 23D illustrate results obtained by performing operations S506, S509, S510, and S511 illustrated in FIG. 18 on the line segments illustrated in FIG. 13. In FIGS. 23A to 23D, lineId represents a line-segment ID, linkPt represents an end-point flag, linkId represents a line-segment link number, and angle represents an angular variation.

FIG. 23A illustrates data of a result of operation S506. FIG. 23A illustrates a concatenation extraction result at the pt1 side of the line segment with line-segment ID "0". As illustrated in FIG. 23A, the line segment with line-segment ID (lineId) "2", the line segment with line-segment ID "3", and the line segment with line-segment ID "5" are concatenated at the pt1 side of the line segment with line-segment ID "0". The number of elements indicates the number of links. In this case, the number of elements is 4.

FIG. 23B illustrates data of a result of operation S509. FIG. 23B illustrates a concatenation extraction result at the pt2 side of the line segment with line-segment ID "0". As illustrated in FIG. 23B, the line segment with line-segment ID "4" is concatenated at the pt2 side of the line segment with line-segment ID "0". In this case, the number of elements is 2.

FIG. 23C illustrates data of a result of operation S510. FIG. 23C illustrates an example in which the data illustrated in FIG. 23A and the data illustrated in FIG. 23B are combined into one, except for redundancy. In this case, the number of elements is 5.

FIG. 23D illustrates data of a result of operation S511. FIG. 23D illustrates a result obtained when line segments whose angular variations are in the same direction are extracted from the line-segment concatenation illustrated in FIG. 23C. As illustrated in FIG. 23D, since the sign of the angular variation of the line segment with line-segment ID "5" relative to the line segment with line-segment ID "3" is different from the signs of the angular variations between the other line segments, the line segment with line-segment ID "5" is removed from the list.

(4) Ellipse Detection

Processing described below corresponds to operation S15 illustrated in FIG. 11.

(4-1) Ellipse Position Estimation Processing

FIG. 24 is a flowchart illustrating one example of ellipse position estimation processing in the first embodiment. The processing illustrated in FIG. 24 estimates to which portion of an ellipse an arc (a part of an ellipse) corresponds.

In operation S1001, the ellipse detector 204 turns off flags "up", "down", "left", and "right". In operation S1002, the ellipse detector 204 sets idx to 0.

In operation S1003, the ellipse detector 204 determines whether or not idx is smaller than "the number of elements"−1. When idx is smaller than "the number of elements"−1 (YES in operation S1003), the process proceeds to operation S1004, and when idx is larger than or equal to "the number of elements"−1 (NO in operation S1003), the processing ends.

In operation S1004, the ellipse detector 204 performs setting such that:

$a1$ = Angle of Line Segment of idx-th Element.

$a2$ = Angle of Line Segment of (idx+1)th Element.

In operation S1005, the ellipse detector 204 determines whether or not a first condition or a second condition blow is satisfied.

First Condition: $(45 \leq a1 < 90)$ AND $(90 \leq a2 < 135)$

Second Condition: $(45 \leq a2 < 90)$ AND $(90 \leq a1 < 135)$

When the condition is satisfied (YES in operation S1005), the process proceeds to operation S1008, and when the condition is not satisfied (NO in operation S1005), the process proceeds to operation S1006.

In operation S1006, the ellipse detector 204 determines whether or not a third condition or a fourth condition below is satisfied.

Third Condition: $a1 < 45$ AND $a2 \geq 135$

Fourth Condition: $a2 < 45$ AND $a1 \geq 135$

When the condition is satisfied (YES in operation S1006), the process proceeds to operation S1012, and when the condition is not satisfied (NO in operation S1006), the process proceeds to operation S1007.

In operation S1007, the ellipse detector 204 adds 1 to idx. After operation S1007, the process returns to operation S1003.

In operation S1008, the ellipse detector 204 regards the line segment at the left side as a line segment L, regards the line segment at the right side as a line segment R, and locates an intersection of the two line segments. The ellipse detector 204 regards the Y coordinate of, of the line segment L, the end point closer to the intersection as LY1, regards the Y coordinate of the other end point of the line segment L as LY2, regards the Y coordinate of, of the line segment R, the end point closer to the intersection as RY1, and regards the Y coordinate of the other end point of the line segment R as RY2.

In operation S1009, the ellipse detector 204 determines whether or not a following condition is satisfied. The value of the Y coordinate increases as it goes downward. When $LY1 \leq LY2$ AND $RY1 \leq RY2$ is satisfied (YES in operation S1009), the process proceeds to operation S1010, and when this condition is not satisfied (NO in operation S1009), the process proceeds to operation S1011.

In operation S1010, the ellipse detector 204 turns on the flag "up" and records the coordinates of the intersection.

In operation S1011, the ellipse detector 204 turns on the flag "down" and records the coordinates of the intersection. After operation S1010 or S1011, the process returns to operation S1007.

In operation S1012, the ellipse detector 204 regards the line segment at the upper side as a line segment U, regards the line segment at the lower side as a line segment D, and locates an intersection of the two line segments. The ellipse detector 204 regards the X coordinate of, of the line segment U, the end point closer to the intersection as UX1, regards the X coordinate of the other end point of the line segment U as UX2, regards the X coordinate of, of the line segment D, the end point closer to the intersection as DX1, and regards the X coordinate of the other end point of the line segment D as DX2.

In operation S1013, the ellipse detector 204 determines whether or not a following condition is satisfied. The value of the X coordinate increases as it goes rightward. When $UX1 \leq UX2$ AND $DX1 \leq DX2$ is satisfied (YES in operation S1013), the process proceeds to operation S1014, and when this condition is not satisfied (NO in operation S1013), the process proceeds to operation S1015.

In operation S1014, the ellipse detector 204 turns on the flag "left" and records the coordinates of the intersection.

In operation S1015, the ellipse detector 204 turns on the flag "right" and records the coordinates of the intersection. After operations S1014 and S1015, the process returns to operation S1017.

The above-described processing makes it possible to estimate to which portion of an ellipse the detected part of an ellipse corresponds and also makes it possible to set a flag indicating an estimation result at the portion of the ellipse.

(4-2) Ellipse Detection Processing

Figure 25:
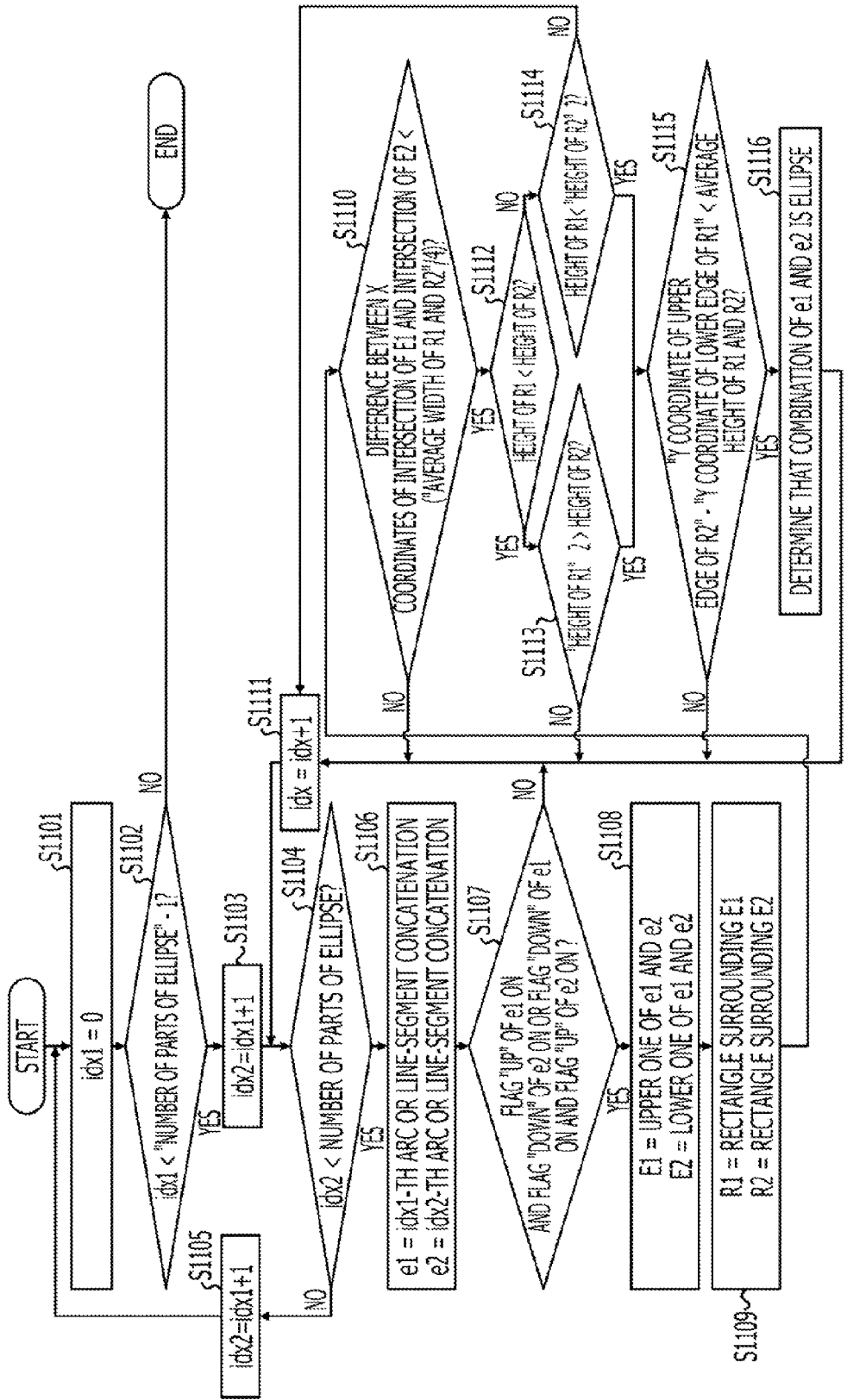
FIG. 25 is a flowchart illustrating one example of ellipse detection processing in the first embodiment.

FIG. 25 is a flowchart illustrating one example of ellipse detection processing in the first embodiment. In operation S1101 illustrated in FIG. 25, the ellipse detector 204 performs initialization for ellipse detection. For example idx1 is set to 0.

In operation S1102, the ellipse detector 204 determines whether or not idx1 is smaller than "the number of parts of an ellipse (i.e., the number of arcs)"−1. When idx1 is smaller than "the number of parts of the ellipse"−1 (YES in operation S1102), the process proceeds to operation S1103, and when idx1 is larger than or equal to "the number of parts of the ellipse"−1 (NO in operation S1102), the processing ends.

In operation S1103, the ellipse detector 204 performs setting such that:

idx2=idx1+1

In operation S1104, the ellipse detector 204 determines whether or not idx2 is smaller than the number of parts of the ellipse. When idx2 is smaller than the number of parts of the ellipse (YES in operation S1104), the process proceeds to operation S1106, and when idx2 is larger than or equal to the number of parts of the ellipse (NO in operation S1104), the process proceeds to operation S1105.

In operation S1105, the ellipse detector 204 adds 1 to idx1. After processing S1105, the process returns to operation S1102.

In operation S1106, the ellipse detector 204 performs setting such that:

e1=idx1-th Arc or Line-Segment Concatenation e2=idx2-th Arc or Line-Segment Concatenation In operation S1107, the ellipse detector 204 determines whether or not one of the following two conditions is satisfied.

The first condition is that the flag "up" for e1 is ON and the flag "down" for e2 is ON.

The second condition is that the flag "down" for e1 is ON and the flag "up" for e2 is ON.

When the condition is satisfied (YES in operation S1107), the process proceeds to operation S1108, and when the condition is not satisfied (NO in operation S1107), the process proceeds to operation S1111.

In operation S1108, the ellipse detector 204 performs setting such that:

E1=Upper One of e1 and e2

E2=Lower One of e1 and e2

In operation S1109, the ellipse detector 204 performs setting such that:

R1=Rectangle Surrounding E1

R2=Rectangle Surrounding E2

In operation S1110, the ellipse detector 204 determines whether or not a following condition is satisfied.

Difference between X Coordinates of Intersection of E1 and Intersection of E2<("Average Width of R1 and R2"/4)

When the condition is satisfied (YES in operation S1110), the process proceeds to operation S1112, and when the condition is not satisfied (NO in operation S1110), the process proceeds to operation S1111. This condition is used to check whether or not the difference between the uppermost intersection and the lowermost intersection is less than one-fourth of the X-direction width of the rectangles surrounding the parts of the ellipse. The numeric value "one fourth" may be changed to another value, as needed.

In operation S1111, the ellipse detector 204 adds 1 to idx2. After operation S1111, the process returns to operation S1104.

In operation S1112, the ellipse detector 204 determines whether or the height of R1 is less than the height of R2. When the height of R1 is less than the height of R2, the process proceeds to operation S1113 (YES in operation S1112), and when the height of R1 is more than or equal to the height of R2 (NO in operation S1112), the process proceeds to operation S1114.

In operation S1113, the ellipse detector 204 determines whether or not twice the height of R1 is more than the height of R2. When the condition is satisfied (YES in operation S1113), the process proceeds to operation S1115, and when the condition is not satisfied (NO in operation S1113), the process proceeds to operation S1111.

In operation S1114, the ellipse detector 204 determines whether or not the height of R1 is less than twice the height of R2. When the condition is satisfied (YES in operation S1114), the process proceeds to operation S1115, and when the condition is not satisfied (NO in operation S1114), the process proceeds to operation S1111.

In operation S1115, the ellipse detector 204 determines whether or not a following condition is satisfied.

"Y Coordinate of Upper Edge of R2"−"Y Coordinate of Lower Edge of R1"<Average of Height of R1 and Height of R2

When the condition is satisfied (YES in operation S1115), the process proceeds to operation S1116, and when the condition is not satisfied (NO in operation S1115), the process proceeds to operation S1111.

In operation S1116, the ellipse detector 204 determines that a combination of e1 and e2 is an ellipse. After operation S1116, the process returns to operation S1111.

The above-described processing makes it possible to determine to which portions of an ellipse the detected parts (arcs) of the ellipse correspond and also makes it possible to detect the ellipse by combining the parts (arcs) of the ellipse. In the above-described processing, when an upper rectangle and a lower rectangle have no large difference in the heights and have no significant difference, a combination of the parts of the ellipse which are included in the rectangles is detected as an ellipse.

Although a case in which parts (arcs) of an ellipse are upper and lower parts of an ellipse has been described above, the above-described processing is also applicable to a case in which parts (arcs) of an ellipse are left and right parts of an ellipse. For example, for a case in which parts of an ellipse are located at the left side and the right side, a combination of the parts can be detected as an ellipse when the upper and lower sides are changed to the left and right sides, X is changed to Y, the height is changed to the width, and the width is changed to the height in the processing illustrated in FIG. 25.

Figure 26B:
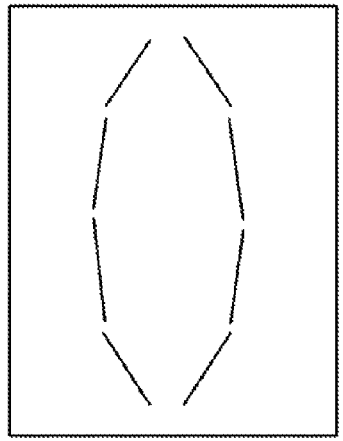
FIGS. 26A to 26D graphically illustrate a procedure for ellipse detection.
Figure 26D:
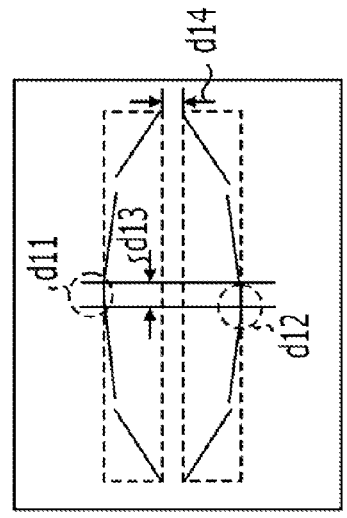
Figure 26A:
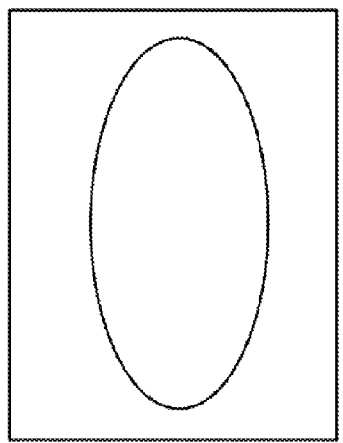

FIGS. 26A to 26D graphically illustrate a procedure for ellipse detection. FIG. 26A illustrates an input image. FIG. 26B illustrates an image resulting from detection of line segments when the line-segment detection processing (in operation S11) illustrated in FIG. 11 is performed on the input image illustrated in FIG. 26A.

Figure 26C:
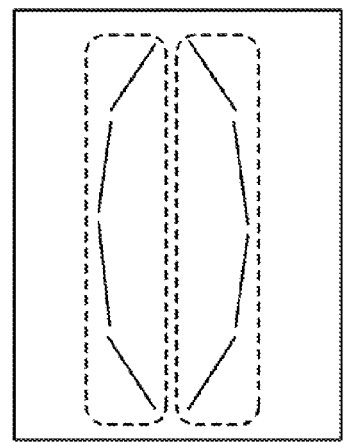

FIG. 26C illustrates an image of a result obtained by performing the line-segment coupling processing (in operation S12), the line-segment concatenation processing (in operation S13), and the arc detection processing (in operation S14) illustrated in FIG. 11 on the line segments illustrated in FIG. 26B. The line segments in dotted-line frames illustrated in FIG. 26C form line-segment concatenations detected as arcs.

FIG. 26D illustrates an image obtained by making a combination determination on the arcs illustrated in FIG. 26C and detecting an ellipse. The dotted-line frames illustrated in FIG. 26D represent rectangles surrounding the corresponding arcs. In FIG. 26D, d11 represents an intersection at an upper part of the ellipse, d12 represents an intersection at a lower part of the ellipse, d13 represents an X coordinate difference at the intersection, and d14 represents a Y coordinate difference between the rectangles ("the Y coordinate of the upper edge of R2"—"the Y coordinate of the lower edge of R1").

(5) Angular Variation Direction Check Processing

Processing when a line-segment concatenation makes a circuit will be described next. This processing is performed when the line-segment concatenation illustrated in FIG. 18 makes a circuit.

FIG. 27 is a flowchart illustrating one example of angular-variation direction check processing in the first embodiment. The processing illustrated in FIG. 27 corresponds to operation S15 illustrated in FIG. 11. In operation S1201 illustrated in FIG. 27, the ellipse detector 204 obtains, from the concatenator 212, the line-segment concatenation information of the line-segment concatenation making a circuit and sets idx to 1.

In operation S1202, the ellipse detector 204 determines whether or not idx is smaller than the number of line-segment concatenations. When idx is smaller than the number of line-segment concatenations (YES in operation S1202), the process proceeds to operation S1203, and when idx is larger than or equal to the number of line-segment concatenations (NO in operation S1202), the process proceeds to operation S1205.

In operation S1203, the ellipse detector 204 determines whether or not a following condition is satisfied.

("Angular Variation of Zeroth Element"×"Angular Variation of idx-th Element")>0

When the signs of the angular variations are the same, the value is positive and it can be regarded that the two line segments have angular variations in the same direction. When the condition is satisfied (YES in operation S1203), the process returns to operation S1202, and when the condition is not satisfied (NO in operation S1203), the process proceeds to operation S1204.

In operation S1204, the ellipse detector 204 determines that this line-segment concatenation making a circuit is not an ellipse. This is because this line-segment concatenation making a circuit has at least one line segment whose angular-variation direction (sign) is different from the others.

In operation S1205, the ellipse detector 204 determines that the line-segment concatenation making a circuit is an ellipse, since all of the line-segment angular variations of the line-segment concatenation making a circuit are in the same direction (sign).

Even when the line segment concatenation makes a circuit, the above-described processing makes it possible to appropriately detect an ellipse.

Figure 28B:
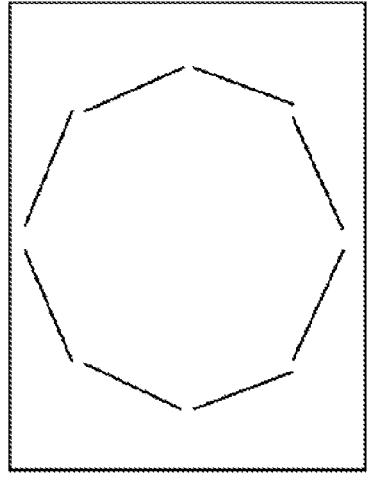
FIGS. 28A to 28D graphically illustrate another procedure for the ellipse detection.
Figure 28D:
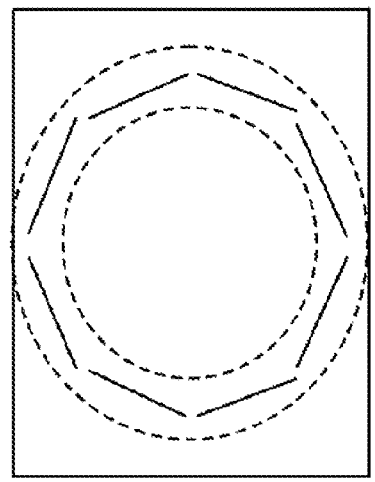
Figure 28A:
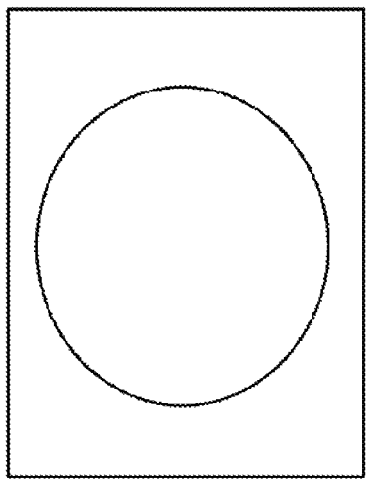

FIGS. 28A to 28D graphically illustrate another procedure for the ellipse detection. FIG. 28A illustrates an input image. FIG. 28B illustrates an image resulting from detection of line segments when the line-segment detection processing (in operation S11) illustrated in FIG. 11 is performed on the input image illustrated in FIG. 28A.

Figure 28C:
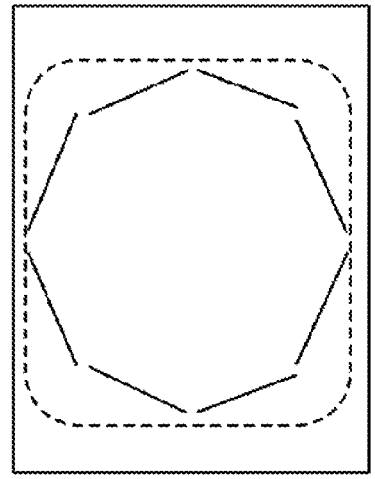

FIG. 28C illustrates an image of a result obtained by performing the line-segment coupling processing (in operation S12) and the line-segment concatenation processing (in operation S13) illustrated in FIG. 11 on the line segments illustrated in FIG. 28B. The line segments in dotted-line frames illustrated in FIG. 28C form a line-segment concatenation making a circuit.

FIG. 28D illustrates an image obtained by checking a direction in the angular variation in the line-segment concatenation illustrated in FIG. 28C and detecting an ellipse therefrom.

Figure 29A:
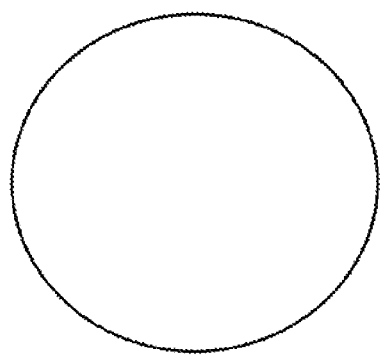
FIGS. 29A and 29B illustrate graphics when a line-segment concatenation makes a circuit.
Figure 29B:
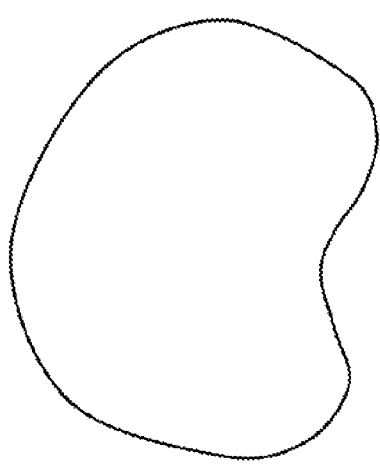

FIGS. 29A and 29B illustrate graphics when a line-segment concatenation makes a circuit. FIG. 29A illustrates a graphics of an ellipse and FIG. 29B illustrates a graphics of a non-ellipse. In the line-segment concatenation processing (S13) illustrated in FIG. 11, each of the graphics illustrated in FIGS. 29A and 29B is extracted as a line-segment concatenation making a circuit. However, by performing the angular-variation check processing illustrated in FIG. 27, the ellipse detector 204 can determine that only the graphics in FIG. 29A is an ellipse.

The first embodiment described above makes it possible to appropriately detect arcs while reducing the amount of processing load involved in the arc detection. The first embodiment also makes it possible to detect an ellipse by combining detected arcs. This allows an ellipse to be detected at a high speed and with a small amount of processing load, compared to ellipse detection using the Hough transform. According to the first embodiment, even when the ratio of the longitudinal diameter versus the lateral diameter of an ellipse is large, an ellipse can be appropriately detected. In contrast, in a method in which arcs are regarded as a single arc during combination of the arcs when the centers and the radii of the arcs are substantially match each other, as in the related art, the arcs are not regarded as a single arc when the ratio of the longitudinal diameter and the lateral diameter of an ellipse is large (for example, when the ellipse is an elongated ellipse). This is because the centers and the radii of the arcs are different from each other. However, the arc detection method according to the first embodiment allows a wide variety of elliptic arcs.

Second Embodiment

An arc detecting apparatus according to a second embodiment will be described next. In the second embodiment, even a segment of an ellipse is missing, the figure can be detected as an ellipse. The configuration of the arc detecting apparatus according to the second embodiment is substantially the same as the configuration of the arc detecting apparatus illustrated in FIG. 1, and the configuration of a detector is substantially the same as the configuration illustrated in FIG. 2. Since the method for detecting arcs in the second embodiment is similar to the method in the first embodiment, a description thereof is not given hereinafter. Since a method for ellipse detection performed by the ellipse detector 204 in the second embodiment is different from the method in the first embodiment, the ellipse detector 204 will be described below.

<Configuration>

The ellipse detector 204 determines to which positions of divided portions of an ellipse the arcs detected by the arc detector 203 correspond. When the number of portions of the ellipse which are determined to correspond to the given positions is larger than or equal to a threshold, the ellipse detector 204 detects the arcs corresponding to the given positions as an ellipse.

Figure 30:
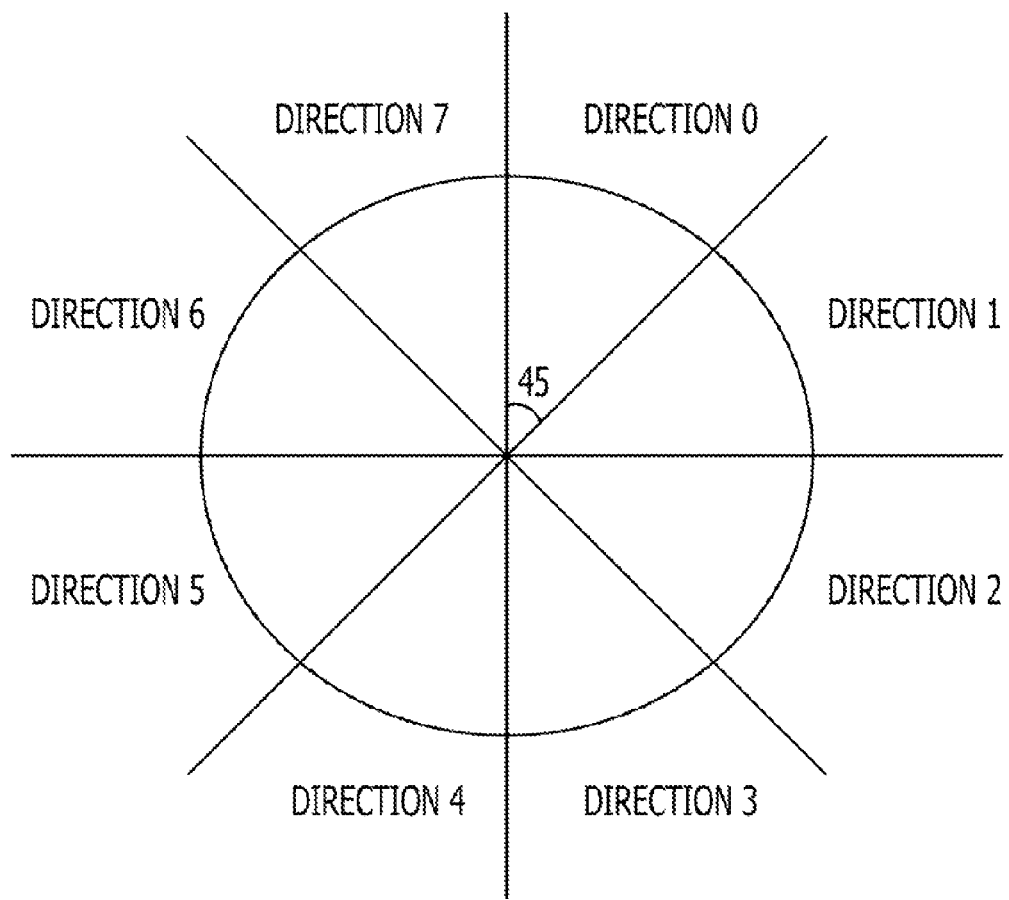
FIG. 30 is a diagram illustrating one example when an ellipse is divided into eight portions.

FIG. 30 is a flowchart illustrating one example of a case in which an ellipse is divided into eight portions. As illustrated in FIG. 30, an ellipse is divided into eight portions, which are given identifiers of corresponding directions 0 to 7. The ellipse detector 204 determines to which elliptic portions in the directions 0 to 7 the detected arcs correspond. For example, upon determining that the detected arcs correspond to the portions in six or more of the directions, the ellipse detector 204 detects the arcs corresponding to the six or more directions, regarding the arcs as an ellipse. Specific processing of the ellipse detection performed by the ellipse detector 204 will be described in conjunction with a processing procedure.

<Operations>

Operations of an arc detecting apparatus 10 in the second embodiment will be described next. The processing procedure in the second embodiment is substantially the same as the processing procedure illustrated in FIG. 11. Since a detail of the ellipse detection processing is different from the ellipse detection processing in the first embodiment, operation S15 illustrated in FIG. 11 will be specifically described.

(6) Direction Extraction Processing

Figure 31:
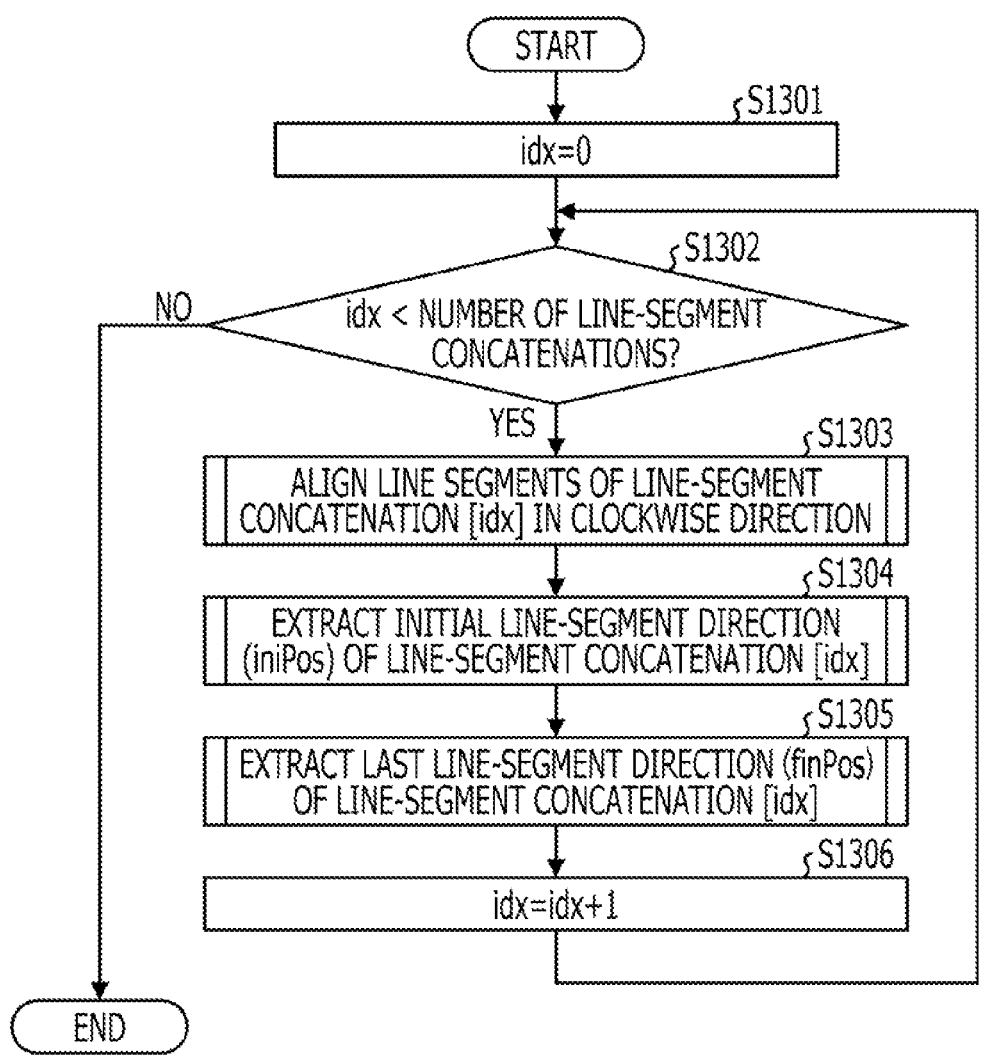
FIG. 31 is a flowchart illustrating one example of direction extraction processing in a second embodiment.

The ellipse detector 204 extracts directions to which the line-segment concatenation detected as an arc belongs. FIG. 31 is a flowchart illustrating one example of direction extraction processing in the second embodiment. In operation S1301 illustrated in FIG. 31, the ellipse detector 204 sets index idx to 0.

In operation S1302, the ellipse detector 204 determines whether or not idx is smaller than the number of line-segment concatenations. The number of line-segment concatenations is the number of line-segment concatenations detected by the arc detector 203. When idx is smaller than the number of line-segment concatenations (YES in operation S1302), the process proceeds to operation S1303, and when idx is larger than or equal to the number of line-segment concatenations (NO in operation S1302), the processing ends.

In operation S1303, the ellipse detector 204 performs processing for aligning the line segments of the line-segment concatenation [idx] in a clockwise direction. This processing is described below with reference to FIG. 32. The line-segment concatenation [idx] is represented by, for example, the list illustrated in FIG. 23D.

In operation S1304, the ellipse detector 204 extracts an initial line-segment direction (iniPos) of the line-segment concatenation [idx]. This processing is described below with reference to FIGS. 33 to 35.

In operation S1305, the ellipse detector 204 extracts a last line-segment direction (finPos) of the line-segment concatenation [idx]. This processing is described below with reference to FIG. 36.

In operation S1306, the ellipse detector 204 adds 1 to idx. After operation S1306, the process returns to operation S1302.

(6-1) Processing for Aligning Line Segments in Clockwise Direction

Figure 32:
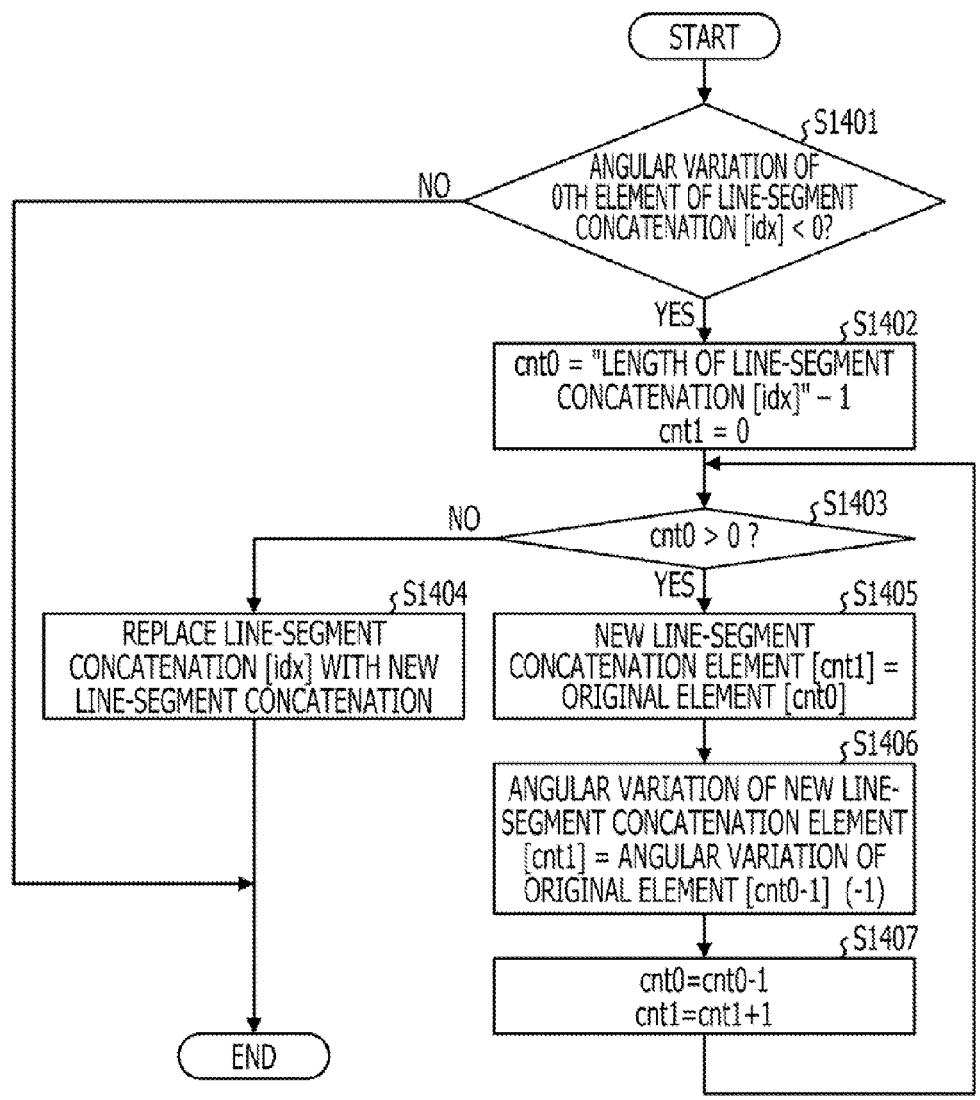
FIG. 32 is a flowchart illustrating one example of processing for aligning line segments in the clockwise direction in the second embodiment.

FIG. 32 is a flowchart illustrating one example of the processing for aligning the line segments in the clockwise direction in the second embodiment. In operation S1401 illustrated in FIG. 32, the ellipse detector 204 determines whether or not the angular variation of the zeroth element of the line-segment concatenation [idx] is smaller than 0. When the angular variation is smaller than 0 (YES in operation S1401), the process proceeds to operation S1402, and when the angular variation is larger than or equal to 0 (NO in operation S1401), the processing ends.

In operation S1402, the ellipse detector 204 performs setting such that:

cnt0="Length of Line-Segment Concatenation [idx]"−1 cnt1=0 where Length indicates the number of elements.

In operation S1403, the ellipse detector 204 determines whether or not cnt0 is more than 0. When cnt0 is more than 0 (YES in operation S1403), the process proceeds to operation S1405, and when cnt0 is or 0 or less (NO in operation S1403), the process proceeds to operation S1404.

In operation S1404, the ellipse detector 204 replaces the line-segment concatenation [idx] with a new line-segment concatenation [idx].

In operation S1405, the ellipse detector 204 performs setting such that:

New Line-Segment Concatenation Element [cnt1]
=Line-Segment Concatenation Element [cnt0]

In operation S1406, the ellipse detector 204 performs setting such that:

Angular Variation of New Line-Segment Concatenation Element [cnt1]=Angular Variation of Line-Segment Concatenation Element [cnt0-1]×(−1).

In operation S1407, the ellipse detector 204 subtracts 1 from cnt0 and adds 1 to cnt1. After operation S1407, the process returns to operation S1403.

The processing described above allows the minus (counterclockwise) of the angular variations in the line segments of a line-segment concatenation to be changed to the plus (clockwise).

(6-2) Initial-Direction Extraction Processing

Figure 33:
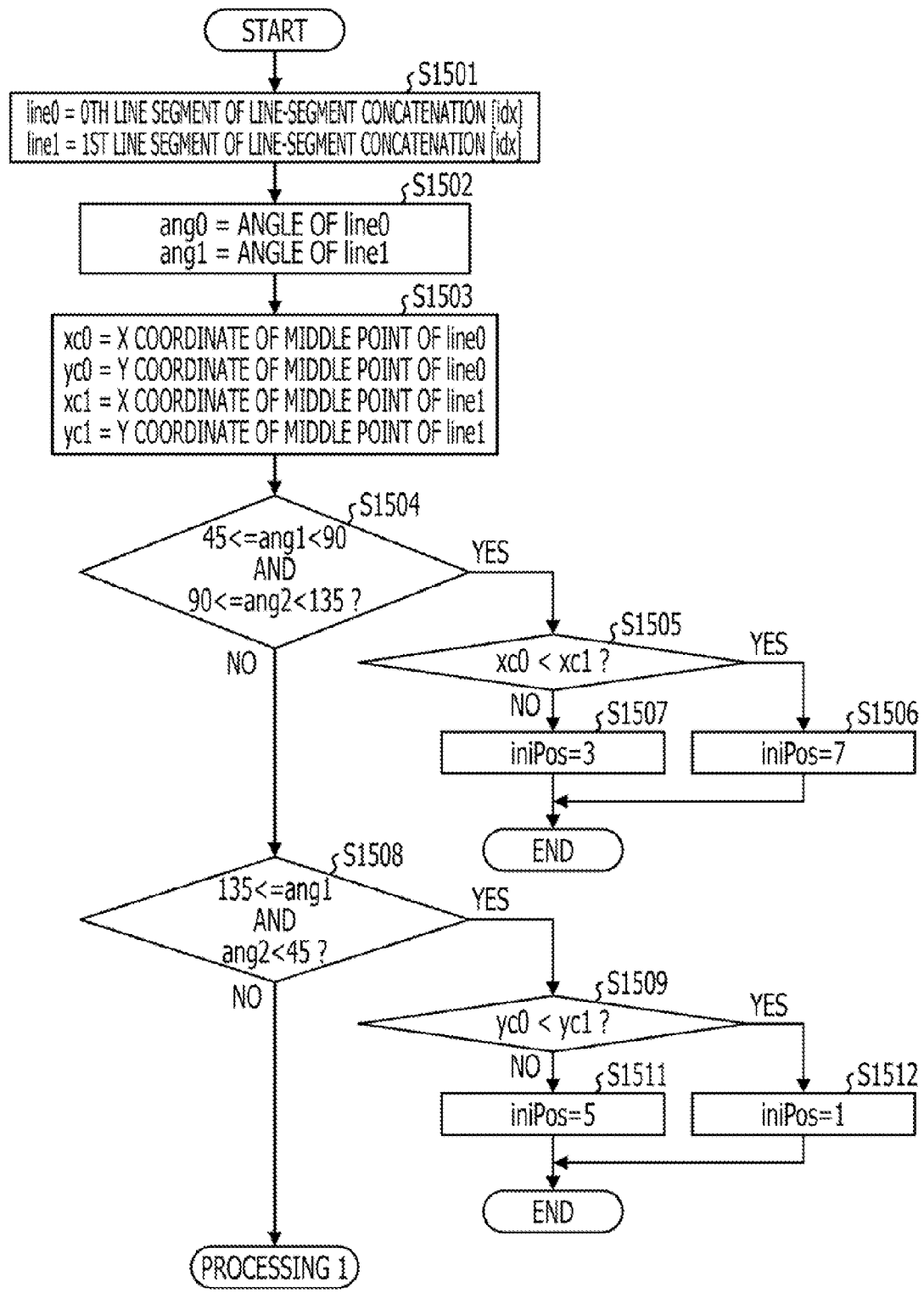
FIG. 33 is a flowchart illustrating one example of initial-direction extraction processing (part 1) in the second embodiment.
Figure 34:
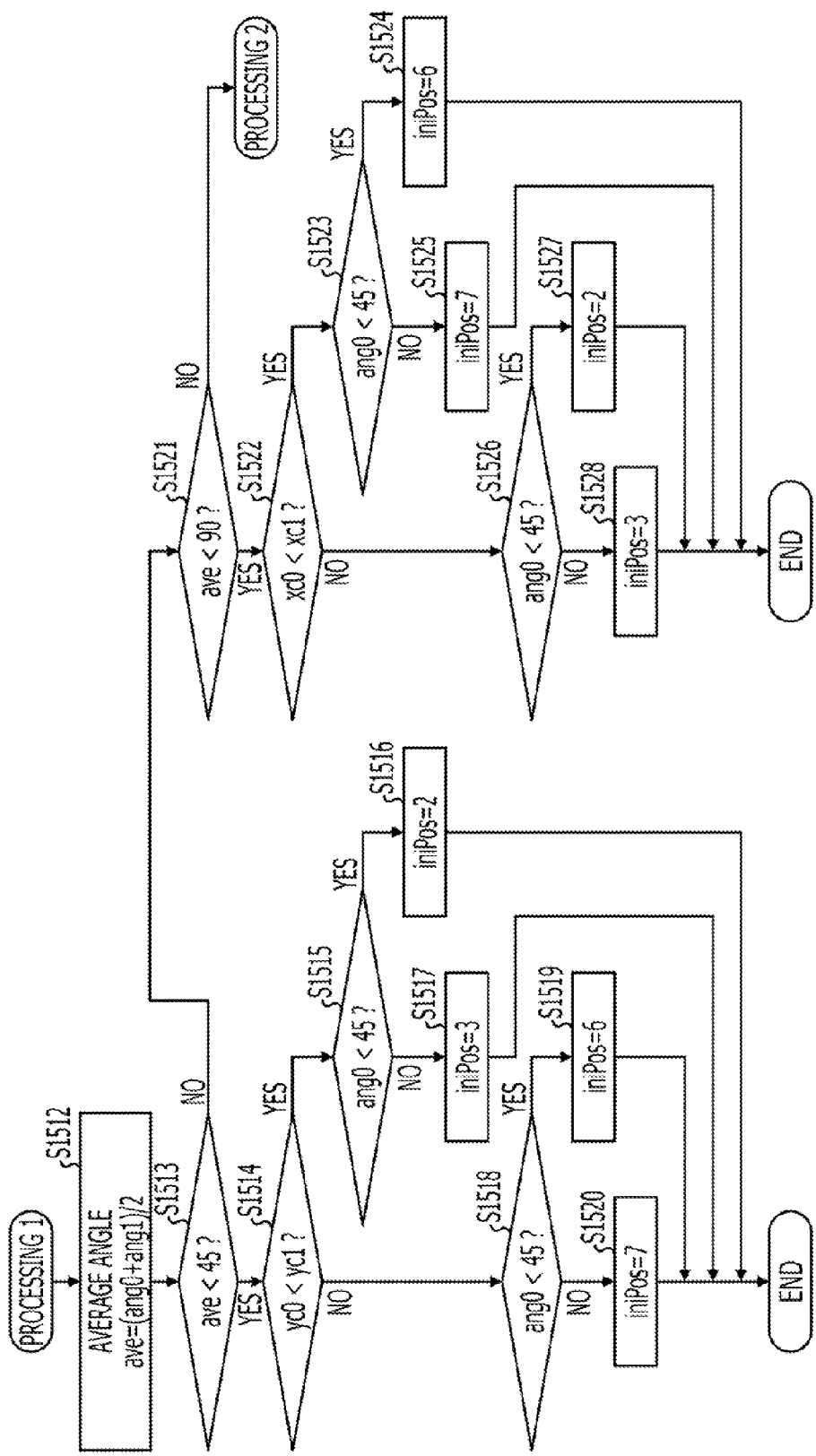
FIG. 34 is a flowchart illustrating one example of initial-direction extraction processing (part 2) in the second embodiment.
Figure 35:
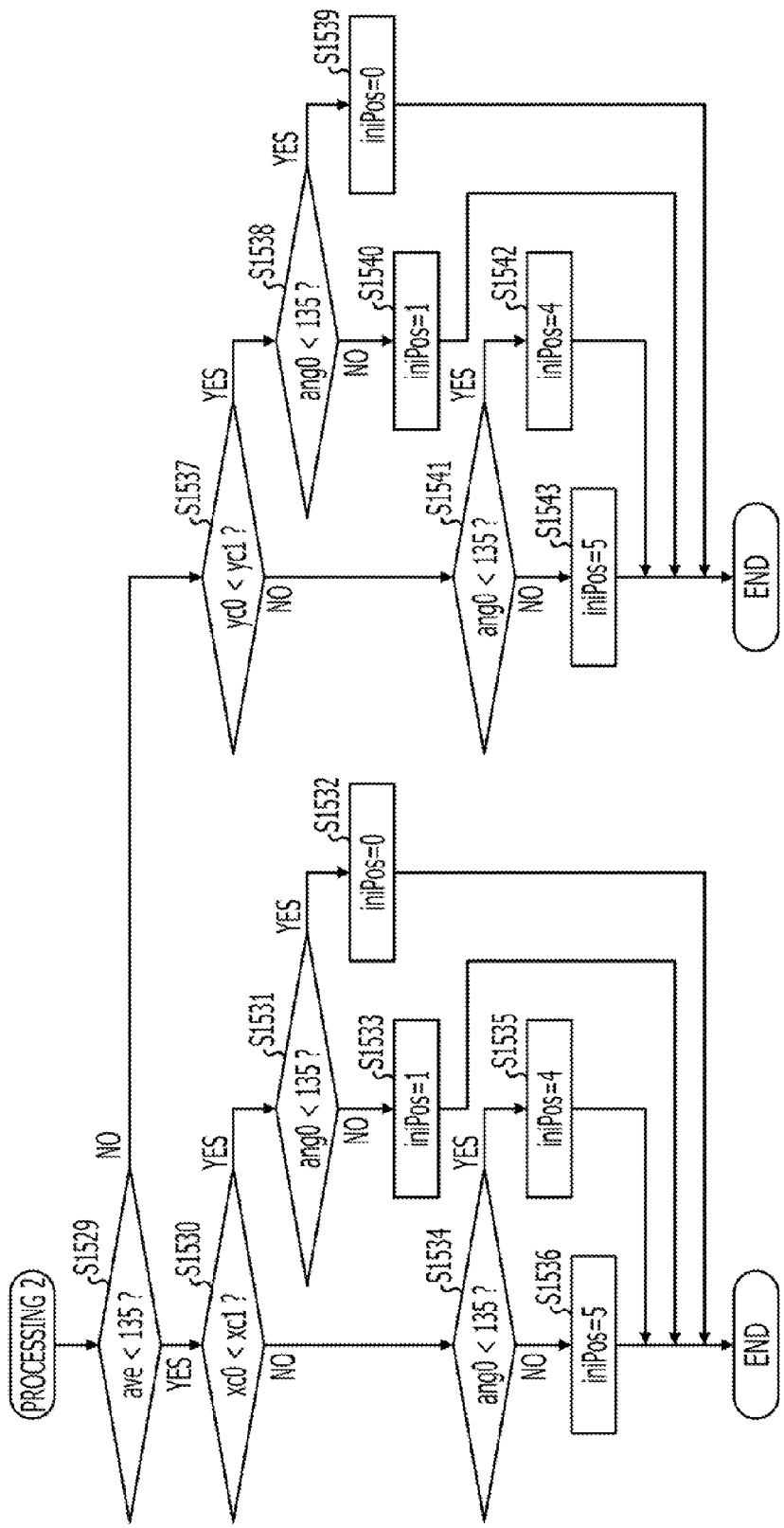
FIG. 35 is a flowchart illustrating one example of initial-direction extraction processing (part 3) in the second embodiment.

FIGS. 33 to 35 are flowcharts illustrating one example of initial-direction extraction processing in the second embodiment. In operation S1501 illustrated in FIG. 33, the ellipse detector 204 performs setting such that:

line0=Zeroth Line Segment of Line-Segment Concatenation [idx]

line1=First Line Segment of Line-Segment Concatenation [idx]

In operation S1502, the ellipse detector 204 performs setting such that ang0=Angle of line0 ang1=Angle of line1 where Angle in the equations represents an absolute angle.

In operation S1503, the ellipse detector 204 performs setting such that $xc0$=X Coordinate of Middle Point of line0

$yc0$=Y Coordinate of Middle Point of line0

$xc1$=X Coordinate of Middle Point of line1

$yc1$=Y Coordinate of Middle Point of line1

Operation S1502 and S1503 may be performed in any order.

In operation S1504, the ellipse detector 204 determines whether or not a following condition is satisfied.

"45≤ang0<90" and "90≤ang1<135"

When the condition is satisfied (YES in operation S1504), the process proceeds to operation S1505, and when the condition is not satisfied (NO in operation S1504), the process proceeds to operation S1508.

In operation S1505, the ellipse detector 204 determines whether or not xc0<xc1 is satisfied. When xc0 is smaller than xc1 (YES in operation S1505), the process proceeds to operation S1506, and when xc0 is larger than or equal to xc1 (NO in operation S1505), the process proceeds to operation S1507.

In operation S1506, the ellipse detector 204 determines that the initial direction "iniPos" is 7. The numeric value of iniPos corresponds to the direction illustrated in FIG. 30.

In operation S1507, the ellipse detector 204 determines that the initial direction "iniPos" is 3. This processing makes it possible to determine which positions of the divided ellipse the arc in the horizontal direction corresponds. After operations S1506 and S1507, the process proceeds to processing illustrated in FIG. 36.

In operation S1508, the ellipse detector 204 determines whether or not a following condition is satisfied.

"135≤ang0" AND "ang1<45"

When the condition is satisfied (YES in operation S1508), the process proceeds to operation S1509, and when the condition is not satisfied (NO in operation S1508), the process proceeds to processing 1 illustrated in FIG. 34.

In operation S1509, the ellipse detector 204 determines whether or not yc0 is smaller than yc1. When yc0 is smaller than yc1 (YES in operation S1509), the process proceeds to operation S1510, and when yc0 is larger than or equal to yc1 (NO in operation S1509), the process proceeds to operation S1511.

In operation S1510, the ellipse detector 204 determines that the initial direction "iniPos" is 1.

In operation S1511, the ellipse detector 204 determines that the initial direction "iniPos" is 5. This processing makes it possible to determine which positions of the divided ellipse the arc in the vertical direction corresponds. After operations S1510 and S1511, the process proceeds to the processing in FIG. 36.

FIG. 34 is a flowchart illustrating one example of initial-direction extraction processing (part 2) in the second embodiment. In operation S1512 illustrated in FIG. 34, the ellipse detector 204 calculates an average angle "ave" such that:

ave=(ang0+ang1)/2

In operation S1513, the ellipse detector 204 determines whether or not the average angle "ave" is less than 45. When the average angle "ave" is less than 45 (YES in operation S1513), the process proceeds to operation S1514, and when the average angle "ave" is more than or equal to 45 (NO in operation S1513), the process proceeds to operation S1521.

In operation S1514, the ellipse detector 204 determines whether or not yc0 is smaller than yc1. When yc0 is smaller than yc1 (YES in operation S1514), the process proceeds to operation S1515, and when yc0 is larger than or equal to yc1 (NO in operation S1514), the process proceeds to operation S1518.

In operation S1515, the ellipse detector 204 determines whether or not ang0 is less than 45. When ang0 is less than 45 (YES in operation S1515), the process proceeds to operation S1516, and when ang0 is more than or equal to 45 (NO in operation S1515), the process proceeds to operation S1517.

In operation S1516, the ellipse detector 204 determines that the initial direction "iniPos" is 2.

In operation S1517, the ellipse detector 204 determines that the initial direction "iniPos" is 3. This makes it possible to determine which positions of the divided ellipse the arc rising obliquely rightward corresponds. After operations S1516 and S1517, the process proceeds to the processing in FIG. 36.

In operation S1518, the ellipse detector 204 determines whether or not ang0 is less than 45. When ang0 is less than 45 (YES in operation S1518), the process proceeds to operation S1519, and when ang0 is more than or equal to 45 (NO in operation S1518), the process proceeds to operation S1520.

In operation S1519, the ellipse detector 204 determines that the initial direction "iniPos" is 6.

In operation S1520, the ellipse detector 204 determines that the initial direction "iniPos" is 7. This makes it possible to determine which positions of the divided ellipse the arc rising obliquely rightward corresponds. After operations S1519 and S1520, the process proceeds to the processing in FIG. 36.

In operation S1521, the ellipse detector 204 determines whether or not the average angle "ave" is less than 90. When the average angle "ave" is less than 90 (YES in operation S1521), the process proceeds to operation S1522, and when the average angle "ave" is more than or equal to 90 (NO in operation S1521), the process proceeds to processing 2 illustrated in FIG. 35.

In operation S1522, the ellipse detector 204 determines whether or not xc0 is smaller than xc1. When xc0 is smaller than xc1 (YES in operation S1522), the process proceeds to operation S1523, and when xc0 is larger than or equal to xc1 (NO in operation S1522), the process proceeds to operation S1526.

In operation S1523, the ellipse detector 204 determines whether or not ang0 is less than 45. When ang0 is less than 45 (YES in operation S1523), the process proceeds to operation S1524, and when ang0 is more than or equal to 45 (NO in operation S1523), the process proceeds to operation S1525.

In operation S1524, the ellipse detector 204 determines that the initial direction "iniPos" is 6.

In operation S1525, the ellipse detector 204 determines that the initial direction "iniPos" is 7. This makes it possible to determine which positions of the divided ellipse the arc rising obliquely rightward corresponds. After operations S1524 and S1525, the process proceeds to the processing in FIG. 36.

In operation S1526, the ellipse detector 204 determines whether or not ang0 is less than 45. When ang0 is less than 45 (YES in operation S1526), the process proceeds to operation S1527, and when ang0 is more than or equal to 45 (NO in operation S1526), the process proceeds to operation S1528.

In operation S1527, the ellipse detector 204 determines that the initial direction "iniPos" is 2.

In operation S1528, the ellipse detector 204 determines that the initial direction "iniPos" is 3. This makes it possible to determine which positions of the divided ellipse the arc rising obliquely rightward corresponds. After operations S1527 and S1528, the process proceeds to the processing in FIG. 36.

FIG. 35 is a flowchart illustrating one example of initial-direction extraction processing (part 3) in the second embodiment. In operation S1529 illustrated in FIG. 35, the ellipse detector 204 determines whether or not the average angle "ave" is less than 135. When the average angle "ave" is less than 135 (YES in operation S1529), the process proceeds to operation S1530, and when the average angle "ave" is more than or equal to 135 (NO in operation S1529), the process proceeds to operation S1537.

In operation S1530, the ellipse detector 204 determines whether or not xc0 is smaller than xc1. When xc0 is smaller than xc1 (YES in operation S1530), the process proceeds to operation S1531, and when xc0 is larger than or equal to xc1 (NO in operation S1530), the process proceeds to operation S1534.

In operation S1531, the ellipse detector 204 determines whether or not ang0 is less than 135. When ang0 is less than 135 (YES in operation S1531), the process proceeds to operation S1532, and when ang0 is more than or equal to 135 (NO in operation S1531), the process proceeds to operation S1533.

In operation S1532, the ellipse detector 204 determines that the initial direction "iniPos" is 0.

In operation S1533, the ellipse detector 204 determines that the initial direction "iniPos" is 1. This makes it possible to determine which positions of the divided ellipse the arc declining obliquely rightward corresponds. After operations S1532 and S1533, the process proceeds to the processing in FIG. 36.

In operation S1534, the ellipse detector 204 determines whether or not ang0 is less than 135. When ang0 is less than 135 (YES in operation S1534), the process proceeds to operation S1535, and when ang0 is more than or equal to 135 (NO in operation S1534), the process proceeds to operation S1536.

In operation S1535, the ellipse detector 204 determines that the initial direction "iniPos" is 4.

In operation S1536, the ellipse detector 204 determines that the initial direction "iniPos" is 5. This makes it possible to determine which positions of the divided ellipse the arc declining obliquely rightward corresponds. After operations S1535 and S1536, the process proceeds to the processing in FIG. 36.

In operation S1537, the ellipse detector 204 determines whether or not yc0 is smaller than yc1. When yc0 is smaller than yc1 (YES in operation S1537), the process proceeds to operation S1538, and when yc0 is larger than or equal to yc1 (NO in operation S1537), the process proceeds to operation S1541.

In operation S1538, the ellipse detector 204 determines whether or not ang0 is less than 135. When ang0 is less than 135 (YES in operation S1538), the process proceeds to operation S1539, and when ang0 is more than or equal to 135 (NO in operation S1538), the process proceeds to operation S1540.

In operation S1539, the ellipse detector 204 determines that the initial direction "iniPos" is 0.

In operation S1540, the ellipse detector 204 determines that the initial direction "iniPos" is 1. This makes it possible to determine which positions of the divided ellipse the arc declining obliquely rightward corresponds. After operations S1539 and S1540, the process proceeds to the processing in FIG. 36.

In operation S1541, the ellipse detector 204 determines whether or not ang0 is less than 135. When ang0 is less than 135 (YES in operation S1541), the process proceeds to operation S1542, and when ang0 is more than or equal to 135 (NO in operation S1541), the process proceeds to operation S1543.

In operation S1542, the ellipse detector 204 determines that the initial direction "iniPos" is 4.

In operation S1543, the ellipse detector 204 determines that the initial direction "iniPos" is 5. This makes it possible to determine which positions of the divided ellipse the arc declining obliquely rightward corresponds. After operations S1542 and S1543, the process proceeds to the processing in FIG. 36.

The above-described processing makes it possible to determine to which portion of an ellipse the initial line segment of a line-segment concatenation corresponds.

(6-3) Extraction Processing for Last Direction, Etc.

Figure 36:
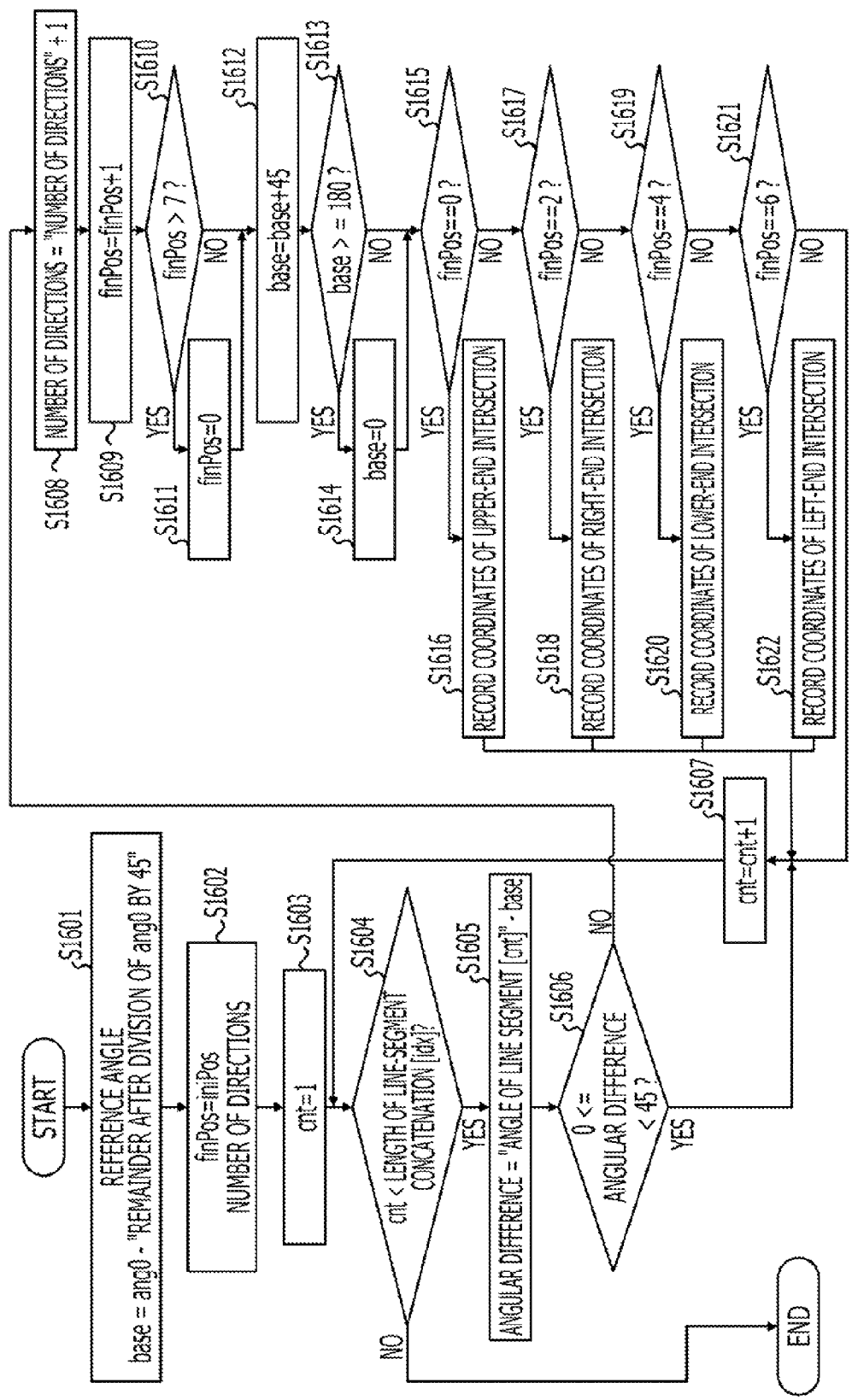
FIG. 36 is a flowchart illustrating one example of processing for extracting a last direction, etc. in the second embodiment.

FIG. 36 is a flowchart illustrating one example of extraction processing for the last direction, etc. In operation S1601 illustrated in FIG. 36, the ellipse detector 204 calculates a reference angle "base" such that:

base=ang0–"Remainder after Division of ang0 by 45"

The reference angle "base" indicates an angle until the next direction is reached. One direction corresponds to 45 (360/8) degrees. In this case, ang0 corresponds to ang0 in operation S1502 illustrated in FIG. 33.

In operation S1602, the ellipse detector 204 performs setting such that:

finPos=iniPos

The number of directions=1

The number of directions indicates the number of divided portions of an ellipse which correspond to the detected arcs.

In operation S1603, the ellipse detector 204 sets cnt to 1. In operation S1604, the ellipse detector 204 determines whether or not cnt is smaller than the length (the number of elements) of the line-segment concatenation [idx]. When cnt is smaller than the length of the line-segment concatenation [idx] (YES in operation S1604), the process proceeds to operation S1605, and when cnt is larger than or equal to the length of the line-segment concatenation [idx] (NO in operation S1604), the processing ends.

In operation S1605, the ellipse detector 204 calculates an angular difference such that:

Angular Difference="Angle of Line Segment [cnt]"–base

When the ellipse detector 204 determines that 0≤Angular Difference<45 is satisfied (YES in operation S1606), the process proceeds to operation S1607. When the condition is not satisfied (NO in operation S1606), the process proceeds to operation S1608. When the condition is satisfied, this indicates that the next direction is not reached even when the next line segment is concatenated. When the condition is not satisfied, this indicates that the next direction is reached when the next line segment is concatenated.

In operation S1607, the ellipse detector 204 adds 1 to cnt. After operation S1607, the process returns to operation S1604.

In operation S1608, the ellipse detector 204 adds 1 to the number of directions. In operation S1609, the ellipse detector 204 adds 1 to finPos. Operations S1608 and S1609 may be performed in any order.

In operation S1610, the ellipse detector 204 determines whether or not finPos is larger than 7. When finPos is larger than 7 (YES in operation S1610), the process proceeds to operation S1611, and when finPos is smaller than or equal to 7 (NO in operation S1610), the process proceeds to operation S1612.

In operation S1611, the ellipse detector 204 sets finPos to 0. In operation S1612, the ellipse detector 204 adds 45 to the reference angle "base".

In operation S1613, the ellipse detector 204 determines whether or not the reference angle "base" is 180 or more. When the reference angle "base" is 180 or more (YES in operation S1613), the process proceeds to operation S1614, and when the reference angle "base" is less than 180 (NO in operation S1613), the process proceeds to operation S1615.

In operation S1614, the ellipse detector 204 sets the reference angle "base" to 0. In operation S1615, the ellipse detector 204 determines whether or not finPos is 0. When finPos is 0 (YES in operation S1615), the process proceeds to operation S1616, and when finPos is not 0 (NO in operation S1615), the process proceeds to operation S1617.

In operation S1616, the ellipse detector 204 determines the coordinates of an upper-end intersection and records the coordinates. The intersection coordinates may be determined by the intersection with the immediately preceding line segment.

In operation S1617, the ellipse detector 204 determines whether or not finPos is 2. When finPos is 2 (YES in operation S1617), the process proceeds to operation S1618, and when finPos is not 0 (NO in operation S1617), the process proceeds to operation S1619.

In operation S1618, the ellipse detector 204 determines the coordinates of a right-end intersection and records the coordinates. The intersection coordinates may be determined by the intersection with the immediately preceding line segment.

In operation S1619, the ellipse detector 204 determines whether or not finPos is 4. When finPos is 4 (YES in operation S1619), the process proceeds to operation S1620, and when finPos is not 4 (NO in operation S1619), the process proceeds to operation S1621.

In operation S1620, the ellipse detector 204 determines the coordinates of a lower-end intersection and records the coordinates. The intersection coordinates may be determined by the intersection with the immediately preceding line segment.

In operation S1621, the ellipse detector 204 determines whether or not finPos is 6. When finPos is 6 (YES in operation S1621), the process proceeds to operation S1622, and when finPos is not 6 (NO in operation S1621), the process proceeds to operation S1607.

In operation S1622, the ellipse detector 204 determines the coordinates of a left-end intersection and records the coordinates. The intersection coordinates may be determined by the intersection with the immediately preceding line segment.

The above-described processing makes it possible to determine to which positions of a divided ellipse the arcs detected by the arc detector 203 correspond and also makes it possible to determine the number of portions of the ellipse which are determined to be the portions to which the arcs correspond and coordinates of end points of the ellipse.

(7) Ellipse Detection Processing

Figure 37:
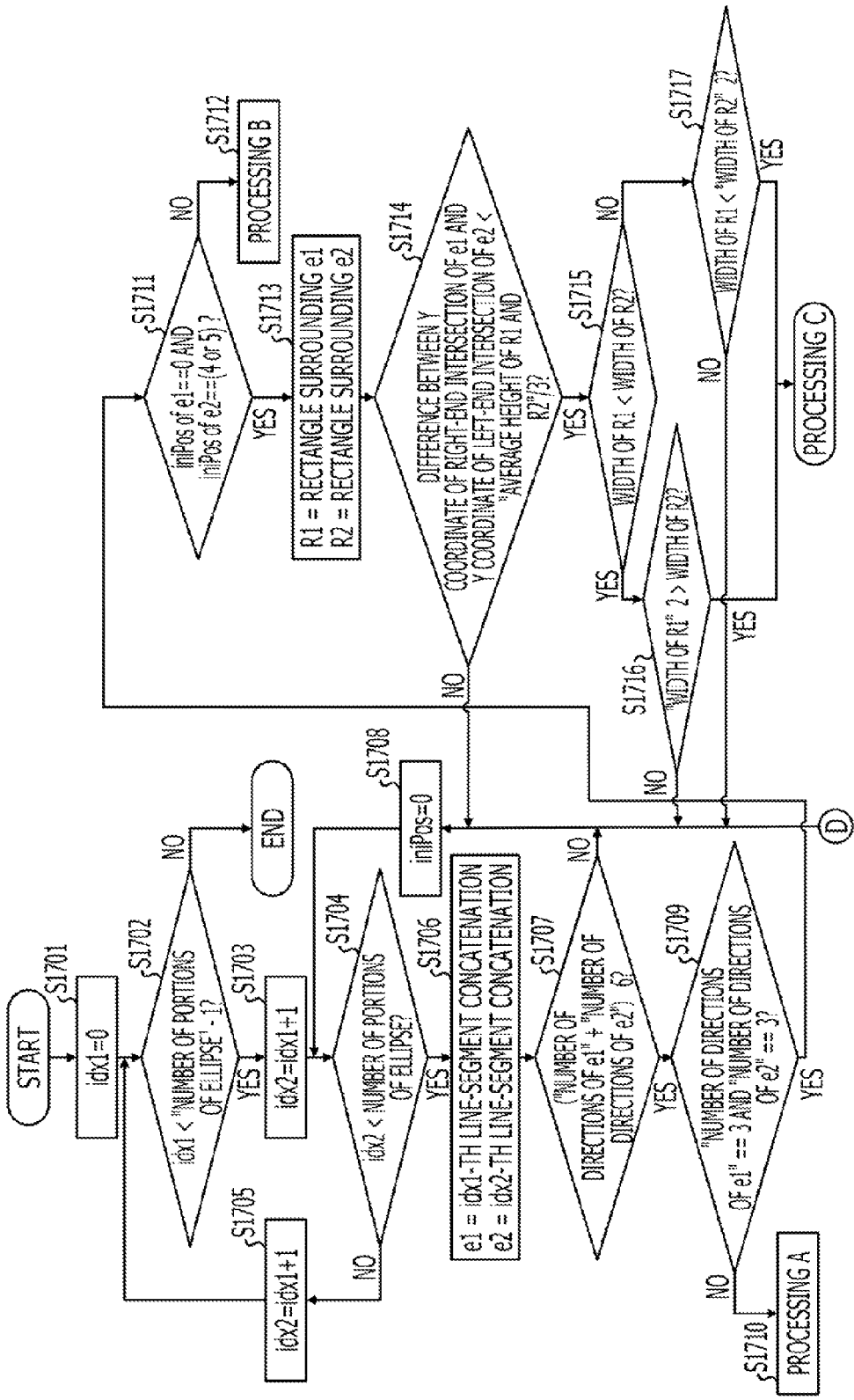
FIG. 37 is a flowchart illustrating one example of ellipse detection processing (part 1) in the second embodiment.
Figure 38:
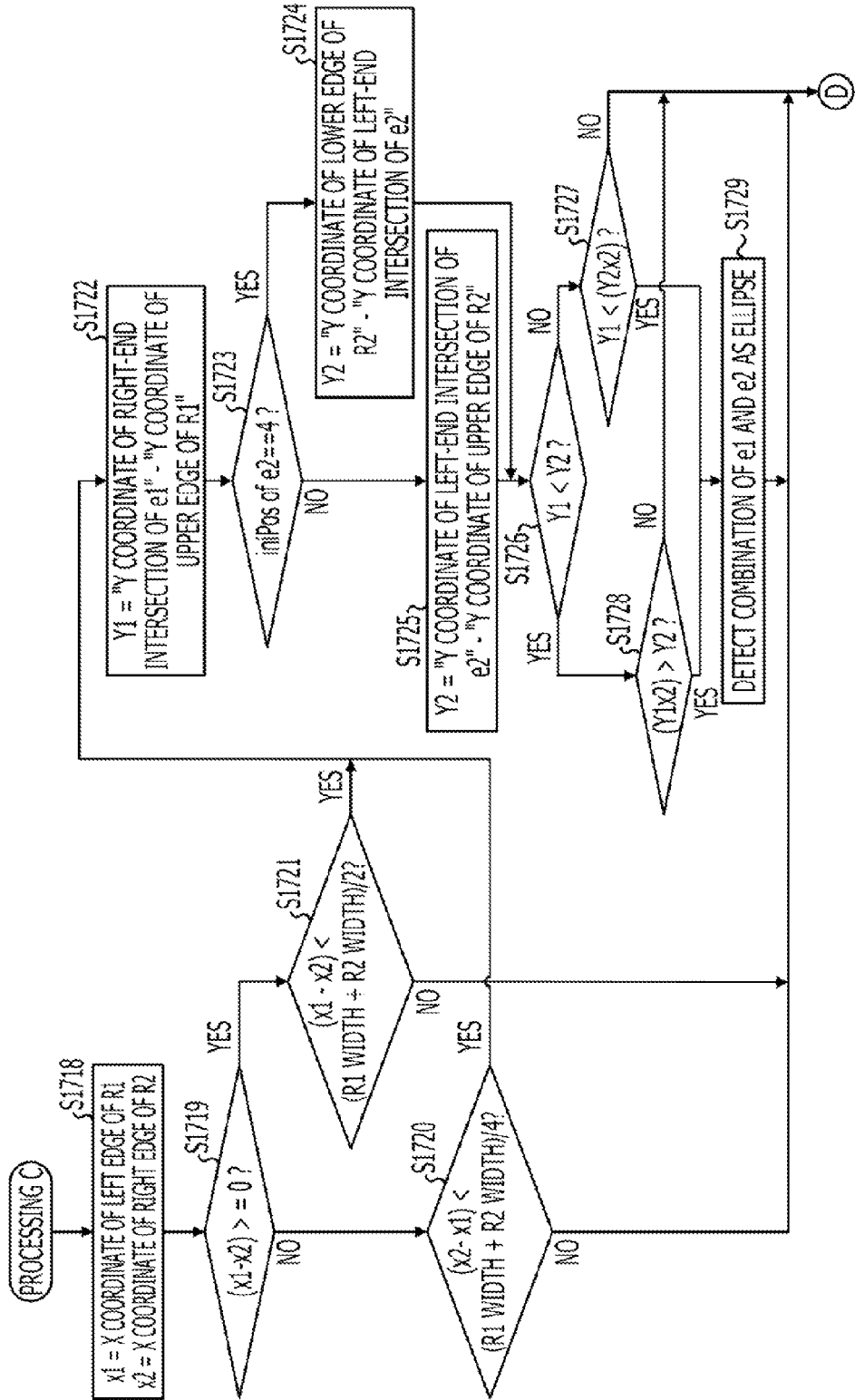
FIG. 38 is a flowchart illustrating one example of ellipse detection processing (part 2) in the second embodiment.

FIGS. 37 and 38 are flowcharts illustrating one example of ellipse detection processing in the second embodiment. In operation S1701 illustrated in FIG. 37, the ellipse detector 204 sets index idx1 to 0.

In operation S1702, the ellipse detector 204 determines whether or not idx1 is smaller than "the number of portions of an ellipse"−1. The number of portions of the ellipse is the number of ellipse directions to which the arcs are determined to correspond. When idx1 is smaller than "the number of portions of the ellipse"−1 (YES in operation S1702), the process proceeds to operation S1703. When idx1 is larger than or equal to "the number of portions of the ellipse"−1 (NO in operation S1702), the processing ends.

In operation S1703, the ellipse detector 204 performs setting such that:

$$idx2=idx1+1$$

In operation S1704, the ellipse detector 204 determines whether or not idx2 is smaller than the number of portions of the ellipse. When idx2 is smaller than the number of portions of the ellipse (YES in operation S1704), the process proceeds to operation S1706, and when idx2 is larger than or equal to the number of portions of the ellipse (NO in operation S1704), the process proceeds to operation S1705.

In operation S1705, the ellipse detector 204 adds 1 to idx1. After operation S1705, the process returns to operation S1702.

In operation S1706, the ellipse detector 204 performs setting such that:

$$e1=idx1\text{-th Line-Segment Concatenation}$$

$$e2=idx2\text{-th Line-Segment Concatenation}$$

In operation S1707, the ellipse detector 204 determines whether or not a following condition is satisfied.

("Number of Directions of $e1$"+"Number of Directions of $e2$") Threshold

The value of the threshold is, for example, 6. The value of the threshold indicates the degree of stringency of the ellipse detection and may be varied as appropriate. When the sum of the number of directions of e1 and the number of directions of e2 is larger than or equal to the threshold (YES in operation S1707), the process proceeds to operation S1709, and when the sum of the number of directions of e1 and the number of directions of e2 is smaller than the threshold (NO in operation S1707), the proceeds to operation S1708.

In operation S1708, the ellipse detector 204 adds 1 to idx2. After operation S1708, the process returns to operation S1704.

In operation S1709, the ellipse detector 204 determines whether or not any of the following two conditions is satisfied. The first condition is "the number of directions of e1"=3. The second condition is "the number of directions of e2"=3.

When the conditions are satisfied (YES in operation S1709), the process proceeds to operation S1711, and when the conditions are not satisfied (NO in operation S1709), the process proceeds to operation S1710.

In operation S1710, the ellipse detector 204 performs processing A, which is described below.

In operation S1711, the ellipse detector 204 determines whether or not the following two conditions are satisfied. The first condition is "iniPos of e1"=0. The second condition is iniPos of e2=4 or 5. When the conditions are satisfied (YES in operation S1711), the process proceeds to operation S1713, and when the conditions are not satisfied (NO in operation S1711), the process proceeds to operation S1712.

In operation S1712, the ellipse detector 204 performs processing B, which is described below.

In operation S1713, the ellipse detector 204 performs setting such that:

$$R1=\text{Rectangle Surrounding } e1$$

$$R2=\text{Rectangle Surrounding } e2$$

In operation S1714, the ellipse detector 204 determines whether or not a following condition is satisfied.

Difference between Y Coordinate of Right-End Intersection of e1 and Y Coordinate of Left-End Intersection of e2<"Average Height of R1 and R2"/3

The heights of R1 and R2 refer to the lengths of the rectangles in the Y direction. When the condition is satisfied (YES in operation S1714), the process proceeds to operation S1715, and when the condition is not satisfied (NO in operation S1714), the process returns to operation S1708.

In operation S1715, the ellipse detector 204 determines whether or not the width of R1 is smaller than the width of R2. When the width of R1 is smaller than the width of R2 (YES in operation S1715), the process proceeds to operation S1716, and when the width of R1 is larger than or equal to the width of R2 (NO in operation S1715), the process proceeds to operation S1717.

In operation S1716, the ellipse detector 204 determines whether or not "the width of R1"×2 is larger than the width of R2. When "the width of R1"×2 is larger than the width of R2 (YES in operation S1716), the process proceeds to processing C illustrated in FIG. 39, and when "the width of R1"×2 is smaller than or equal to the width of R2 (NO in operation S1716), the process returns to operation S1708.

In operation S1717, the ellipse detector 204 determines whether or not the width of R1 is smaller than "the width of R2"×2. When the width of R1 is smaller than "the width of R2"×2 (YES in operation S1717), the process proceeds to processing C, and when the width of R1 is larger than or equal to "the width of R2"×2 (NO in operation S1717), the process returns to operation S1708.

FIG. 38 is a flowchart illustrating one example of ellipse detection processing (part 2) in the second embodiment. In operation S1718 illustrated in FIG. 38, the ellipse detector 204 performs setting such that:

$x1 = X$ Coordinate of Left Edge of $R1$ $x2 = X$ Coordinate of Right Edge of $R2$ When $(x1-x2) \geq 0$ is satisfied (YES in operation S1719), the process of the ellipse detector 204 proceeds to operation S1721, and when $(x1-x2) \geq 0$ is not satisfied (NO in operation S1719), the process proceeds to operation S1720.

When $(x2-x1) < (R1 \text{ Width} + R2 \text{ Width})/4$ is satisfied (YES in operation S1720), the process of the ellipse detector 204 proceeds to operation S1722, and when the condition is not satisfied (NO in operation S1720), the process returns to operation S1708. D illustrated in FIG. 38 indicates that the process proceeds to D illustrated in FIG. 37, that is, indicates that the process returns to operation S1708.

When $(x1-x2) < (R1 \text{ Width} + R2 \text{ Width})/2$ is satisfied (YES in operation S1721), the process of the ellipse detector 204 proceeds to operation S1722, and when the condition is not satisfied (NO in operation S1721), the process returns to operation S1708.

In operation S1722, the ellipse detector 204 calculates Y1 such that:

$Y1 =$ "$Y$ Coordinate of Right-End Intersection of $e1$" − "$Y$ Coordinate of Upper Edge of $R1$"

In operation S1723, the ellipse detector 204 determines whether or not iniPos of e2 is 4. When iniPos of e2 is 4 (YES in operation S1723), the process proceeds to operation S1724, and when iniPos of e2 is not 4 (NO in operation S1723), the process proceeds to operation S1725.

In operation S1724, the ellipse detector 204 calculates Y2 such that:

$Y2 =$ "$Y$ Coordinate of Lower Edge of $R2$" − "$Y$ Coordinate of Intersection at Left End of $e2$"

In operation S1725, the ellipse detector 204 calculates Y2 such that:

$Y2 =$ "$Y$ Coordinate of Intersection at Left End of $e2$" − "$Y$ Coordinate of Upper Edge of $R2$"

Figure 39A:
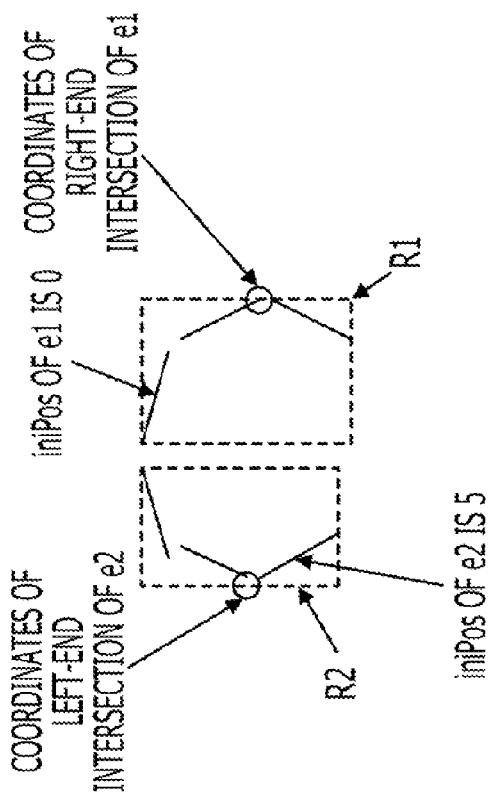
FIGS. 39A and 39B illustrate graphics that are different in iniPos of e2.
Figure 39B:
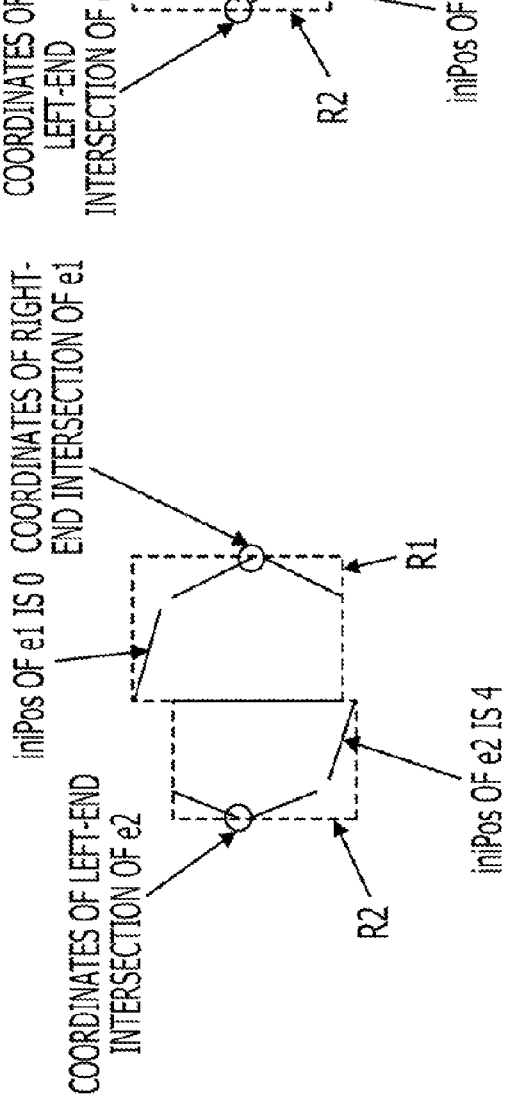

FIGS. 39A and 39B illustrate graphics that are different in iniPos of e2. FIG. 39A illustrates a case in which iniPos of e2 is 4. In this case, the determination in operation S1723 is YES and operation S1724 is performed.

FIG. 39B illustrates an example in which iniPos of e2 is 5. In this case, the determination in operation S1723 is NO and operation S1725 is performed.

In operation S1726, the ellipse detector 204 determines whether or not Y1 is smaller than Y2. When Y1 is smaller than Y2 (YES in operation S1726), the process proceeds to operation S1728, and when Y1 is larger than or equal to Y2 (NO in operation S1726), the process proceeds to operation S1727.

In operation S1727, the ellipse detector 204 determines whether or not Y1 is smaller than Y2×2. When Y1 is smaller than Y2×2 (YES in operation S1727), the process proceeds to operation S1729, and when Y1 is larger than or equal to Y2×2 (NO in operation S1727), the process proceeds to operation S1708.

In operation S1728, the ellipse detector 204 determines whether or not Y1×2 is larger than Y2. When Y1×2 is larger than Y2 (YES in operation S1728), the process proceeds to operation S1729, and when Y1×2 is smaller than or equal to Y2 (NO in operation S1728), the process returns to operation S1708.

In operation S1729, the ellipse detector 204 detects a combination of e1 and e2 as an ellipse. Even when a segment of an ellipse is missing, the above-described processing makes it possible to detect the figure by regarding it as an ellipse.

Processing A in operation S1710 will be described next. When the determination in operation S1709 is NO, this indicates that the number of directions of e1 and the number of directions of e2 are not equal to each other and the sizes of the rectangles surrounding e1 and e2 are different from each other. Thus, considering the sizes of the rectangles surrounding e1 and e2, the ellipse detector 204 may determine whether or not the rectangles are located close enough to each other to determine that the rectangles form an ellipse. Basic operations for the determination are substantially the same as the operation S1711 and the subsequent operations.

For example, if the rectangle R1 illustrated in FIG. 39A includes four line segments, the height of R1 is more likely to be larger than the height of the rectangle R2 since one more line segment is included in the rectangle R1. Accordingly, the ellipse detector 204 may perform ellipse detection processing, considering the sizes of the rectangles R1 and R2, for example, multiplying Y1 in operation S1726 illustrated in FIG. 38 by a coefficient (e.g., ¾).

Figure 40A:
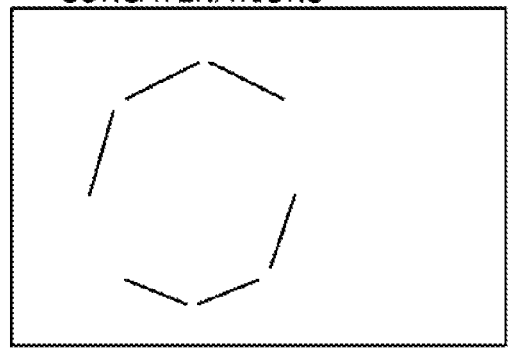
FIGS. 40A to 40C illustrate one example of processing B.
Figure 40B:
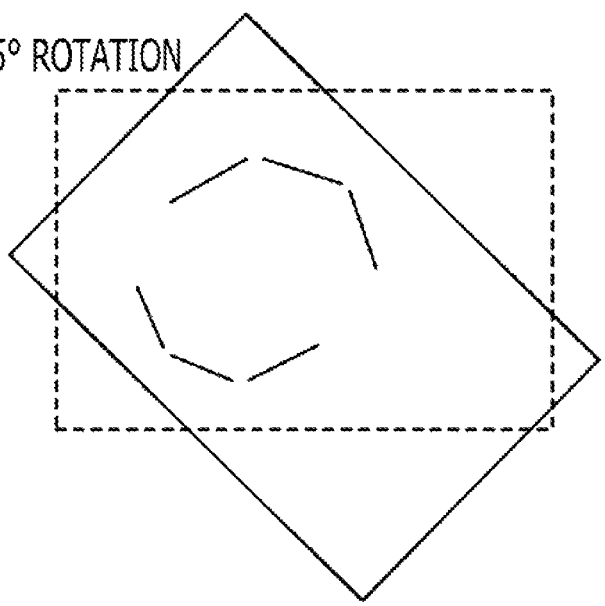
Figure 40C:
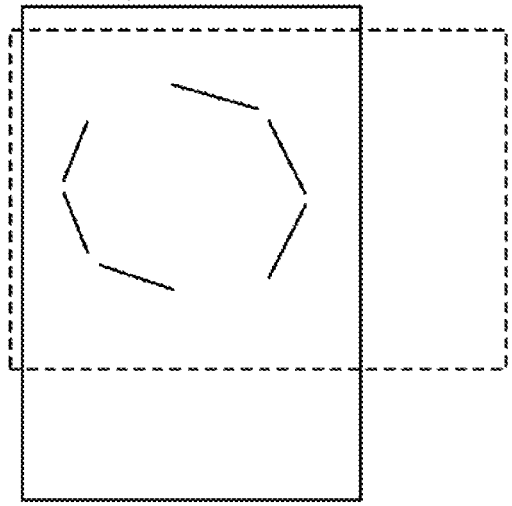

Processing B in operation S1712 will be described next. FIGS. 40A to 40C illustrate one example of processing B in operation S1712. In processing B, processing may be performed according to the values of iniPos of e1 and e2, as in the processing illustrated in FIGS. 37 and 38. Also, processing, such as rotation and left-and-right inversion of e1 and e2, may be performed as illustrated in FIGS. 40A to 40C before the processing illustrated in FIGS. 37 and 38 is performed.

FIG. 40A illustrates original line-segment concatenations. FIG. 40B illustrates an example obtained by rotating the original line-segment concatenations by 45°. FIG. 40C illustrates an example obtained by rotating the original line-segment concatenations by 90°. When the original line-segment concatenations are rotated as illustrated in FIGS. 40B and 40C, it is necessary to convert the coordinates of the start point and the end point and the angular variation of each line segment. The directions corresponding to parts of an ellipse may be incremented by 45° in accordance with the rotation. When the direction exceeds "7", the direction returns to "0". For the conversion of the coordinates, for example, the rotation in increments of 90° can be achieved by interchanging X-Y coordinates and the rotation in increments of 45° can also be achieved with simple processing since the angles are fixed. Accordingly, this conversion processing does not involve a large amount of processing load.

As described above, in the second embodiment, even a segment of an ellipse is missing, the figure is detectable as an ellipse.

Modifications

Figure 41:
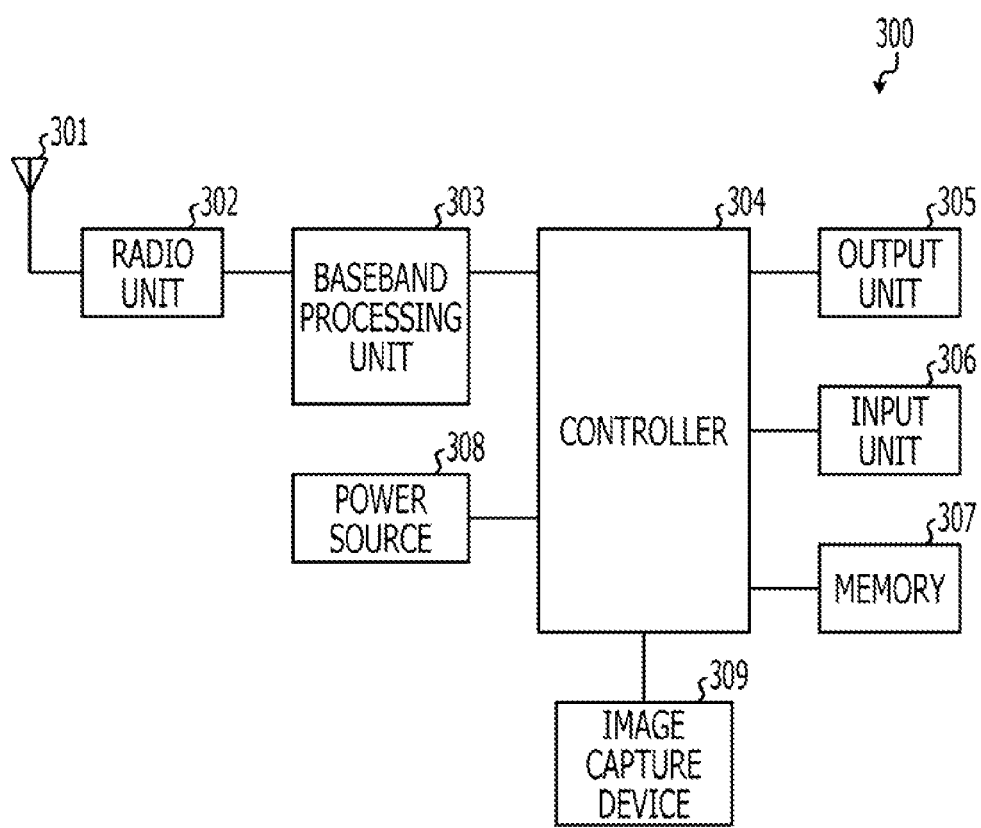
FIG. 41 illustrates one example of the hardware configuration of a mobile terminal apparatus.

FIG. 41 is a block diagram illustrating one example of the hardware configuration of a mobile terminal apparatus 300 including the arc detecting apparatus 10 according to one of the first and second embodiments. A mobile terminal apparatus 300 illustrated in FIG. 41 includes an antenna 301, a radio unit 302, a baseband processing unit 303, a controller 304, an output unit 305, an input unit 306, a memory 307, a power source 308, and an image capture device 309.

The antenna 301 transmits a radio signal amplified by a transmitter amplifier and also receives a radio signal from a base station. The radio unit 302 performs digital-to-analog (D/A) conversion on the transmission signal spread by the baseband processing unit 303. The radio unit 302 performs orthogonal modulation to transform the transmission signal into a high-frequency signal and a power amplifier amplifies the transformed signal. The radio unit 302 amplifies a received radio signal, performs analog-to-digital (A/D) conversion on the amplified radio signal, and sends the resulting signal to the baseband processing unit 303.

The baseband processing unit 303 performs baseband processing, such as addition of error correction code to transmission data, data modulation, spread modulation, despreading of a reception signal, determination of a reception environment, threshold determination of each channel signal, and error correction decoding.

The controller 304 performs radio control for transmission, reception, and so on of a control signal. The controller 304 also controls the individual units to execute various types of processing. The output unit 305 outputs data to, for example, an LCD (liquid crystal display), on the basis of an instruction from the controller 304. The input unit 306 receives data from, for example, a microphone and a keyboard.

Examples of the memory 307 include a ROM (read only memory) and a RAM (random access memory). The memory 307 stores various data and a program to be executed by the mobile terminal apparatus 300. The power source 308 controls power supply of the mobile terminal apparatus 300. The image capture device 309 has an image capture element and outputs a captured image to the controller 304.

The controller 102 and the detector 103 in the first and second embodiments may be implemented by, for example, the controller 304 and the memory 307 serving as a work memory, the input unit 101 may be implemented by the image capture device 309, and the output unit 104 may be implemented by the output unit 305.

Figure 42:
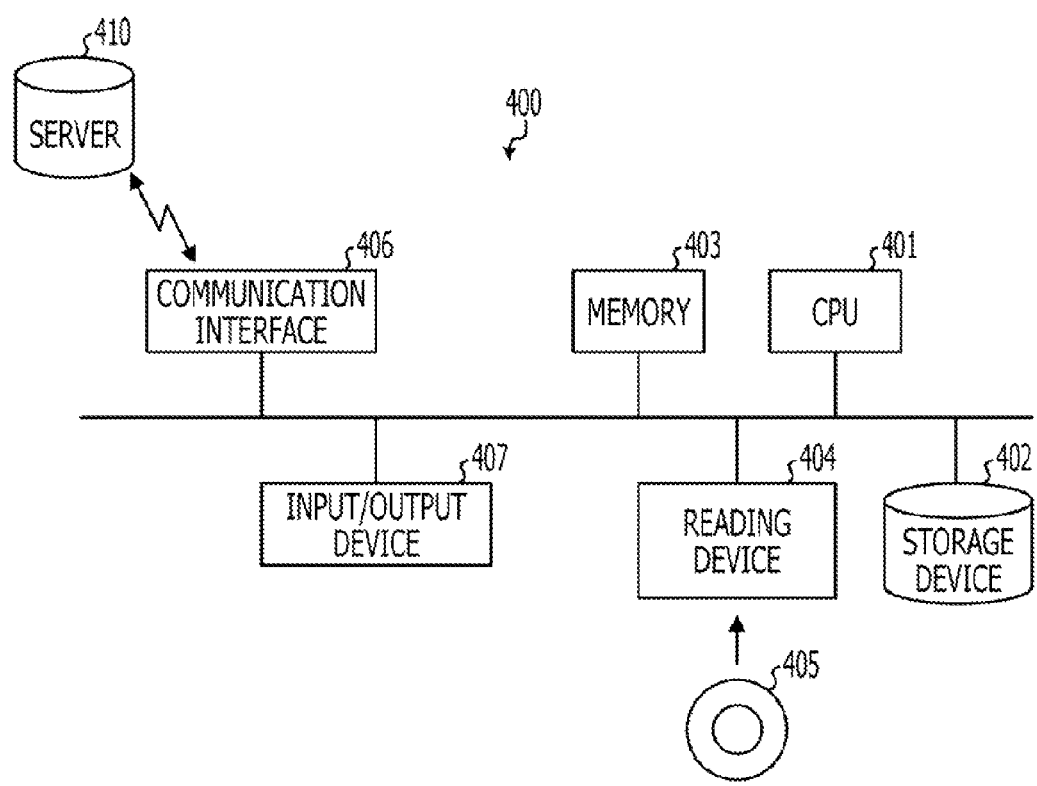
FIG. 42 illustrates one example of the hardware configuration of an image processing apparatus.

FIG. 42 is a block diagram illustrating one example of the hardware configuration of an image processing apparatus 400 including the arc detecting apparatus 10 according to one of the first and second embodiments. The image processing apparatus 400 illustrated in FIG. 42 includes a CPU (central processing unit) 401, a storage device 402, a memory 403, a reading device 404, a communication interface 406, and an input/output device 407.

The CPU 401 controls the individual units and computes and processes data. The CPU 401 uses the memory 403 to execute a program for executing the above-described arc detection processing.

The storage device 402 is, for example, a HDD (hard disk drive) and stores data related to application software and so on. The storage device 402 stores, for example, an arc detecting program. The storage device 402 may also be an external recording device.

Examples of the memory 403 include a ROM (read only memory) and a RAM (random access memory). The memory 403 is a storage device that stores or temporarily holds an OS (operating system, which is basic software), programs (such as application software), and data executed by the CPU 401.

The reading device 404 accesses a portable recording medium 405 in accordance with an instruction from the CPU 401. Examples of the portable recording medium 405 include a semiconductor device (e.g., a PC card), a medium to/from which information is input/output utilizing magnetic effects, and a medium to/from which information is input/output utilizing optical effects.

The communication interface 406 transmits/receives data over a network in accordance with an instruction from the CPU 401. In each embodiment described above, the input/output device 407 corresponds to, for example, a device that receives an instruction from a camera, a display device, or a user.

The controller 102 and the detector 103 in each embodiment described above may be implemented by, for example, the CPU 401 and the memory 403 serving as a work memory, and the input unit 101 and the output unit 104 may be implemented by, for example, the input/output device 407. The image processing apparatus 400 is applicable to a digital camera and so on.

The arc detecting program according to each embodiment may be provided in the following manner. For example, the program may be preinstalled in the storage device 402, may be supplied from the storage medium 405, or may be downloaded from a program server 410. Each of the mobile terminal apparatus 300 and the image processing apparatus 400 having the above-described configurations executes the arc detecting program to thereby realize the functions of the apparatus according to each embodiment. However, the storage medium does not include a transitory medium such as a propagation signal.

The arc detection processing in each embodiment described above is applicable to, for example, a function for detecting a dish in a captured image as an ellipse and automatically changing the image-capture mode to a cooking mode. According to the arc detection processing in each embodiment, even a dish having a missing segment due to an influence of food or a screen size, it is possible to detect the dish, regarding it as an ellipse. Thus, a mobile terminal device and a digital camera that perform arc detection processing in each embodiment can automatically switch the image-capture mode on the basis of an ellipse detection result.

The arc detection processing in each embodiment is capable of detecting an eye by regarding it as an ellipse. In this case, the portion of the eye may be enlarged for the above-described processing. The arc detection processing in each embodiment is also applicable to a case in which a raindrop on a lens of an externally located image-capture device is regarded as an ellipse for detection and the image-capture device is automatically powered off.

Although particular embodiments have been described above in detail, the disclosure herein is not limited to those described above and various modifications and changes, other than the above-described modifications, are also possible within the scope recited in the appended claims.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An arc detecting apparatus comprising:
   a memory; and
   a processor coupled to the memory, and configured to
     acquire an image data,
     approximate shapes included in the image data by straight lines,
     determine whether adjacent straight lines, among straight lines, form an arc shape, on a basis of positions of the adjacent straight lines and angles of the adjacent straight lines,
     detect the adjacent straight lines, when it is determined that the adjacent straight lines form the arc shape,
     detect, on a basis of positions of arcs detected, an ellipse including the detected arcs, and
     determine to which positions of the ellipse the arcs detected correspond, and when a number of portions of the ellipse which are determined to correspond to the determined positions is greater than or equal to a threshold, determine that a combination of the arcs corresponding to the given positions is an ellipse.

2. The arc detecting apparatus according to claim 1, wherein the adjacent straight lines include a first line segment and a second line segment, and the first line segment is associated with the second line segment when a position of the first line segment and a position of the second line segment and an angle of the first line segment relative to a reference and the angle of the second line segment relative to the reference satisfy predetermined conditions.

3. The arc detecting apparatus according to claim 2, wherein the processor is further configured to:
   detect an arc on a basis of the number of line segments associated and an angular variation of the adjacent line segment.

4. The arc detecting apparatus according to claim 1, wherein the processor is further configured to:
   detect the ellipse on a basis of an angular variation of the adjacent line segment, when the line segments associated make a circuit.

5. A non-transitory computer-readable recording medium storing an arc detecting program causing a computer to execute operations, the operations comprising:
   obtaining an image data;
   approximating shapes included in the image data by straight lines;
   determining whether adjacent straight lines, among straight lines, form an arc shape, on a basis of positions of the adjacent straight lines and angles of the adjacent straight lines;
   detecting the adjacent straight lines, when it is determined that the adjacent straight lines form the arc shape; and
   detecting, on a basis of positions of arcs detected in the arc detecting, an ellipse including the detected arcs,
   wherein, in the ellipse detecting, to which positions of the ellipse the arcs detected in the arc detecting correspond is determined, and when a number of portions of the ellipse which are determined to correspond to the determined positions is greater than or equal to a threshold, determining that a combination of the arcs corresponding to the given positions is an ellipse.

6. The non-transitory computer-readable recording medium according to claim 5, wherein
   the adjacent straight lines include a first line segment and a second line segment, and the first line segment is associated with the second line segment when a position of the first line segment and a position of the second line segment and an angle of the first line segment relative to a reference and the angle of the second line segment relative to the reference satisfy predetermined conditions.

7. The non-transitory computer-readable recording medium according to claim 6, wherein, in the arc detecting, an arc is detected based on the number of line segments associated in the associating of the at least three line segments and an angular variation of the adjacent line segment.

8. The non-transitory computer-readable recording medium according to claim 5, wherein, in the ellipse detecting, when the line segments associated in the associating the at least three line segments make a circuit, the ellipse is detected based on an angular variation of the adjacent line segment.

9. An arc detecting apparatus comprising an image-capture device and a processor:
   the image-capture device that captures an image data and
   the processor being configured to
     approximate shapes included in the image data by straight lines,
     determine whether adjacent straight lines, among straight lines, form an arc shape, on a basis of positions of the adjacent straight lines and angles of the adjacent straight lines,
     detect the adjacent straight lines, when it is determined that the adjacent straight lines form the arc shape,
     detect, on a basis of positions of arcs detected, an ellipse including the detected arcs, and
     determine to which positions of the ellipse the arcs detected correspond, and when a number of portions of the ellipse which are determined to correspond to the determined positions is greater than or equal to a threshold, determine that a combination of the arcs corresponding to the given positions is an ellipse.

10. The arc detecting apparatus according to claim 9, wherein the processor detects multiple arcs, detects an ellipse including the arcs on a basis of positions of the detected arcs, and controls an image-capture mode of the image-capture device in accordance with a result of the detection.

11. The arc detecting apparatus according to claim 2, wherein the first line segment is associated with the a third line segment that is different from the second line segment, when the third line segment is determined to be associated with the first line segment.

12. The non-transitory computer-readable recording medium according to claim 6, wherein the first line segment is associated with the a third line segment that is different from the second line segment, when the third line segment is determined to be associated with the first line segment.

13. An arc detecting method comprising:
   acquiring, by a processor, an image data;
   approximating shapes included in the image data by straight lines;
   determining whether adjacent straight lines, among straight lines;
   form an arc shape, on a basis of positions of the adjacent straight lines and angles of the adjacent straight lines;

detecting the adjacent straight lines, when it is determined that the adjacent straight lines form the arc shape; and detecting, on a basis of positions of arcs detected in the arc detecting, an ellipse including the detected arcs, wherein, in the ellipse detecting, to which positions of the ellipse the arcs detected in the arc detecting correspond is determined, and when a number of portions of the ellipse which are determined to correspond to the determined positions is greater than or equal to a threshold, determining that a combination of the arcs corresponding to the given positions is an ellipse.

\* \* \* \* \*